United States Patent [19]
Otomo et al.

[11] Patent Number: 5,984,432
[45] Date of Patent: Nov. 16, 1999

[54] PRESSURE CONTROL APPARATUS INCLUDING SEATING VALVE CONTROLLED BY ELECTRIC CURRENT INCREMENTED UPON VALVE OPENING DEPENDING UPON PRESSURE DIFFERENCE ACROSS THE VALVE

[75] Inventors: Akihiro Otomo; Kiyoharu Nakamura; Fumiaki Kawahata; Akira Sakai; Shinichi Soejima, all of Toyota, Japan

[73] Assignee: Toyota Jidosha Kabushiki Kaisha, Toyota, Japan

[21] Appl. No.: 09/037,954

[22] Filed: Mar. 11, 1998

[30] Foreign Application Priority Data

Mar. 14, 1997 [JP] Japan ................................. 9-060642
Apr. 7, 1997 [JP] Japan ................................. 9-088349

[51] Int. Cl.$^6$ ................................................. B60T 8/32
[52] U.S. Cl. ............................. 303/119.2; 303/113.1; 303/152; 303/162; 303/113.2; 303/901; 303/DIG. 4
[58] Field of Search .................. 303/115.2, 119.2, 303/DIG. 3, DIG. 4, 152, 900, 901, 116.1, 117.1, 118.1, 10–12, 162, 113.2, 113.1, 113.4, DIG. 11; 251/129.01, 129.02, 129.08, 129.15

[56] References Cited

U.S. PATENT DOCUMENTS

| | | |
|---|---|---|
| 5,462,343 | 10/1995 | Yoshida et al. |
| 5,558,414 | 9/1996 | Kubota ........................................ 303/10 |
| 5,683,149 | 11/1997 | Aizawa et al. ...................... 303/DIG. 4 |
| 5,727,851 | 3/1998 | Okubo et al. ......................... 303/119.2 |
| 5,758,930 | 6/1998 | Schiel et al. ............................. 303/162 |

*Primary Examiner*—Douglas C. Butler
*Attorney, Agent, or Firm*—Oliff & Berridge, PLC

[57] ABSTRACT

Hydraulic pressure control apparatus wherein a pressure difference across a seating valve disposed in a fluid passage acts on a valve member for placing the seating valve in an open state, while an elastic member biases the valve member for placing the seating valve in a closed state, and a valve driving device operated with an electric current applied thereto generates a drive force acting on the valve member so as to open the seating valve. A control device for controlling the electric current includes a stepping controller for incrementing the amount of the electric current when the seating valve is operated from the closed state into the open state, such that an increment of the electric current decreases with an increase in the pressure difference. The hydraulic pressure control apparatus may be suitably used in a vehicle braking system, for controlling fluid pressure in wheel brake cylinder.

23 Claims, 32 Drawing Sheets

FIG. 14
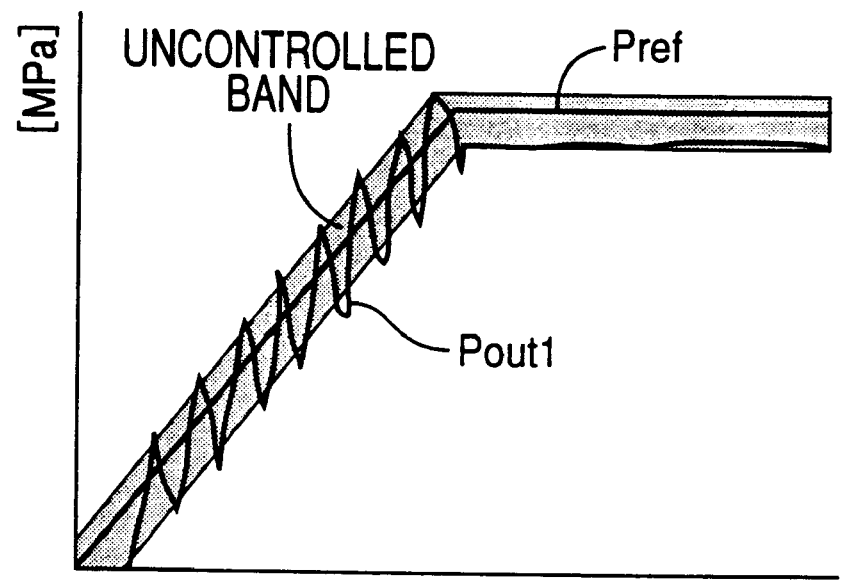
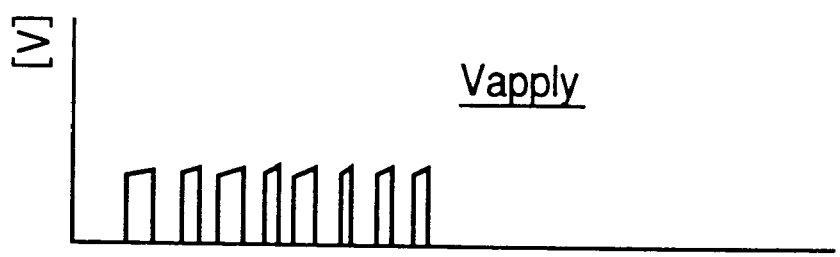
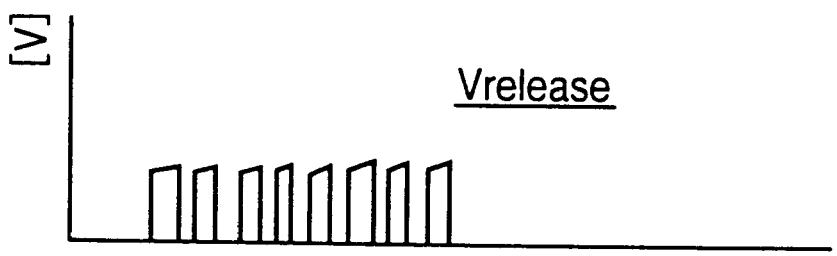

FIG. 21

|  |  | dPref | |
|---|---|---|---|
|  |  | $\geq 0$ | $< 0$ |
| error | $\geq 0$ | PRESSURE-INCREASING STATE | PRESSURE-HOLDING STATE |
|  | $< 0$ | PRESSURE-HOLDING STATE | PRESSURE-REDUCING STATE |

↑ [1]   ↑ [2]

FIG. 23
| | | dPref | | |
|---|---|---|---|---|
| | | $> dPth\ 1$ | $\leq dPth\ 1$ AND $\geq dPth\ 2$ | $< dPth\ 2$ |
| error | $\geq 0$ | PRESSURE-INCREASING STATE | PRESSURE-HOLDING STATE | |
| | $< 0$ | | | PRESSURE-REDUCING STATE |
 [1]    [2]    [3]

FIG. 25

| | | dPref | |
|---|---|---|---|
| | | $\geq 0$ | $< 0$ |
| error | $>$ err1 | PRESSURE-INCREASING STATE | |
| | $\leq$ err1 AND $\geq$ err2 | | PRESSURE-HOLDING STATE |
| | $<$ err2 | | PRESSURE-REDUCING STATE |

↑ [1]   ↑ [2]

PRESSURE CONTROL APPARATUS INCLUDING SEATING VALVE CONTROLLED BY ELECTRIC CURRENT INCREMENTED UPON VALVE OPENING DEPENDING UPON PRESSURE DIFFERENCE ACROSS THE VALVE

This application is based on Japanese Patent Applications Nos. 9-60642 and 9-88349 filed Mar. 14 and Apr. 7, 1997, respectively, the contents of which are incorporated hereinto by reference.

BACKGROUND OF THE INVENTION

1. Field of the Invention

The present invention relates in general to a hydraulic pressure control apparatus and a hydraulically operated braking system for a motor vehicle, and more particularly to a hydraulic pressure control apparatus including a seating valve and a valve driving device operated with an electric current applied thereto to move a valve member of the seating valve, and a hydraulically operated braking system wherein the pressure of a working fluid in a wheel brake cylinder for braking a wheel of the motor vehicle is regulated by such a hydraulic pressure control apparatus.

2. Discussion of the Related Art

The assignee of the present application proposed a hydraulic pressure control apparatus including a seating valve and a valve driving device as described above, and as disclosed in Japanese Patent Application No. 8-17988 which had not been laid open at the time the above-identified Japanese Patent Application No. 9-88349 was filed. This hydraulic pressure control apparatus includes (1) a seating valve having a valve member and a valve seat and disposed in a fluid passage such that the fluid passage is separated by the seating valve into a high-pressure portion and a low-pressure portion when the seating valve is placed in a closed state thereof with the valve member being seated on the valve seat, and such that a difference between pressures of a working fluid in the high-pressure and low-pressure portions of the fluid passage acts on the valve member in a first direction for moving the valve member away from the valve seat so as to place the seating device in an open state thereof, (2) an elastic member for biasing the valve member in a second direction for moving the valve member to be seated on the valve seat, (3), a valve driving device operated with an electric current applied thereto, to generate a drive force acting on the valve member in the above-indicated first direction, and (4) a control device for controlling the electric current to be applied to the valve driving device, to thereby control the valve driving device.

In the hydraulic pressure control apparatus of the type described above, a biasing force based on an elastic force of the elastic member acts on the valve member in the direction for moving the valve member to be seated on the valve seat, while a biasing force based on the fluid pressure difference and the drive force or biasing force generated by the valve driving device act on the valve member in the direction for moving the valve member away from the valve seat. When the biasing force based on the elastic member is larger than a sum of the other two biasing forces, the seating valve is closed with the valve member being seated on the valve seat. When the former is smaller than the latter, the seating valve is open with the valve member being spaced apart from the valve seat. The biasing force generated by the valve driving device and acting on the valve member changes with the amount of the electric current to be applied to the valve driving device. Accordingly, it is possible to control the fluid pressure difference, namely, at least one of the fluid pressures on the high-pressure and low-pressure sides of the seating valve, by controlling the amount of the electric current to be applied to the valve driving device.

In a hydraulically operated braking system for a motor vehicle, for example, the seating valve of the hydraulic pressure control apparatus may be disposed in a fluid passage connecting a master cylinder and a wheel brake cylinder for braking a wheel of the vehicle. The master cylinder is adapted to pressurize the working fluid according to an operation of a brake operating member. The fluid pressure generated by the master cylinder can be reduced by a desired amount by the hydraulic pressure control apparatus, so that the reduced fluid pressure is applied to the wheel brake cylinder. Described more specifically, the fluid pressure in the wheel brake cylinder, which is lower than the master cylinder pressure, can be controlled by controlling the amount of the electric current to be applied to the valve driving device. Further, the seating valve of the hydraulic pressure control apparatus may also be disposed in a fluid passage connecting the wheel brake cylinder and a reservoir which is provided to accommodate the working fluid under the atmospheric pressure. In this case, the wheel brake cylinder pressure which is higher than the fluid pressure in the reservoir can be controlled by the hydraulic pressure control apparatus.

However, the hydraulic pressure control apparatus discussed above suffers from a problem that the operating response of the hydraulic pressure control apparatus is not sufficiently high upon initiation of its pressure control operation. That is, the control device of the hydraulic pressure control apparatus is arranged to initiate a gradual increase (from the zero value) of the electric current applied to the valve driving device, upon satisfaction of a predetermined condition for opening the seating valve, so that the seating valve is opened when the biasing force generated by the valve driving device based on the applied electric current has exceeded a difference of the elastic force of the elastic member from the biasing force based on the fluid pressure difference across the seating valve. This arrangement causes a time delay between the moment when the predetermined condition for opening the seating valve is satisfied, and the moment at which the seating valve is actually opened with the amount of the electric current exceeding a given critical point corresponding to the above-indicated difference between the elastic force and the biasing force based on the fluid pressure difference. Thus, the operating response of the hydraulic pressure control apparatus is not satisfactory upon initiation of its pressure control operation.

SUMMARY OF THE INVENTION

It is therefore a first object of the present invention to provide a hydraulic pressure control apparatus which has an improved response upon initiation of its pressure control operation.

A second object of the present invention is to provide a hydraulically operated braking system for a motor vehicle, which includes a hydraulic pressure control apparatus having an improved response upon initiation of its pressure control operation.

The above first object may be achieved according to any one of the following modes of the present invention, which are numbered like the appended claims and depend from the other claim or claims, as needed, so as to indicate possible combinations of elements or features in preferred forms of the present invention:

(1) A hydraulic pressure control apparatus comprising: (a) a seating valve including a valve member and a valve seat and disposed in a fluid passage such that the fluid passage is separated by the seating valve into a high-pressure portion and a low-pressure portion when the seating valve is placed in a closed state thereof with the valve member being seated on the valve seat, and such that a pressure difference between pressures of a working fluid in the high-pressure and low-pressure portions of the fluid passage acts on the valve member in a first direction for moving the valve member away from the valve seat so as to place the seating valve in an open state thereof; (b) an elastic member which biases the valve member in a second direction for moving the valve member to be seated on the valve seat; (c) a valve driving device operated with an electric current applied thereto, to generate a drive force acting on the valve member in the first direction; and (d) a control device which controls an amount of the electric current to be applied to the valve driving device, to thereby control the valve driving device, and wherein the control device comprises a stepping control device which increments the amount of the electric current when the seating valve is operated from the closed state into the open state, the stepping control device determining an increment of the amount of the electric current such that the increment decreases with an increase in the pressure difference.

In the hydraulic pressure control apparatus according the first mode of the invention constructed as described above, the stepping control device of the control circuit is adapted to increase in steps the amount of the electric current to be applied to the valve driving device when the seating valve which has been plated in the closed state is operated to the open state, such that the increment of the electric current decreases as the fluid pressure difference across the seating valve increases. Since the amount of the electric current required to be applied to the valve driving device for opening the seating valve decreases with an increase in the fluid pressure difference, the increment by which the the electric current to be applied to the valve driving device is increased by the stepping control device is determined to decrease with an increase in the fluid pressure difference acting on the valve member of the seating valve. This arrangement is effective to reduce an influence of the fluid pressure difference on the operating response of the seating valve. It is ideal to determine the increment such that the biasing force based on the drive force generated by the valve driving device is just equal to a difference between the elastic force of the elastic member and the biasing force based on the fluid pressure difference. However, this arrangement is not essential. That is, the increment may be determined such that the biasing force of the valve driving device operated by the electric current incremented by the stepping control device is more or less larger than the force difference between the elastic force and the biasing force based on the fluid pressure difference. In this case, the amount of opening of the seating valve is larger than actually required, causing a relatively high rate of change of the fluid pressure to be controlled by the seating valve, namely, a relatively high rate of change of the fluid pressure in the high-pressure or low-pressure portion of the fluid passage. However, this arrangement also permits the seating valve to be opened as soon as a predetermined condition for opening the seating valve has been satisfied. Therefore, this arrangement is effective to prevent a delayed opening of the seating valve. Conversely, the increment of the electric current may be determined such that the biasing force of the valve driving device is more or less smaller than the above-indicated force difference. In this case, the seating valve is not opened when the predetermined condition has been satisfied. However, the seating valve is opened when the electric current is subsequently increased in steps by the stepping control device, for instance, in the next step. Therefore, this arrangement permits the seating valve to be opened in a shorter time with a reduced delay, than the conventional arrangement in which the amount of the electric current is gradually increased from zero.

(2) A hydraulic pressure control apparatus according to the above mode (1), further comprising a pressure difference detecting device for detecting the pressure difference across the seating valve, and wherein the stepping control device comprises an increment determining device which determines the increment on the basis of the pressure difference detected by the pressure difference detecting device.

In this mode of the invention, the increment by which the electric current to be applied to the valve driving device is increased can be determined such that the biasing force based on the drive force generated by the valve driving device is just equal to the difference between the elastic force of the elastic member and the biasing force based on the fluid pressure difference.

(3) A hydraulic pressure control apparatus according to the above mode (2), wherein the control device further comprises an updating device which activates at least one of the pressure difference detecting device and the increment determining device to repeatedly implement at least one of detection of the pressure difference and determination of the increment at a predetermined time interval, so that the increment is updated at the predetermined time interval.

In the above mode (3), the increment of the electric current is updated by the updating device at a suitable time interval, so that the updated increment is stored in a memory. In this arrangement, the increment stored in the memory when the predetermined condition for opening the seating valve is satisfied is just sufficient for opening the seating valve. Namely, the seating valve is opened when the valve driving device is operated with the electric current incremented by the stepping control device according to the increment updated by the updating device.

(4) A hydraulic pressure control apparatus according to any one of the above modes (1)–(3), wherein the control device further comprises a current control device which applies the electric current to the valve driving device while the seating valve is placed in the open position, such that the amount of the electric current increases with a decrease in the pressure difference.

In the hydraulic pressure control apparatus according to the above mode (4), the seating valve which has been operated to the open state is prevented from being closed due to a decrease in the fluid pressure difference across the seating valve. This hydraulic pressure control apparatus is suitably used in a hydraulic circuit wherein the fluid pressure difference across the seating valve changes due to a change in at least one of the pressures in the high-pressure and low-pressure portions of the fluid passage when the seating valve is opened. For instance, the present hydraulic pressure control apparatus may be used in a hydraulically operated braking system for a motor vehicle, to regulate the fluid pressure in a wheel brake cylinder. In this case, the fluid pressure in the wheel brake cylinder necessarily changes when the seating valve is opened, that is, when the pressurized fluid is fed into or discharged from the wheel brake cylinder through the seating valve placed in the open state. Consequently, the fluid pressure difference decreases after the seating valve is opened. The current control device provided according to the above mode (4) is therefore desirable to prevent the seating valve from being closed due to such a decrease in the fluid pressure difference after the seating valve is once opened.

(5) A hydraulic pressure control apparatus according to any one of the above modes (1)–(4), wherein the stepping control device comprises increment decreasing means for determining the increment of the amount of the electric current such that the increment is smaller when an amount of use of the seating valve is relatively large than when the amount of use is relatively small.

In the hydraulic pressure control apparatus according to any one of the above modes (1)–(4), it was found that the optimum increment of the amount of electric current to be applied to the valve driving device for changing the operating state of the seating valve from the closed state to the open state decreases with an increase in the amount of use of the seating valve. This decrease in the optimum increment is assumed to arise from a decrease in the spring constant of the elastic member which biases the valve member of the seating valve in the second direction for moving the valve member to be seated on the valve seat. While a further study is necessary to confirm the accuracy of this assumption, an experiment showed that the accuracy of control of the fluid pressure by the hydraulic pressure control apparatus can be improved by providing the stepping control device with the increment decreasing means for decreasing the increment of the amount of the electric current as the amount of use of the seating valve increases. The amount of use of the seating valve may be represented by the time elapse after initiation of use of the seating valve. Alternatively, the amount of use of the seating valve may be represented by the cumulative amount of operation of the seating valve after initiation of use of the seating valve, as indicated below. The cumulative amount of operation of the seating valve may be represented by the cumulative number of operations of the seating valve, or the cumulative time of application of the electric current to the valve driving device. Although the increment decreasing means is preferably adapted to decrease in steps or continuously the increment of the amount of electric current with an increase in the amount of use of the seating valve, a significant effect can be expected by decreasing the increment by a predetermined amount each time the amount of use of the seating valve has reached each of predetermined values.

(6) A hydraulic pressure control apparatus according to the above mode (5), wherein the amount of use of the seating valve is a cumulative amount of operation of the seating valve after initiation of use of the seating valve.

(7) A hydraulic pressure control apparatus according to the above mode (6), wherein the cumulative amount of operation of the seating valve is a cumulative number of operations of the seating valve.

(8) A hydraulic pressure control apparatus according to the above mode (6), wherein the cumulative amount of operation of the seating valve is a cumulative time of application of the electric current to the valve driving device.

(9) A hydraulic pressure control apparatus according to any one of the above modes (5)–(8), wherein the increment decreasing means comprises means for decreasing the increment of the amount of the electric current with an increase in the amount of use of the seating valve.

(10) A hydraulic pressure control apparatus according to any one of the above modes (5)–(9), wherein the increment decreasing means comprises means for storing data indicative of the degree of use of the seating valve.

The second object indicated above may be achieved according to any one of the following modes of the present invention, each of which is numbered like the appended claims and depends from the other claim or claims, as needed, so as to indicate possible combinations of elements or features in preferred forms of the present invention:

(11) A hydraulically operated braking system for a motor vehicle, comprising: (a) a hydraulic pressure source; (b) at least one wheel brake cylinder each for braking a corresponding one of at least one wheel of the motor vehicle; (c) a seating valve including a valve member and a valve seat and disposed in a fluid passage which is provided for connecting the hydraulic pressure source and the above-indicated at least one wheel brake cylinder, the seating valve being placed in a closed state thereof with the valve member being seated on the valve seat so as to disconnect the fluid passage, the valve member receiving a pressure difference of a working fluid across the seating valve such that the pressure difference acts on the valve member in a first direction for moving the valve member away from the valve seat so as to place the seating valve in an open state thereof; (d) an elastic member which biases the valve member in a second direction for moving the valve member to be seated on the valve seat; (e) a valve driving device operated with an electric current applied thereto, to generate a drive force acting on the valve member in the first direction; and (f) a control device which controls an amount of the electric current to be applied to the valve driving device, to thereby control the valve driving device, wherein the control device comprises a stepping control device which increments the amount of the electric current when the seating valve is operated from the closed state into the open state. The stepping control device is adapted to determine an increment of the amount of the electric current such that the increment decreases with an increase in the pressure difference. The control device further comprises a replacing device which is operable when the pressure in the above-indicated at least one wheel brake cylinder is increased from an atmospheric pressure, so that the replacing device replaces the increment with a value larger than the increment as determined by the stepping control device.

The hydraulically operated braking system constructed according to the above mode (11) of the second aspect of this invention has substantially the same advantages as described above with respect to the hydraulic pressure control apparatus according to the above mode (1) of the first aspect of this invention. Further, the present braking system has the following features.

When the fluid pressure in the wheel brake cylinder is increased from the atmospheric pressure, that is, immediately after a braking operation for braking the corresponding wheel is initiated, an increase in the fluid pressure in the wheel brake cylinder tends to be delayed. Immediately after the initiation of the braking operation, the amount of the fluid required to increase the fluid pressure in the wheel brake cylinder by a given unit amount is relatively large, so that the amount of the fluid flow through the fluid passage between the seating valve and the wheel brake cylinder is relatively large, whereby there exists a relatively large fluid pressure difference between the output fluid pressure of the seating valve and the pressure in the wheel brake cylinder. Accordingly, the fluid pressure in the wheel brake cylinder cannot be raised with a high response. It is also noted that output fluid pressure of the seating valve cannot be controlled to follow the desired fluid pressure value with high accuracy, where the cross sectional area of the fluid flow through the seating valve is constant, that is, where the cross sectional area of the fluid flow immediately after the initiation of the braking operation is the same as that during an ordinary pressure-increasing action in which the rate of the fluid flow into the wheel brake cylinder is lower than that immediately after the initiation of the braking operation.

In the braking system according to the above mode (11) of the present invention provided with the hydraulic pressure control apparatus according to the above mode (1) of the present invention, the replacing device of the control device is adapted to replace the increment determined by the stepping control device, with a value larger than the determined increment, when the fluid pressure in the wheel brake cylinder is increased from the atmospheric pressure, that is, when a braking operation for braking the wheel is initiated. In this arrangement, the rate of flow of the fluid into the wheel brake cylinder is increased immediately after the braking operation, so as to prevent or minimize a delay in the fluid pressure increase in the wheel brake cylinder, or so as to improve the accuracy with which the output fluid pressure of the seating valve is controlled following the desired pressure, irrespective of the required amount of flow of the fluid between the seating valve and the wheel brake cylinder.

(12) A hydraulically operated braking system according to the above mode (11), wherein the seating valve, the elastic member, the valve driving device and the control device cooperate to function as a pressure-increasing pressure control device, the braking system further comprising: a reservoir for storing the working fluid; and a pressure-reducing pressure control device identical in construction with the pressure-increasing pressure control device, the seating valve of the pressure-reducing pressure control device being disposed in a fluid passage provided for connecting the reservoir and the above-indicated at least one wheel brake cylinder, the valve member of the seating valve of the pressure-reducing pressure control device receiving a pressure difference of the working fluid across the seating valve of the pressure-reducing pressure control device such that the pressure difference acts on the valve member in the first direction for moving the valve member away from the valve seat.

In this mode (12) of the braking system of the present invention, the fluid pressure in the wheel brake cylinder or cylinders is increased by the pressure-increasing pressure control device, and is reduced by the pressure-reducing pressure control device. Since these two pressure control devices are identical in construction, the same parts can be used for almost all components of the two devices, and the control logic for the two devices can be simplified, so that the cost of manufacture of the braking system can be lowered.

It is noted that the hydraulic pressure control apparatus according to the mode (1) of the present invention is suitably used as the pressure-reducing pressure control device as well as the pressure-increasing pressure control device. The features of the above modes (2)–(10) are applicable to the braking system according to the above modes (11) and (12).

(13) A hydraulically operated braking system according to the above mode (12), wherein the reservoir receives the fluid which has been discharged from the above-indicated at least one wheel brake cylinder through the seating valve of the pressure-reducing pressure control device during a braking operation of the braking system, the fluid being returned from the reservoir to the hydraulic pressure source after the braking operation, and the reservoir has a storage capacity which is a maximum amount of the fluid that can be stored therein during the braking operation and which is smaller than a maximum total amount of the fluid that can be accommodated in all of the above-indicated at least one wheel brake cylinder when the above-indicated at least one wheel brake cylinder is operated from a non-braking state thereof to a braking state.

In the hydraulically operated braking system according to the above mode (13) of the present invention, the reservoir is provided to accommodate the pressurized fluid which has been discharged from each wheel brake cylinder during the braking operation, so that the fluid is returned to the hydraulic pressure source after the braking operation. The storage capacity of this reservoir is smaller than the maximum total amount of the fluid that can be accommodated in all of the above-indicated at least one wheel brake cylinder, so that the amount of the fluid that can be discharged from the above-indicated at least one wheel brake cylinder does not exceed the storage capacity of the reservoir, even if the fluid is allowed to be discharged freely from the above-indicated at least one wheel brake cylinder, in the event of some failure or malfunction of the seating valve, valve driving device or control device of the hydraulic pressure control apparatus, whereby the vehicle can be braked even in the event of such failure or malfunction. After the total amount of the fluid which has been discharged from the above-indicated at least one wheel brake cylinder has reached the storage capacity of the reservoir, the fluid can no longer be accommodated in the reservoir and can no longer be discharged from the wheel brake cylinder or cylinders, even if the seating valve permits the fluid flow from the wheel brake cylinder or cylinders. Since the storage capacity of the reservoir is smaller than the maximum total amount of the fluid that can be stored in all of the above-indicated at least one wheel brake cylinder, some amount of the fluid is still left in the wheel brake cylinder or cylinders even after the fluid has been discharged from the cylinder or cylinders due to some failure or malfunction of the control device. In this case, some amount of the fluid is left in the above-indicated at least one wheel brake cylinder without an additional supply of the pressurized fluid to the above-indicated at least one wheel brake cylinder from the hydraulic pressure source. Therefore, some braking force for braking the motor vehicle is generated by the above-indicated at least one wheel brake cylinder. Where the pressurized fluid is additionally supplied to the above-indicated at least one wheel brake cylinder from the hydraulic pressure source in such an event, the wheel brake cylinder or cylinders can generate a relatively large braking force with a comparatively small amount of the additional supply of the pressurized fluid. Where the hydraulic pressure source is an ordinary master cylinder adapted to generate a pressurized fluid whose pressure corresponds to the operating force acting on a brake operating member, the operating amount of the brake operating member is increased by an amount corresponding to the amount of the pressurized fluid additionally supplied to the wheel brake cylinder or cylinders. Although an increase in the operating amount of the brake operating member causes a delay in providing a braking effect, the comparatively small amount of the additional supply of the fluid from the master cylinder results in an accordingly small increase of the operating amount of the brake operating member and an accordingly short delay of the braking effect. Where the hydraulic pressure source is an automatically driven pressure source using a motor-driven pump, for example, the additional supply of the pressurized fluid from the pressure source does not cause an increase in the operating amount of the brake operating member, but causes a delay of the braking effect. However, the delay is short because the amount of the additional supply of the fluid is comparatively small. Thus, the present hydraulic braking system has an improved degree of operating reliability.

In other words, the storage capacity of the reservoir provided in the hydraulically operated braking system according to the above mode (13) is determined such that each of the above-indicated at least one wheel brake cylinder is still capable of braking the corresponding wheel of the motor vehicle even after the reservoir has been filled with the working fluid which is discharged from the above-indicated at least one wheel brake cylinder as a result of opening of the pressure-reducing pressure control device when the amount of the working fluid in the reservoir is minimum and when each of the above-indicated at least one wheel brake cylinder is braking the corresponding wheel.

Alternatively, the storage capacity of the reservoir may be determined to be smaller than a difference between two different amounts of the working fluid which are accommodated in all of the above-indicated at least one wheel brake cylinder under respective two different braking conditions in which each of the at least one wheel brake cylinder provides respective two different substantial braking effects, respectively. The above-indicated difference between the two different amounts of the working fluid is maximum when the above-indicated two different braking conditions consist of a first condition in which the highest possible fluid pressure is applied to the at least one wheel brake cylinder, and a second condition in which the lowest fluid pressure that permits the at least one wheel brake cylinder to provide a substantial braking effect is applied to the at least one wheel brake cylinder. The principle of the invention according to the above mode (13) is satisfied when the storage capacity of the reservoir is determined to be equal or close to the maximum difference indicated above. However, it is desirable to determine the storage capacity to be smaller than the maximum difference, since the braking effect to be provided by the at least one wheel brake cylinder in the event of the fluid discharge from the wheel brake cylinder to the reservoir due to failure or malfunction of the pressure-reducing pressure control device increases with a decrease in the storage capacity of the reservoir. However, the storage capacity of the reservoir must be large enough to accommodate the fluid which is to be discharged from the at least one wheel brake cylinder in a normal braking operation. Thus, the storage capacity must be selected within a range whose upper and lower limits are respectively equal to the above-indicated maximum difference of the fluid amounts under the above-indicated two different braking conditions, and the amount of the fluid which is normally discharged from the at least one wheel brake cylinder in a braking operation.

(14) A hydraulically operated braking system according to the above mode (12) or (13), wherein the reservoir receives the fluid which has been discharged from the above-indicated at least one wheel brake cylinder through the seating valve of the pressure-reducing pressure control device during a braking operation of the braking system, the fluid being returned from the reservoir to the hydraulic pressure source after the braking operation, the braking system further comprising a fluid leakage detecting device which detects a leakage of the fluid from the braking system, the fluid leakage detecting device determining that the leakage has taken place, if a total amount of the fluid which has been discharged from the above-indicated at least one wheel brake cylinder toward the reservoir through the pressure-reducing pressure control device during the braking operation has exceeded a storage capacity of the reservoir, which storage capacity is a maximum amount of the fluid that can be stored therein during the braking operation.

In the hydraulic braking system according to the above mode (14) of this invention, the fluid leakage detecting device is adapted to detect an occurrence of a leakage of the fluid from the braking system, when the total amount of the fluid which has been discharged from the wheel brake cylinder or cylinders during the braking operation has exceeded the storage capacity of the reservoir. Thus, the fluid leakage detecting device permits early detection of the fluid leakage, and the operating reliability of the braking system is improved.

The braking system may further comprise inhibiting means for inhibiting all pressure control operations of the pressure-increasing and pressure-reducing pressure control devices, or pressure reduction inhibiting means for inhibiting a pressure reducing operation of the pressure-reducing pressure control device. In this case, the amount of leakage of the fluid can be reduced. Where the hydraulic pressure source is an ordinary master cylinder, the inhibiting means is effective to minimize an increase in the operating amount of the brake operating member. Where the hydraulic pressure source is an automatically operated pressure source using a motor-driven pump, for example, the inhibiting means is effective to prevent an excessive amount of leakage of the fluid. Accordingly, the operating reliability of the braking system is further improved.

(15) A hydraulically operated braking system according to any one of the above modes (11)–(14), wherein the hydraulic pressure source includes a master cylinder which pressurizes the working fluid according to an operation of a brake operating member, and the elastic member has an elastic force which is determined such that an opening pressure difference of the seating valve which is the pressure difference above which the seating valve is placed in the open state when the electric current is not applied to the valve driving device is smaller than a maximum pressure of the fluid pressurized by the master cylinder.

In the hydraulically operated braking system constructed as described above according to the above mode (15) of this invention, the braking system can be operated to brake the vehicle even when the valve driving device is not supplied with the electric current due to a failure or malfunction of the control device, for example. The seating valve is opened when the biasing force based on the fluid pressure difference across the seating valve becomes larger than the elastic force of the elastic member, where the electric current is not applied to the valve driving device. In this event, the seating valve functions as a pressure-reducing valve which reduces the fluid pressure generated by the master cylinder, by the amount corresponding to the opening pressure difference of the seating valve, so that the reduced fluid pressure is applied to the wheel brake cylinder or cylinders. Thus, the seating valve is opened to permit the fluid flow from the master cylinder into the wheel brake cylinder or cylinders, when the master cylinder pressure exceeds the predetermined opening pressure difference of the seating valve. In this respect, it is noted that the opening pressure difference is smaller than the maximum pressure generated by the master cylinder. Accordingly, the vehicle can be braked even in the event of some failure or malfunction of the control device, for instance.

(16) A hydraulically operated braking system according to any one of the above modes (12)–(15), wherein the reservoir includes a displaceable member partially defining a fluid chamber for storing the fluid, and a biasing device which biases the displaceable member in a direction for reducing a volume of the fluid chamber, the fluid being discharged from the fluid chamber based on a biasing force of the biasing device acting on the displaceable member, after termination of the operation of the brake operating member.

In the braking system according to the above mode (16), the fluid is automatically discharged from the reservoir after the pressure of the fluid in a fluid passage connected to the reservoir has been lowered to a level close to the atmospheric pressure after the termination of the operation of the brake operating member. In one form of this mode of the invention, the displaceable member consists of a piston which cooperates with the housing of the reservoir to define the fluid chamber such that the displaceable member is fluid-tightly and slidably moved within the fluid chamber. In this case, the biasing means preferably includes an elastic member such as a compression coil spring, which biases the displaceable member in the direction for reducing the volume of the fluid chamber. In another form of this mode of the invention, the displaceable member consists of an expandable member which cooperates with the housing of the reservoir to define the fluid chamber. The expandable member may be a rubber diaphragm or bag cooperating with the housing to define the fluid chamber. In this case, the biasing means may be a gas which fills a space on one side of the rubber diaphragm remote from the rubber diaphragm, or a space within the rubber bag.

(17) A hydraulically operated braking system according to any one of the above modes (12)–(16), wherein the reservoir functions as an auxiliary reservoir, and the hydraulic pressure source comprises a primary reservoir which stores the working fluid at an atmospheric pressure, the hydraulically operated braking system further comprising: a by-pass passage which by-passes the pressure control valve device and connects the above-indicated at least one wheel brake cylinder and the primary reservoir through a fluid passage between the hydraulic pressure source and the pressure control valve device; and a check valve disposed in the by-pass passage, the check valve permitting a flow of the fluid in a direction from the above-indicated at least one wheel brake cylinder toward the primary reservoir and inhibiting a flow of the fluid in a direction from the primary reservoir toward the above-indicated at least one wheel brake cylinder.

In the braking system according to the above mode (17) of the invention wherein the by-pass passage having the check valve is provided for connecting the primary reservoir and the above-indicated at least one wheel brake cylinder, the fluid in each wheel brake cylinder is permitted to be returned to the primary reservoir, irrespective of the operating state of the pressure control valve device, when the fluid pressure in the fluid passage between the hydraulic pressure source and the valve device is lower than the fluid pressure in the wheel brake cylinder.

(18) A hydraulically operated braking system according to any one of the above modes (12)–(16), further comprising: a first check valve disposed in parallel connection with the seating valve of the pressure-increasing pressure control device, the first check valve permitting a flow of the fluid in a direction from the above-indicated at least one wheel brake cylinder toward the hydraulic pressure source, and inhibiting a flow of the fluid in a direction from the hydraulic pressure source toward the above-indicated at least one wheel brake cylinder; and a second check valve disposed in parallel connection with the seating valve of the pressure-reducing pressure control device, the second check valve permitting a flow of the fluid in a direction from the reservoir toward the above-indicated at least one wheel brake cylinder, and inhibiting a flow of the fluid in a direction from the above-indicated at least one wheel brake cylinder toward the reservoir.

A combination of the features according to the above two modes (17) and (18) of this invention makes it possible to return the working fluid from the auxiliary reservoir to the primary reservoir through the by-pass passage.

(19) A hydraulically operated braking system according to the above modes (11)–(18), wherein the valve driving device comprises a biased member movable with the valve member, and a solenoid coil which generates an electromagnetic biasing force which acts on the biased member in the first direction opposite to the second direction.

(20) A hydraulically operated braking system according to the above modes (11)–(19), which is provided for a motor vehicle equipped with an electric motor which functions as a drive power source for driving the motor vehicle and an electric generator which constitutes a part of a regenerative braking system wherein the electric generator generates a regenerative braking force, the hydraulic power source including a master cylinder which pressurizes the working fluid such that a pressure of the pressurized fluid corresponds to an operating state of a brake operating member. The hydraulically operated braking system comprises a cooperative control device which controls the valve driving device such that the pressure of the pressurized fluid to be supplied to the above-indicated at least one wheel brake cylinder is lower than the pressure of the fluid in the master cylinder, by an amount corresponding to the regenerative braking force generated by the regenerative braking system.

(21) A hydraulically operated braking system according to the above modes (12)–(20), wherein the seating valves, the elastic members and the valve driving devices of the pressure-increasing and pressure-reducing pressure control devices cooperate to function as a first pressure control valve device, the hydraulically operated braking system further comprising: (a) a second pressure control valve device disposed between the above-indicated at least one wheel brake cylinder and the first pressure control valve device; and (b) a controller which controls the second pressure control valve device, in at least one of a plurality of control modes consisting of: an anti-lock control mode for preventing an excessive amount of slip of the above-indicated at least one wheel during the operation of the brake operating member; a traction control mode for preventing an excessive amount of slip of at least one drive wheel of the above-indicated at least one wheel during acceleration of the motor vehicle; a vehicle stability control mode for improving a running stability of the motor vehicle; and a braking-effect control mode for providing an operator's desired braking effect which accurately corresponds to an operating state of the brake operating member.

BRIEF DESCRIPTION OF THE DRAWINGS

The above and optional objects, features, advantages and technical and industrial significance of this invention will be better understood by reading the following detailed description of presently preferred embodiments of the invention, when considered in connection with the accompanying drawings, in which:

FIG. 14 is a graph indicating an example of a change in the desired fluid pressure Pref, and an example of a change in an output fluid pressure Pout1 according to the voltage values VFapply and VFrelease calculated in the sub-routine of FIG. 8;

FIG. 21 is a view for explaining a concept of calculating solenoid voltage values Vapply and Vrelease in step S14 of the main routine of FIG. 7, according to another embodiment of this invention;

FIG. 23 is a view for explaining a concept of calculating solenoid voltage values Vapply and Vrelease in step S14 of the main routine of FIG. 7, according to a further embodiment of this invention;

FIG. 25 is a view for explaining a concept of calculating solenoid voltage values Vapply and Vrelease in step S14 of the main routine of FIG. 7, according to a still further embodiment of this invention;

DETAILED DESCRIPTION OF THE PREFERRED EMBODIMENTS

Figure 1:
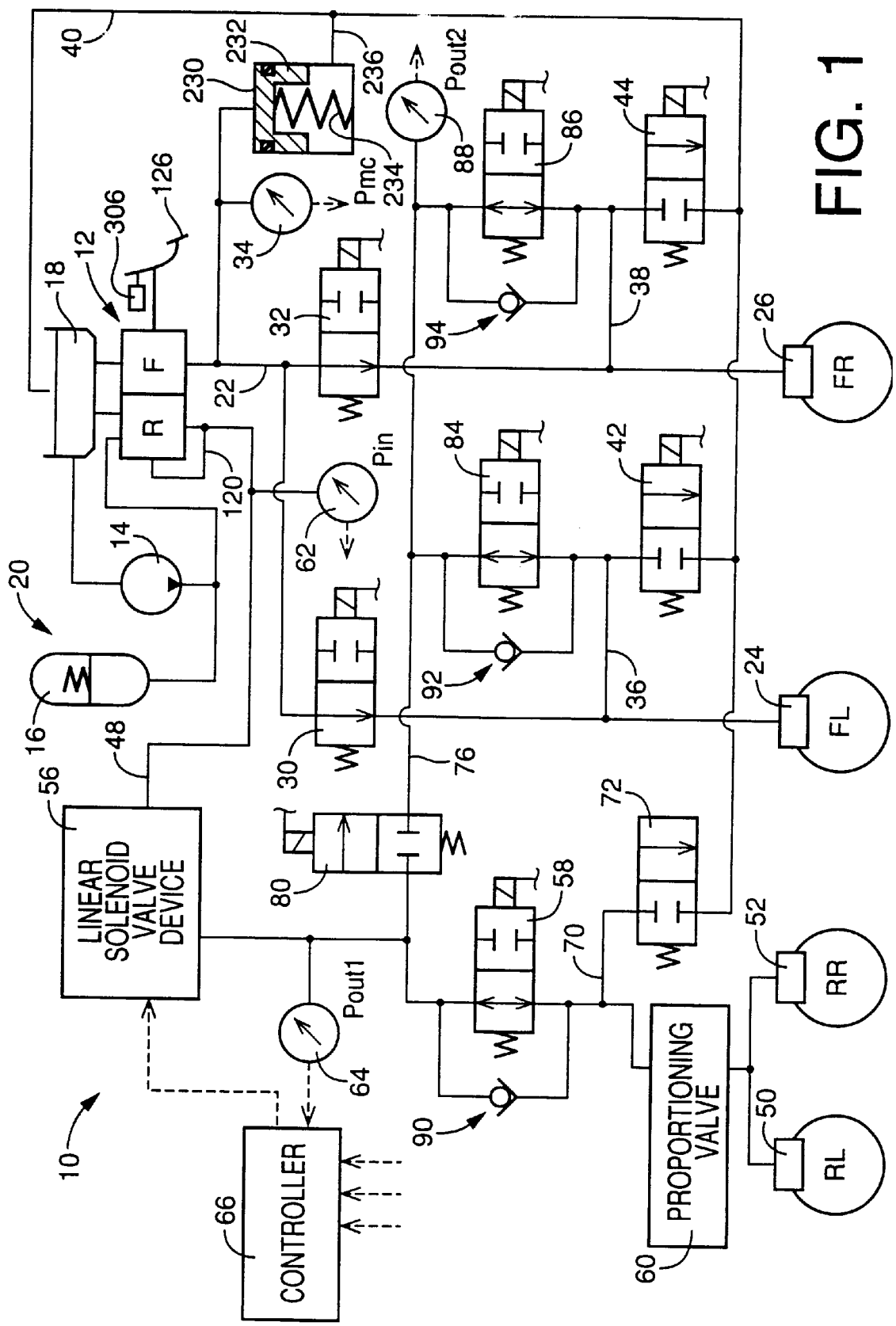
FIG. 1 is a diagram showing a hydraulically operated braking system constructed according to one embodiment of the present invention.

Referring first to the diagram of FIG. 1, there is shown a hydraulically operated braking system for a motor vehicle, which is constructed according to one preferred embodiment of this invention. The motor vehicle is a so-called hybrid vehicle equipped with an internal combustion engine and an electric motor as a power drive source. The hybrid vehicle includes a regenerative braking system (not shown) as well known in the art, as well as the present hydraulically operated braking system (hereinafter referred to as "hydraulic braking system" where appropriate), which is generally indicated at 10 in FIG. 1. The regenerative braking system uses the electric motor as an electric generator or dynamo, which is operated in a regenerative braking mode so as to provide a regenerative brake. The electric energy generated by the electric generator in the regenerative braking mode is stored in a battery. Described more specifically, the drive shaft of the electric motor placed in the regenerative braking mode is forcibly driven by a kinetic energy of the running vehicle during deceleration of the vehicle, and the electric motor is operated as the electric generator to generate an electromotive force (regenerative electromotive force), which is utilized to charge the battery. In the regenerative braking mode, the electric motor functions as a load, and therefore applies a regenerative brake to the vehicle. In other words, a portion of the kinetic energy of the vehicle under deceleration is converted into an electric energy stored in the battery. Thus, the regenerative braking system not only functions to apply brake to the vehicle, but also functions to charge the battery, so as to prevent excessive reduction of the electric energy amount stored in the battery, making it possible to increase the running distance of the vehicle without charging of the battery by an external charging device.

The regenerative braking force is not always constant. For instance, the regenerative braking force tends to increase with an increase in the rotating speed of the electric motor. When the running speed of the vehicle is extremely low, for example, the regenerative braking force is almost zero. When the battery is fully charged, the hybrid drive system of the vehicle is generally inhibited from being operated in the regenerative braking mode, in order to prevent deterioration of the battery due to excessive charging thereof with the electric energy generated by the regenerative braking system. While the regenerative braking is inhibited, the regenerative braking force is zero. On the other hand, the braking force generated by the hydraulic braking system 10 has to be controlled to a value which is desired by the vehicle operator and which does not have a direct relationship with the regenerative braking force. Therefore, the hydraulic braking force that must be generated by the hydraulic braking system 10 is equal to the operator's desired braking force minus the regenerative braking force. The control mode in which the hydraulic braking system 10 is controlled to provide the hydraulic braking force equal to the operator's desired braking force minus the regenerative braking force will be referred to as "cooperative control mode", which is the mode in which the hydraulic braking system 10 is operated in cooperation with the regenerative braking system. The operator's desired braking force can be readily obtained from the operating state of the brake operating member, such as the operating force, amount and time of the brake operating member. Information regarding the regenerative braking force can be obtained from the regenerative braking system of the hybrid drive device.

Figure 5:
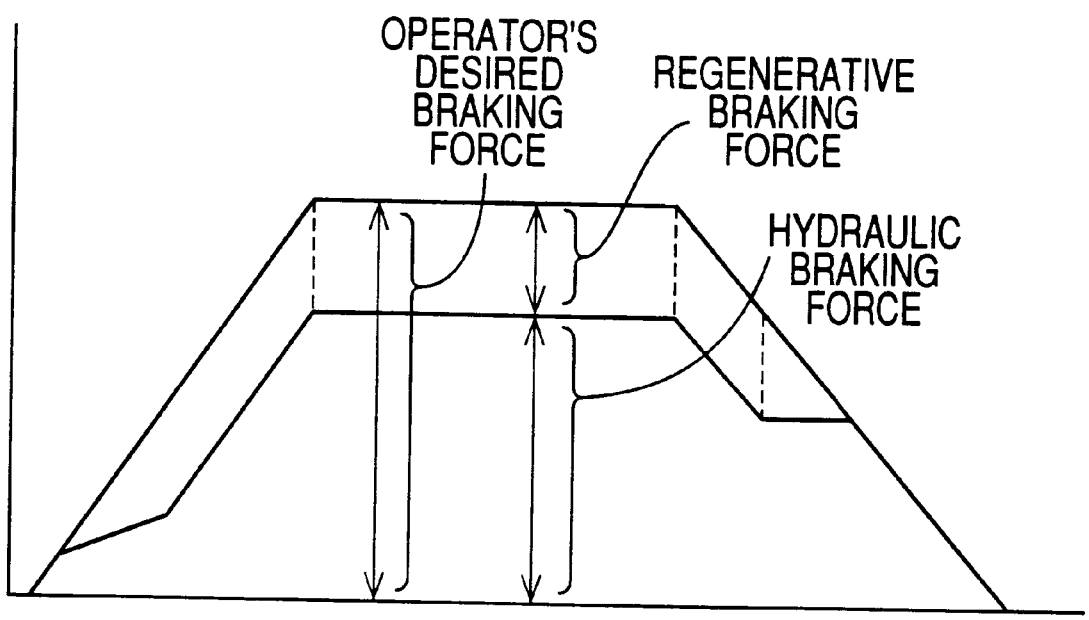
FIG. 5 is a graph schematically indicating an pressure control operation of a controller in the braking system of FIG. 1.

Referring to the graph of FIG. 5, there is schematically indicated a relationship among the operator's desired braking force (total braking force), the regenerative braking force generated by the regenerative braking system, and the hydraulic braking force generated by the hydraulic braking system 10. It will be understood from the graph that the hydraulic braking force and the regenerative braking force increase with an increase in the operator's desired braking force as obtained from the operating state of the brake operating member. In the example of FIG. 5, the regenerative braking force begins to increase a given time after the hydraulic braking force begins to increase. However, this arrangement is not essential. After the regenerative braking force has increased to a maximum value which is determined by the vehicle running speed, for example, the total braking force desired by the vehicle operator is increased by an increase of the hydraulic braking force only. Thus, the utilization of the regenerative braking force is maximized in the present arrangement, for braking the vehicle. Since the vehicle speed is gradually lowered with the total braking force being applied to the vehicle, the regenerative braking force is also gradually reduced. In the graph of FIG. 5, however, the regenerative braking force is indicated so as to be held constant, for simplicity of the explanation. When the operator's desired braking force is reduced, the hydraulic braking force is first reduced. After the reduction of the hydraulic braking force has become impossible for the reason which will be described, the regenerative braking force is reduced. After the regenerative braking force has been reduced to zero, the hydraulic braking force is reduced such that the hydraulic braking force is held substantially equal to the operator's desired braking force. This aspect will also be described.

The hydraulic braking system 10 includes a master cylinder 12, a pump 14, and an accumulator 16 for storing a highly pressurized working fluid delivered from the pump 14. The master cylinder 12 and the pump 14 are supplied with the fluid from a master reservoir 18. The master cylinder 12 has a front pressure portion F and a rear pressure portion R which will be described. The pressure of the fluid stored in the accumulator 16 is maintained by an operation of the pump 14 as needed, within a predetermined range, for example, between 17 MPa and 18 MPa (between 174 $kgf/cm^2$ and 184 $kgf/cm^2$). The accumulator 16 is provided with a pressure switch, so that the pump 14 is turned on and off in response to a switching operation (on and off states) of the pressure switch, with a given hysteresis. The pump 14 and the accumulator 16 cooperate to constitute a constant pressure source 20 which provides the working fluid having a substantially constant pressure.

The front pressure portion F of the master cylinder 12 is connected through a fluid passage 22 to a brake cylinder 24 for a front left wheel of the vehicle and a brake cylinder 26 for a front right wheel of the vehicle. The brake cylinders 24, 26 will be referred to as "FL wheel brake cylinder 24" and "FR wheel brake cylinder 26", respectively. The fluid passage 22 has a common portion connected to the front pressure portion F, and two branch portions extending from the common portion and connected to the respective FL and FR wheel brake cylinders 24, 26. A normally open solenoid-operated shut-off valve 30 is connected to the branch portion of the fluid passage 22 which is connected to the FL wheel brake cylinder 24, while a normally open solenoid-operated shut-off valve 32 is connected to the branch portion of the fluid passage which is connected to the FR wheel brake cylinder 26. A pressure sensor 34 is connected to the common portion of the fluid passage 22, to detect the pressure of the fluid in the common portion. This fluid pressure will be referred to as "master cylinder pressure Pmc". To the master reservoir 18, there is connected a fluid passage 40 which is connected through fluid passages 36, 38 to the respective two branch portions of the fluid passage 22, at a position between the shut-off valve 32 and the FL wheel brake cylinder 24, and at a position between the shut-off valve 32 and the FR wheel brake cylinder 26, respectively. Normally closed solenoid-operated shut-off valves 42, 44 are connected to the fluid passages 36, 38, respectively.

On the other hand, the rear pressure portion R of the master cylinder 12 is connected through a fluid passage 48 to a brake cylinder 50 for a rear left wheel of the vehicle and a brake cylinder 52 for a rear right wheel of the vehicle. The brake cylinders 50, 52 will be referred to as "RL wheel brake cylinder 50" and "RR wheel brake cylinder 52", respectively. The fluid passage 48 has a common portion connected to the rear pressure portion R, and two branch portions extending from the common portion and connected to the respective RL and RR wheel brake cylinders 50, 52. To the common portion of the fluid passage 48, there are connected a linear solenoid valve device 56, a normally open solenoid-operated shut-off valve 58 and a proportioning valve 60. A pressure sensor 62 is connected to a part of the common portion of the fluid passage 48 between the master cylinder 12 and the linear solenoid valve device 56, while a pressure sensor 64 is connected to a part of the common portion between the linear solenoid valve device 56 and the shut-off valve 58. The fluid pressure detected by the pressure sensor 62 will be referred to as "input fluid pressure Pin", while the pressure detected by the pressure sensor 64 will be referred to as "output fluid pressure Pout1". In other words, the pressure sensors 62, 64 are provided to detect the input and output fluid pressures Pin and Pout1 on the opposite sides of the linear solenoid valve device 56. The output signals of the pressure sensors 34, 62, 64 which represent the master cylinder pressure Pmc and the input and output fluid pressures Pin, Pout1 are applied to a controller 66. As described below, the controller 66 is adapted to control the linear solenoid valve device 56 on the basis of the output signal of the linear solenoid valve device 56. The fluid passage 40 is connected through a fluid passage 70 to a part of the common portion of the fluid passage 48 between the shut-off valve 58 and the proportioning valve 60. A normally closed solenoid-operated shut-off valve 72 is connected to the fluid passage 70.

A fluid passage 76 is connected to a part of the fluid passage 48 between the linear solenoid valve device 56 and the solenoid-operated shut-off valve 58. The fluid passage 76 has a common portion connected to the fluid passage 48, and two branch portions extending from the common portion. A normally closed solenoid-operated shut-off valve 80 is connected to the common portion of the fluid passage 76. One of the two branch portions of the fluid passage 76 is connected to the FR wheel brake cylinder 24 through the fluid passages 36, 22. A normally open solenoid-operated shut-off valve 84 is connected to this branch portion of the fluid passage 76. The other of the branch portions is connected to the FR wheel brake cylinder 26 through the fluid passages 38, 22. A normally open solenoid-operated shut-off valve 86 is connected to this branch portion. The solenoid-operated shut-off valves 30, 32, 42, 44, 58, 72, 80, 84, 86 described above are controlled by the controller 66.

A pressure sensor 88 is connected to a part of the fluid passage 76 between the shut-off valve 80 and the shut-off valves 84, 86. The fluid pressure detected by the pressure sensor 88 will be referred to as "output fluid pressure Pout2". The output signal of the pressure sensor 88 is applied to the controller 66. The output fluid pressure Pout2 is used to check if the output signal of the pressure sensor 64 is normal. That is, the controller 66 determines that the output of the pressure sensor 64 is abnormal, if the output fluid pressure Pout1 detected by the pressure sensor 64 when the shut-off valve 80 is open differs from the output fluid pressure Pout2 detected by the pressure sensor 88. When the shut-off valve 80 is open, the two pressure sensors 64, 88 communicate with each other, so that the output fluid pressures Pout1 and Pout2 must be substantially the same if the pressure sensors 64, 88 are both normally functioning. In the present embodiment, the controller 66 is adapted to activate a suitable indicator for informing the vehicle operator of any abnormality of the pressure sensor, when the controller 66 has determined the presence of the abnormality. However, the controller 66 may be adapted to inhibit its operation of controlling the linear solenoid valve device 56, as well as or rather than to active such an indicator.

To the common portion of the fluid passage 48, there is connected a by-pass passage which by-passes the normally open shut-off valve 58. To the two branch portions of the fluid passage 76, there are connected respective by-pass passages which by-pass the respective normally open shut-off valves 84, 86. These by-pass passages 90, 92, 94 are provided with respective check valves 90, 92, 94, which permit a flow of the fluid in a direction from the corresponding wheel brake cylinder 24, 26 or cylinders 50, 52 toward the master cylinder 12, but inhibits a flow of the fluid in the opposite direction. The front pressure portion F of the master cylinder 12 is connected to only the master reservoir 18, while the rear pressure portion R is connected to not only the master reservoir 18 but also the constant pressure source 20.

Figure 2:
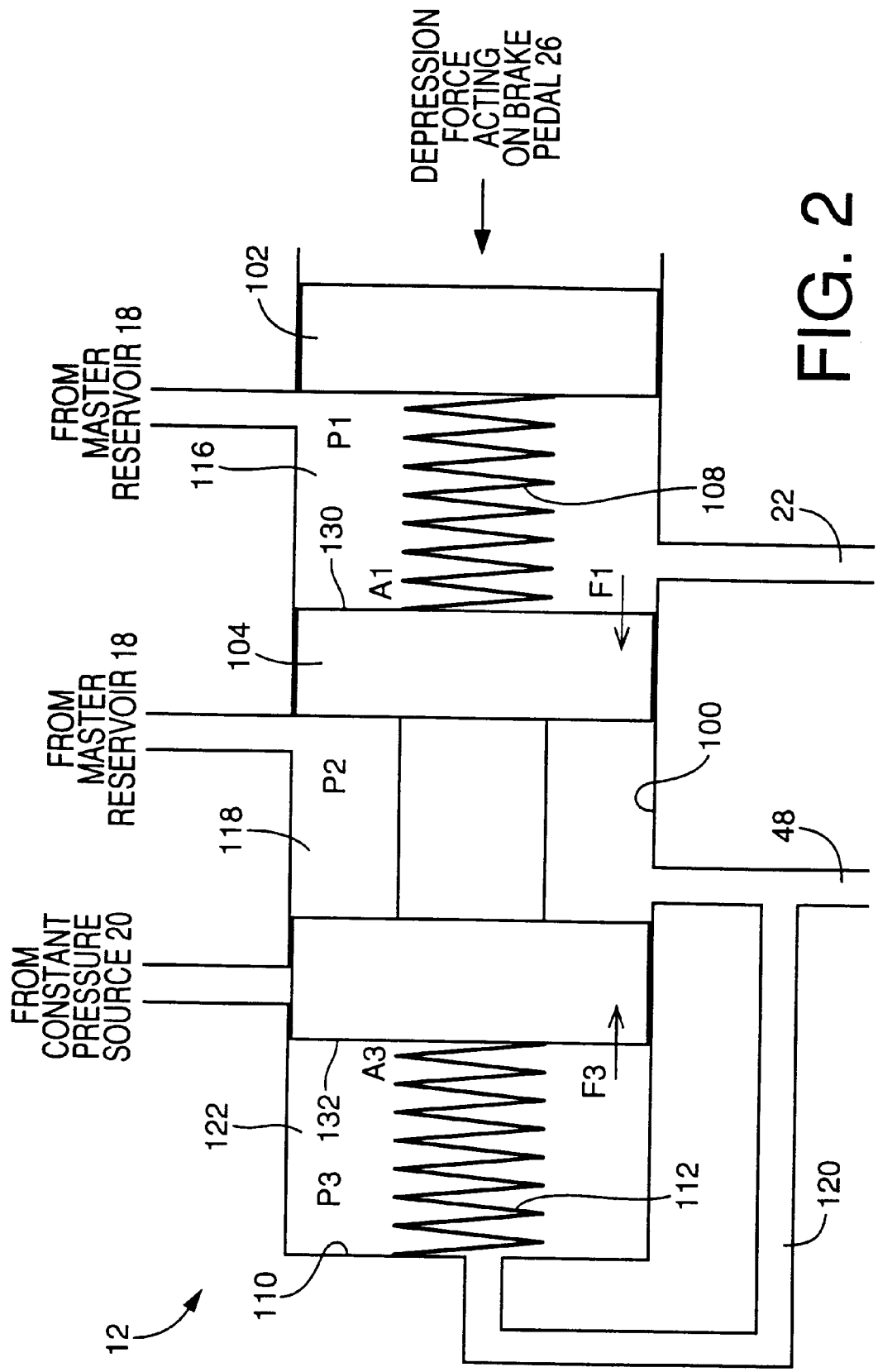
FIG. 2 is a front elevational view in cross section schematically illustrating an internal construction of a master cylinder in the braking system of FIG. 1.

Referring next to the cross sectional view schematically showing the internal construction of the master cylinder 12, it has a hole 100 formed in its housing, and includes a plunger 102 and a spool 104 which are slidably and fluid-tightly received in the hole 100. A spring 108 is interposed between the plunger 102 and the spool 104, while a spring 112 is interposed between the spool 104 and a bottom surface 110 of the hole 100. The two springs 108 and 112 are identical with each other. The plunger 102 and the spool 104 cooperate with the housing to define a first fluid chamber 116 which communicates with the master reservoir 18 when the master cylinder 12 is placed in a state of FIG. 2. This first fluid chamber 116 is filled with the fluid received from the master reservoir 18, and is held in communication with the fluid passage 22 (FIG. 1), irrespective of the position of the plunger 102 within the hole 100.

The spool 104 include opposite end portions and an intermediate portion having a smaller diameter than the end portions. These end and intermediate portions of the spool 104 cooperate with the housing of the master cylinder 12 to define an annular second fluid chamber 118, which communicates with the master reservoir 18 when the master cylinder 12 is laced in the state of FIG. 2. This second fluid chamber 118 is also filled with the fluid, and is held in communication with the fluid passage 48 (FIG. 1) irrespective of the position of the spool 104 within the hole 100. The end face of the end portion of the spool 104 facing the bottom surface 110 cooperates with this bottom surface 110 to partially define a third fluid chamber 122, which is connected to the fluid passage 48 through a fluid passage 120 and is also filled with the fluid. The fluid pressures within the first, second and third fluid chambers 116, 118, 122 will be referred to as "first fluid pressure P1", "second fluid pressure P2" and "third fluid pressure P3", respectively. With the second and third fluid chambers 118, 122 communicating with each other through the fluid passages 48, 120, the second and third fluid pressures P2, P3 are equal to each other. The front pressure portion F of the master cylinder 12 is a portion for generating the first fluid pressure P1 in the first fluid chamber 116, while the rear pressure portion R is a portion for generating the second and third fluid pressures P2, P3 in the second and third fluid chambers 118, 122.

A brake operating member in the form of a brake pedal 126 (FIG. 1) is operatively connected to the plunger 102 through a vacuum booster (not shown). When the brake pedal pedal 126 is depressed by the vehicle operator, a depression force acting on the brake pedal 126 is boosted by the vacuum booster, and the boosted force acts on the plunger 102 in a direction indicated by arrow in FIG. 2. As a result, the plunger 102 is moved in the direction of the arrow, while compressing the spring 108, and the spool 104 is moved in the direction of the arrow by the elastic force of the spring 108, whereby the spring 112 is compressed. The movement of the plunger 102 causes the first fluid chamber 116 to be disconnected from the master reservoir 18, and initiates an increase in the first fluid pressure P1 from the atmospheric pressure level. The first fluid pressure P1 acts on an end face 130 of the spool 104 partially defines the first fluid chamber 116, in the direction in which the boosted pedal depression force acts on the plunger 102. This first fluid pressure P1 produces a biasing force F1 acting on the spool 104 in the above-indicated direction. The biasing force F1 is equal to P1·A1, where A1 represents the surface area of the end face 130. The movement of the spool 104 by the elastic force of the spring 108 and the biasing force F1 causes the second fluid chamber 118 to be disconnected from the master reservoir 18, and increases the second and third fluid pressures P2, P3. A further movement of the spool 104 causes the second fluid chamber 118 to communicate with the constant pressure source 20, so that the fluid pressure in the constant pressure source 20 which is higher than the first fluid pressure P1 is applied to the second fluid chamber 118, and also to the third fluid chamber 122 through the fluid passages 48, 120, whereby the second and third fluid pressures P2, P3 are accordingly increased.

While the second fluid chamber 118 is in communication with the constant pressure source 20, the spool 104 which is slidably movable within the hole 100 is subjected to the above-indicated biasing force F1, the elastic forces of the springs 108, 112 (which are represented by f1 and f3, respectively) and the biasing force (represented by F3) based on the third fluid pressure P3. The forces which act on the mutually facing surfaces of the end portions of the spool 104 based on the second fluid pressure P2 are ignored since these forces have the same magnitude and act in the opposite directions. The biasing force F3 is equal to P3·A3, where A3 represents the surface area of an end face 132 of the spool 104 on the side of the spring 112. Since the surface area A3 of the end face 132 is equal to the surface area A1 of the end face 130, these surface areas A3, A1 may be represented by A. The spool 104 is moved to a position of equilibrium at which the following equation (1) of balance of forces is satisfied:

$$P1 \cdot A + f1 = P3 \cdot A + f3 \tag{1}$$

The elastic forces f1 and f3 of the springs 108, 112 are determined to be smaller than the biasing force F1 which is produced based on the boosted pedal depression force acting on the brake pedal 126 upon normal operation thereof by the vehicle operator. If these elastic forces f1, f3 are ignored for easier explanation, the following equation (2) may be derived from the above equation (1):

$$P1 = P3 \tag{2}$$

That is, the spool 104 is moved to the position at which the first fluid pressure P1 is equal to the third fluid pressure P3 (which is equal to the second fluid pressure P2).

The plunger 102 approaches the spool 104 as the volume of the first fluid chamber 116 is reduced. However, the spool 104 remains at the position at which the second fluid chamber 118 is disconnected from both of the master reservoir 18 and the constant pressure source 20. Thus, the fluid pressurized in the first fluid chamber 116 is fed toward the FL and FR wheel brake cylinders 24, 26, while the pressurized fluid from the constant pressure source 20 is fed toward the RL and RR wheel brake cylinders 50, 52, so that the required operating stroke of the brake pedal 126 is reduced.

In the event of a failure of the constant pressure source 20 to supply the pressurized fluid due to abnormality of the pump 14, for example, the spool 14 is moved to a position at which the first, second and third fluid pressures P1, P2, P3 are equal to each other, so that the pressurized fluid in the first fluid chamber 116 is fed into the fluid passage, while the pressurized fluid in the third fluid chamber 122 is fed into the fluid passage 48. In this case, the first and third fluid chambers 116, 122 perform the same functions as the two fluid chambers of a conventional master cylinder of tandem type.

Figure 3:
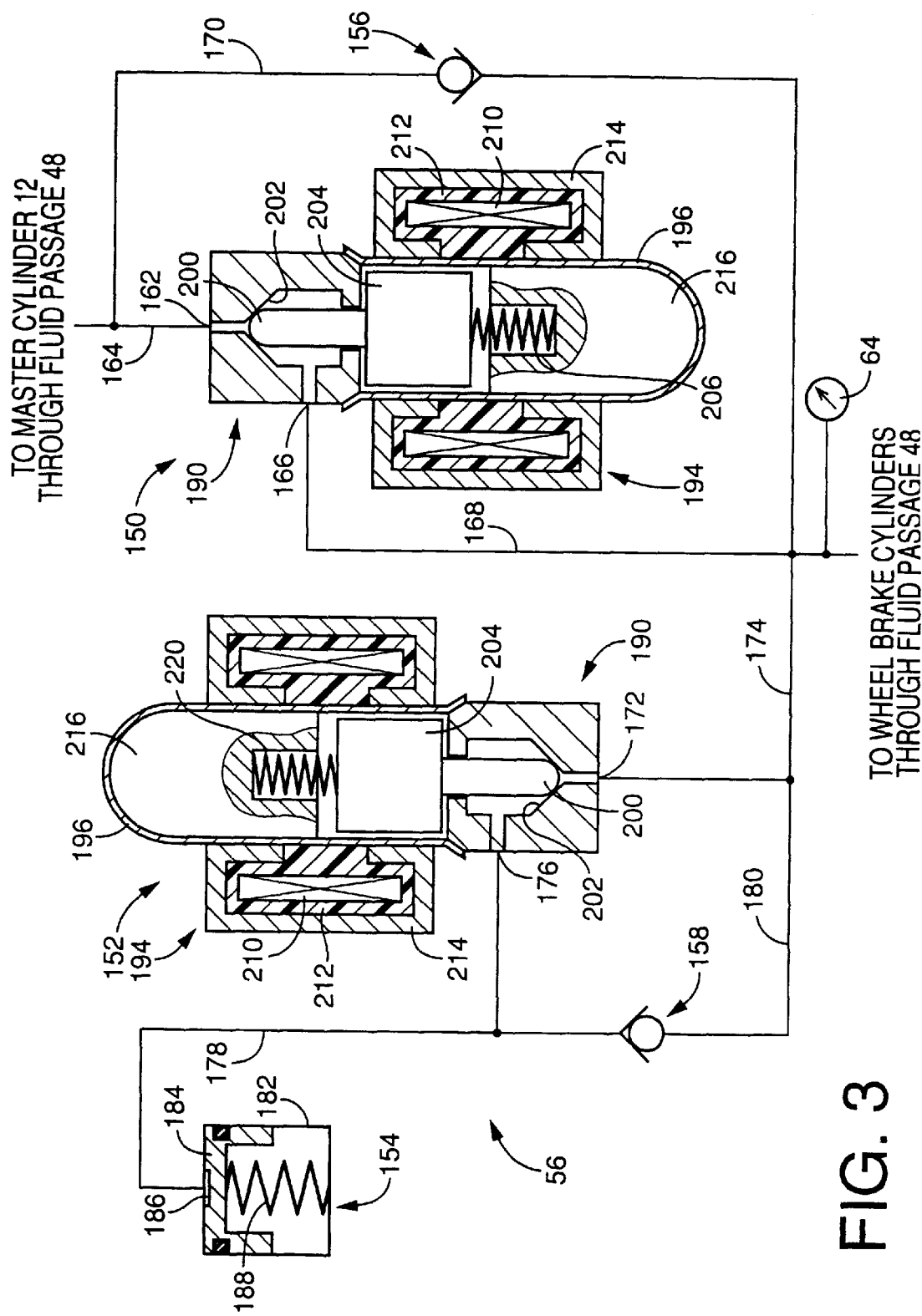
FIG. 3 is a view schematically showing an arrangement of a linear solenoid valve device in the braking system of FIG. 1.

Referring to FIG. 3, there is schematically shown the arrangement of the linear solenoid valve device 56, which includes a pressure-increasing linear solenoid valve 150, a pressure-reducing linear solenoid valve 152, a pressure-reducing reservoir and check valves 156, 158. The pressure-increasing linear solenoid valve 150 has a first port 162 connected through a fluid passage 164 to the part of the fluid passage 48 which is connected to the master cylinder 12. The linear solenoid valve 150 further has a second port 166 connected through a fluid passage 168 to the part of the fluid passage 48 which is connected to the pressure sensor 64. The fluid passages 164 and 168 are connected to each other by a by-pass passage 170, which is provided with the check valve 156 which permits a flow of the fluid in a direction from the fluid passage 168 toward the fluid passage 164 and inhibits a flow of the fluid in the opposite direction. The pressure-reducing linear solenoid valve 152 has a first port 172 connected through a fluid passage 174 to the fluid passage 168, and a second port 176 connected through a fluid passage 178 to the pressure-reducing reservoir 154. The fluid passages 174 and 178 are connected to each other by a fluid passage 180, which is provided with the check valve 158 which permits a flow of the fluid in a direction from the fluid passage 178 toward the fluid passage 174 and inhibits a flow of the fluid in the opposite direction.

The pressure-reducing reservoir 154 includes a housing 182, and a piston 184 fluid-tightly and slidably received in the housing 182. The housing 182 and the piston 184 cooperate to define a fluid chamber 186 whose volume changes as the piston 184 is moved. The piston 184 is biased by a compression coil spring 188 in a direction of reducing the volume of the fluid chamber 186. Accordingly, the fluid accommodated in the fluid chamber 186 is pressurized by an elastic force of the spring 188. However, the elastic force of the spring 188 is comparatively small, and the fluid pressure in the fluid chamber 186 based on the elastic force of the spring 188 is accordingly low and can be ignored, as compared with the pressures in the master cylinder 12 and wheel brake cylinders 24, 26, 50, 52 during brake application. However, the fluid pressure in the fluid chamber 186 is higher than a sum of the pressure differences across the check valves 156, 158, at which the check valves 156, 158 are opened. Therefore, when the fluid pressure in the fluid passage 48 has been lowered to a level around the atmospheric pressure, the check valves 156, 158 are opened by the fluid pressure in the fluid chamber 186, and the fluid is returned from the fluid chamber 186 to the master reservoir 18.

The volume of the fluid chamber 186 of the pressure-reducing reservoir 154 is the smallest when the piston 184 is placed at its fully advanced position under the biasing action of the compression coil spring 188. In the present embodiment, the volume is reduced to zero when the piston 184 has been moved to its fully advanced position, and is increased to the largest value when the piston 184 has been moved to its fully retracted position by the biasing or elastic force of the spring 188. The capacity of the reservoir 154 is equal to the largest value minus the smallest value. The maximum amount of the fluid that can be accommodated in the reservoir 154 during a braking operation is equal to this capacity. In the present embodiment, the capacity of the reservoir 154 is smaller than the total capacity of the four wheel brake cylinders 24, 26, 50, 52. The capacity of each wheel brake cylinder means the maximum amount of the fluid that can be accommodated in the wheel brake cylinder when the cylinder is operated from its non-operated position to the fully operated position.

The pressure-increasing linear solenoid valve 150 includes a seating valve 190, an electromagnetic biasing device 194, and a housing 196 which also functions as a connector for connecting the seating valve 190 and the electromagnetic biasing device 194 into an integral assembly. The seating valve 190 includes a valve member 200, a valve seat 202, a biased member 204 movable with the valve member 200, and a spring 206 which functions as an elastic member for biasing the biased member 204 in a direction of moving the valve member 200 to be seated on the valve seat 202. The electromagnetic biasing device 194 includes a solenoid coil 210, a holder member 212 made of a resin material for holding the solenoid coil 210, a first magnetic path defining member 214 and a second magnetic path defining member 216. When an electric current flows through the solenoid coil 210 with a voltage being applied thereto at its opposite ends, a magnetic field is produced. A most of the magnetic flux passes the first and second magnetic path defining members 214, 216, the biased member 204, and an air gap between the second magnetic path defining member 216 and the biased member 204. By changing the voltage applied across the solenoid coil 210, the magnetic force acting between the biased member 204 and the second magnetic path defining member 216 changes accordingly. This magnetic force increases with an increase in the voltage applied across the solenoid coil 210. The relationship between the magnetic force and the voltage can be known. By continuously changing the voltage applied to the solenoid coil 210, the force biasing the biased member 204 can be changed accordingly. Basically, the pressure-reducing linear solenoid valve 152 is identical in construction with the pressure-reducing linear solenoid valve 150, except for a spring 220 functioning as the biasing member. The spring 220 has a biasing force different from that of the spring 206 of the pressure-increasing linear solenoid valve 150. The same reference numerals as used for the pressure-increasing linear solenoid valve 150 are used to identify the functionally corresponding elements of the pressure-reducing linear solenoid valve 152, and redundant description of these elements will not be provided.

The pressure-increasing linear solenoid valve 150 is opened when a biasing force acting on the valve member 200 based on a difference between the fluid pressures at the first and second ports 162, 166 becomes higher than the biasing force of the spring 206, with the fluid pressure at the first port 162 being higher than that at the second port 166. This pressure difference will be referred to as "opening pressure difference" of the valve 150. In the present embodiment, the opening pressure difference of the valve 150 is set to be about 3 MPa (about 30.6 kgf/cm$^2$), while an opening pressure difference of the pressure-reducing linear solenoid valve 152 is set to be larger than 18 MPa (about 184 kgf/cm$^2$), which is the maximum pressure of the fluid received from the constant pressure source 20. In this respect, it is noted that the biasing force of the spring 220 is higher than (about six times as high as) the biasing force of the spring 206. In the present hydraulic braking system 10, the maximum pressure of the fluid to be applied to the first port 172 of the pressure-reducing linear solenoid valve device 152 is the maximum pressure of the fluid pressurized by the pump 14 and accommodated in the accumulator 16. There exists substantially no possibility that the fluid pressure pressurized by the master cylinder 12 upon depression of the brake pedal 126 by the vehicle operator exceeds the maximum pressure in the accumulator 16. Namely, the depression of the brake pedal 126 will not generally cause a rise of the fluid pressure applied to the first port 172 of the valve 152, by an amount larger than the opening pressure difference of the valve 152. When a brake is released from the rear wheels RL, RR, the fluid which has been accommodated in the pressure-reducing reservoir 154 due to opening of the valve 150 is returned to the master reservoir 18 through the fluid passages 178, 180, check valve 158, fluid passages 174, 170, check valve 156, fluid passage 48 and rear pressure portion R of the master cylinder 12.

When hydraulic braking system 10 is normally operated to apply an ordinary brake to the vehicle, in the cooperative control mode together with the regenerative braking system, the solenoid-operated shut-off valves 30, 32 are held in the closed state while the solenoid-operated shut-off valve 80 is held in the open state. In this case, the other shut-off valves are placed in the states of FIG. 1. Accordingly, the FL and FR wheel brake cylinders 24, 26 are supplied with the pressurized fluid received from the rear pressure portion R through the fluid passage 48, but not the pressurized fluid received from the front pressure portion F through the fluid passage 22. In other words, the front wheel brake cylinders 24, 26 as well as the rear wheel brake cylinders 50, 52 are supplied with the pressurized fluid delivered from the constant pressure source 20. This, the fluid pressures in all of the four wheel brake cylinders 24 26, 50, 52 are controlled by the pressure-increasing valve 150 and pressure-reducing valve 152 of the linear solenoid valve device 56.

As shown in FIG. 1, a stroke simulator 230 is connected to the fluid passage 22, for permitting the brake pedal 126 to be depressed even while the solenoid-operated shut-off valves 30, 32 are held closed, that is, for preventing the brake pedal 126 from being locked at its non-operated position with its operating amount being substantially zero. The stroke simulator 230 is a fluid container whose volume changes with a movement of its plunger 232. The plunger 232 is biased by a spring 234 toward its non-operated position in which the volume of the stroke simulator 230 is the smallest or zero. The volume of the fluid accommodated in the stroke simulator 230 increases as the pressure (master cylinder pressure Pmc) of the fluid delivered from the front pressure portion F is increased to advance the plunger 232 away from its non-operated position against the biasing force of the spring 234. Thus, the stroke simulator 230 prevents locking of the brake pedal 126 or permits the operation of the brake pedal 126 even while the shut-off valves 30, 32 are held closed with the braking system 10 placed in the cooperative control mode. Accordingly, the vehicle operator who is depressing the brake pedal 126 in the cooperative braking mode would not be surprised with the otherwise possible locking of the brake pedal 126. The space of the stroke simulator 230 in which the spring 234 is disposed is held in communication with the fluid passage 40 through a fluid passage 236, so that the fluid which may leak into that space through a gap between the plunger 234 and the housing of the stroke simulator 230 is returned to the master reservoir 18, preventing reduction of the amount of the fluid within the braking system 10.

When the hydraulic braking system 10 is normally operated in both the cooperative control mode and the anti-lock control mode, the controller 60 controls the solenoid-operated shut-off valves 42, 44, 58, 72, 84, 86 independently of each other as needed, while the solenoid-operated shut-off valves 30, 32 are held closed with the solenoid-operated shut-off valve 80 held open. Where the pressures in the RL and RR wheel brake cylinders 50, 52 are increased while the pressures in the FL and FR wheel brake cylinders 24, 26 are held unchanged or constant, for example, the shut-off valve 58 is opened while the other shut-off valves 42, 44, 72, 84, 86 are closed. When the pressures in the RL and RR wheel brake cylinders 50, 52 are reduced while the pressures in the FL and FR wheel brake cylinders 24, 26 are held unchanged, the shut-off valve 72 is opened while the other shut-off valves 42, 44, 58, 84, 86 are closed. When the pressures in all of the four wheel brake cylinders 24, 26, 50, 52 are held unchanged, the shut-off valves 42, 44, 58, 72, 84, 86 are all held closed. When the pressures in the FL and FR wheel brake cylinders 24, 26 are increased and held unchanged, respectively, while the pressures in the RL and RR wheel brake cylinders 50, 52 are reduced, the shut-off valves 72, 84 are opened while the shut-off valves 42, 44, 58, 86 are closed. Further, the three pressures, that is, the pressure in the RL and RR wheel brake cylinders 50, 52, the pressure in the FL wheel brake cylinder 24 and the pressure in the FR wheel brake cylinder 26 can be controlled independently of each other by controlling the solenoid-operated shut-off valves 42, 44, 58, 72, 84, 86 independently of each other.

In the event of a failure of the controller 66 of the present hydraulic braking system 10 to control any of the solenoid-operated shut-off valves and the linear solenoid valve device 56, the shut-off valves are placed in the states indicated in FIG. 1, and the solenoid coils 210 of the pressure-increasing and pressure-reducing valves 150, 152 are de-energized. In this event, the constant pressure source 20 may be adapted to be held in the operated state or non-operated state. Even if the constant pressure source 20 is held in its non-operated state upon failure of the controller 66, the master cylinder 12 is adapted such that pressurized fluids having substantially the same pressure are generated from the front and rear pressure portions F, R of the master cylinder 12, like an ordinary master cylinder of tandem type. With the shut-off valves being placed in the operating states of FIG. 1, the fluid pressurized by the front pressure portion F is delivered to the FL and FR wheel brake cylinders 24, 26, while the fluid pressurized by the rear pressure portion R is delivered to the RL and RR wheel brake cylinders 50, 52 through the pressure-increasing linear solenoid valve 150. The fluid pressure to be applied to the FL and FR wheel brake cylinders 24, 26 is substantially the same as the pressure generated by the front pressure portion F. However, the fluid pressure to be applied to the RL and RR wheel brake cylinders 50, 52 is lower than the pressure generated by the rear pressure portion R, by an amount equal to the opening pressure difference of about 3 MPa of the pressure-increasing linear solenoid valve 150. Thus, the pressure to be applied to the front wheel brake cylinders 24, 26 is different from the pressure to be applied to the rear wheel brake cylinders 50, 52. Since the front and rear wheel brake cylinders are all supplied with the pressurized fluid and since the pressure to be applied to the front wheel brake cylinders 24, 26 is not made lower than the pressure generated by the front pressure portion F, the failure of the controller 66 would not cause a considerable amount of reduction of the total braking force. It is further noted that the vehicle running stability during braking in the event of the failure of the controller 66 would not deteriorated by the reduction of the fluid pressure in the rear wheel brake cylinders 50, 52 with respect to the pressure generated by the rear pressure portion R.

In the event of a failure of the constant pressure source 20 which disables the rear pressure portion R to generate the pressurized fluid, the controller 66 is adapted to de-energize all of the solenoid-operated shut-off valves and the linear solenoid valve device 56. In this event, the hydraulic braking system 10 is operated in the same manner as in the case where the constant pressure source 20 is placed in the non-operated state due to a failure of the controller 66, as described above. However, since the controller 66 is normal, the controller 66 may be adapted to control the solenoid-operated shut-off valves and the linear solenoid valve device 56 in the normal manner. In this case, the required amount of operation of the brake pedal 126 is larger by an amount corresponding to the amount of the pressurized fluid which would be normally delivered from the constant pressure source 20 to the rear pressure portion R of the master cylinder 12. To minimize the required operating amount of the brake pedal 126, in this case, it is desirable to provide a normally open solenoid-operated shut-off valve between the fluid passage 22 and the stroke simulator 230, so that this shut-off valve is closed upon a failure of the constant pressure source 20, to prevent the fluid from flowing into the stroke simulator 230.

Referring to the front elevational view in cross section of FIG. 4, the arrangement of the pressure-increasing linear solenoid valve 150 of FIG. 3 will be described in detail. The same reference numerals as used in FIG. 3 are used in FIG. 4 to identify the same elements. The arrangement of the pressure-reducing linear solenoid valve 152 of FIG. 3 is substantially the same as that of the valve 150 shown in FIG. 4, provided the spring3 220 and the first and second ports 172, 176 are substituted for the spring 206 and the first and second ports 162, 166 in FIG. 4.

Figure 4:
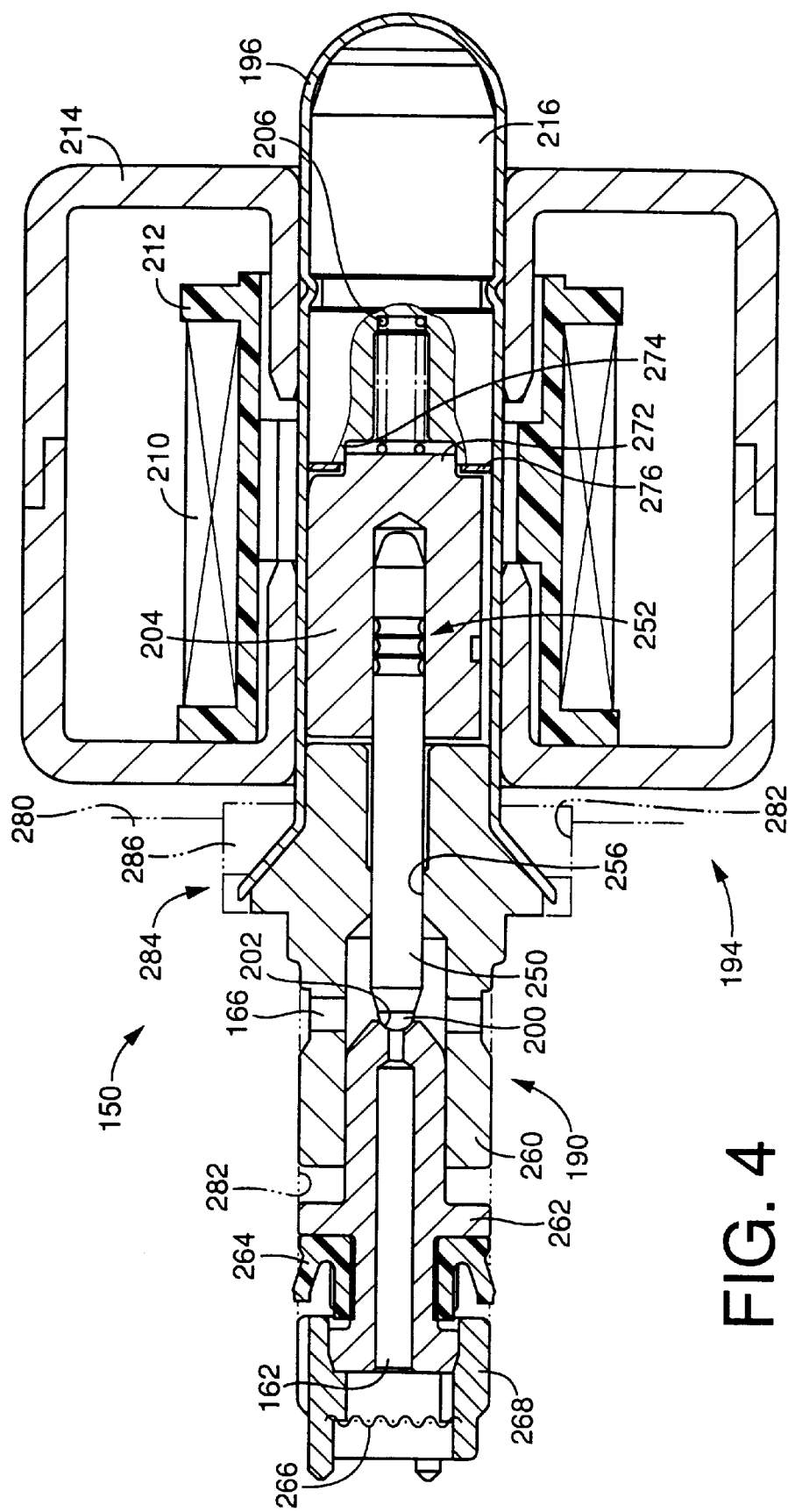
FIG. 4 is a front elevational view in cross section showing details of a pressure-increasing linear solenoid valve shown in FIG. 3.

As shown in FIG. 4, the valve member 200 of the seating valve 190 is formed integrally with a rod 250 which has a stepped section 252 formed on an end portion thereof. This end portion of the rod 250 is inserted in a hole formed in the biased member 204, and is fixed therein by reducing the inside diameter of the hole at a part thereof corresponding to the stepped portion 252, by plastic deformation or calking at the corresponding portion of the biased member 204. Thus, the rod 250 carrying the valve member 200 is non-removably fixed to the biased member 204. The rod 250 is further supported by a first member 260 such that the rod 250 is axially slidable in a hole 256 formed through the first member 260. The second port 166 consists of radial two holes which are formed through the cylindrical wall of the first member 260 and which communicate with the hole 256. The valve seat 202 is formed on a second member 262 which is positioned such that the valve seat 202 is opposite to the valve member 200 at the end of the rod 250. The second member 262 has a through-hole formed therethrough in communication with the valve seat 202. This through-hole functions as the first port 162. The first and second members 260, 262 are non-removably fixed together into a unit such that the second member 262 is partially fitted with an interference fit in a hole formed in the first member 260. To the second member 262 is attached a third member 268 which is provided with an oil seal 264 and a filter 266. The biased member 204 has a projection 272 extending from an end face thereof on the side of the second magnetic path defining member 216. On the other hand, the member 216 has a recess 274 formed in an end face thereof facing the end face of the biased member 204. The projection 272 engages the recess 274 such that the projection 274 is axially movable within the recess 274. Between the biased member 204 and the second magnetic path defining member 216, there is interposed a space ring 276.

Between the inner surface of the hole 256 of the first member 260 and the outer surface of the rod 250, there is left a small clearance, which functions to minimize the friction resistance to movements of the rod 250 relative to the first member 260. In the presence of this clearance, the fluid pressure at the second port 166 also acts on the biased member 204, which has a cutout (not shown) permitting the pressurized fluid to flow to a space in which the spring 206 is disposed. In this arrangement, therefore, the biasing force based on the fluid pressures acting on a movable assembly consisting of the valve member 200, rod 250 and biased member 204 in the axial direction of the rod 250 is equal to a product of a difference between the fluid pressures at the first and second ports 162, 166, and a surface area of a circular portion within an annular contact portion of the valve member 200 and the valve seat 202. It will be understood that the biasing force of the spring 206 of the seating valve 190 is equal to a product of the opening pressure difference (about 3 MPa) of the valve 150 and the surface area of the above-indicated circular portion. The opening pressure difference of the valve 150 can be changed by changing the biasing force of the spring 206 or the surface area of the above-indicated circular portion.

The solenoid-operated biasing device 194 includes the first and second magnetic path defining members 214, 216 for reducing the magnetic resistance in the magnetic flux produced by the solenoid coil 210. The magnetic path is defined by the first magnetic path defining member 214, the biased member 204 and the second magnetic path defining member 216. These members 214, 204, 216 are formed of materials having a relatively low magnetic resistance. Usually, the housing 196 is formed of a paramagnetic material. That is, in the presence of the paramagnetic housing 196 between the first magnetic path defining member 214 and the other members 204, 216 which define the magnetic path, the overall magnetic resistance of the magnetic path is increased. However, the wall thickness of the housing 196 is so small that the increase in the overall magnetic resistance is negligible. Like the housing 196, the spacer ring 276 is also formed of a paramagnetic material.

The magnetic resistance of the magnetic path defined by the biased member 204 and the second magnetic path defining member 216 varies with the axial relative position of these members 204, 216. Described in detail, a change in the relative axial position of the members 204, 216 will cause a change in the area of the portions of the outer and inner circumferential surfaces of the projection 272 of the biased member 204 and the recess 274 of the member 216, which portions face each other in the radial direction via a small radial clearance between those circumferential surfaces. If the end faces of the two members 204, 216 were merely opposed to each other with a given axial clearance therebetween, the magnetic resistance of the magnetic path would decrease at an increasing rate and the magnetic force acting between the members 204, 216 would increase at an increasing rate, as the axial distance therebetween is reduced, that is, as the two members 204, 216 move toward each other. In the present pressure-increasing linear solenoid valve 150, however, the movement of the two members 204, 216 will cause an increase in the surface area of the mutually facing portions of the circumferential surfaces of the projection 272 and recess 274, with a result of an increase in the magnetic flux passing those mutually facing portions and a decrease in the magnetic flux passing the air gap between the end faces of the two members 204, 216. If the voltage applied to the solenoid coil 210 is held constant, therefore, the magnetic force which biases the biased member 204 toward the member 216 is kept substantially constant, irrespective of the relative axial position of the two members 204, 216. On the other hand, the biasing force of the spring 206 which biases the biased member 204 in the direction away from the member 216 increases as the two members 204, 216 are moved toward each other. Accordingly, when no biasing force acts on the valve member 200 based on the difference between the fluid pressures at the first and second ports 162, 166, the movement of the biased member 204 toward the member 216 is terminated when the biasing force of the spring 206 becomes equal to the magnetic force acting on the biased member 204.

For assembling the pressure-increasing linear solenoid valve 150 in a body 280 (shown by two-dot chain line in FIG. 4) of the linear solenoid valve device 56, the first, second and third members 260, 262, 268 are first accommodated in a mounting hole 282 formed in the body 280, before the first magnetic path defining member 214 and the solenoid coil 210 held by the holder member 212 are fixed to the housing 196. Then, a flange portion 284 consisting of parts of the first member 260 and housing 196 is fixedly positioned in a large-diameter portion of the mounting hole 282, with a mounting member 286 being fixed in the mounting hole 282. The first magnetic path defining member 214 and the solenoid coil 210 held by the holder member 212 are then attached to the housing 196. Thus, the valve 150 is assembled with respect to the body 280. The first magnetic path defining member 214 consists of two separate portions which are butted together at an interface perpendicular to the axis of the valve 150, for easier assembling of the valve 150.

The controller 66 is principally constituted by a computer incorporating a read-only memory (ROM), a random-access memory (RAM) and a processing unit (PU). The ROM stores various control programs including those for executing a main routine and sub-routines illustrated in the flow charts of FIGS. 7, 8, 11, 18 and 19.

Figure 6:
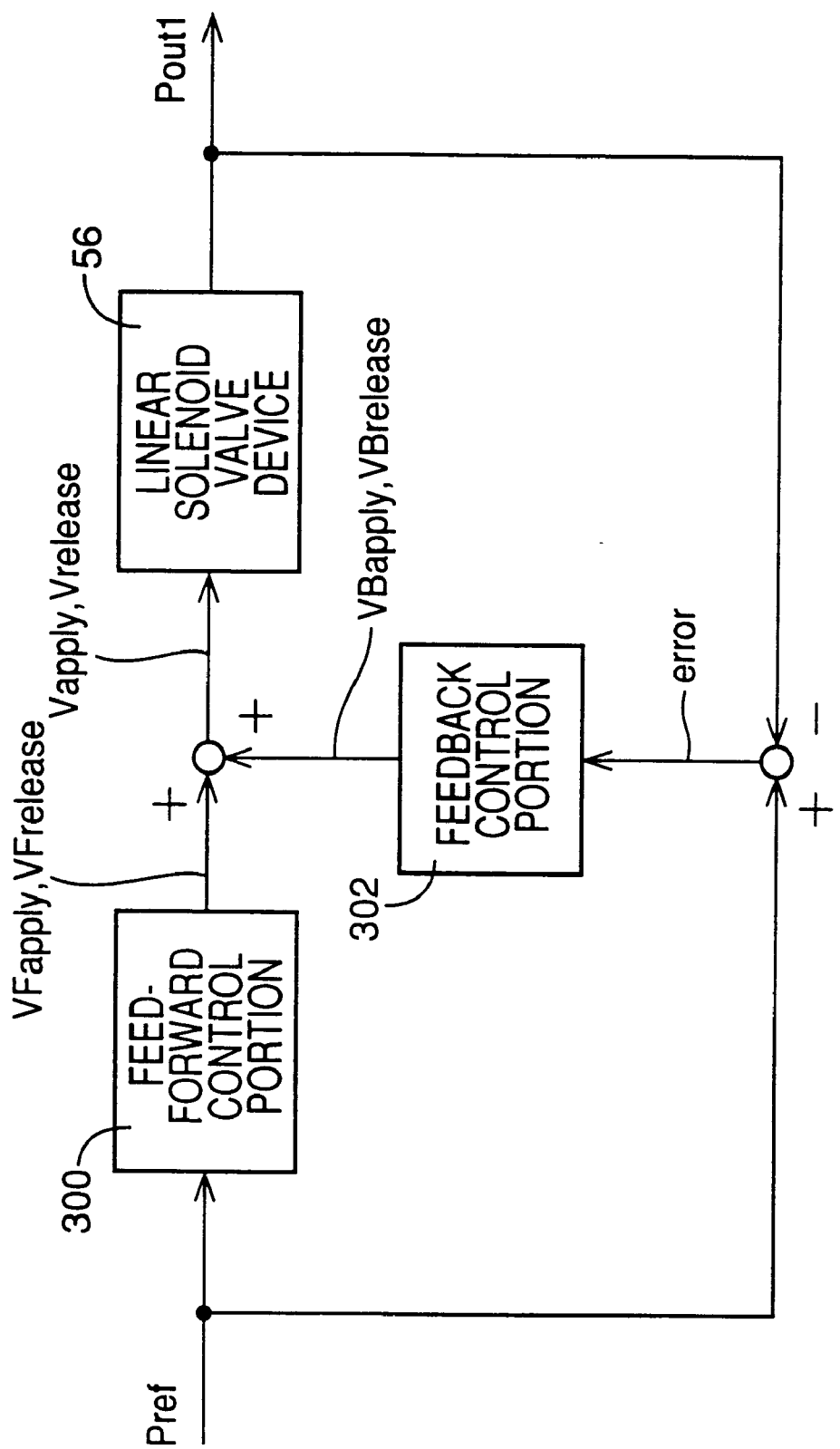
FIG. 6 is a block diagram showing functional portions of the controller.

Referring to the block diagram of FIG. 6, there are shown functional portions of the controller 66, which are assigned to control the linear solenoid valve device 56 for regulating the fluid pressures at the various portions of the hydraulic braking system 10. The controller 66 includes a feed-forward control portion 300 and a feedback control portion 302 for controlling the linear solenoid valve device 56. The feed-forward portion 300 is adapted to receive a desired fluid pressure Pref which is a target of the fluid pressure control by the linear solenoid valve device 56, which produces the output fluid pressure Pout1. In the present embodiment, the desired fluid pressure Pref is obtained by subtracting the fluid pressure corresponding to the braking force produced by the regenerative braking system, from the fluid pressure as detected by the pressure sensor 34, that is, from the master cylinder pressure Pmc which is considered to represent the braking force as desired by the vehicle operator.

The feed-forward control portion 300 is assigned to calculate a feed-forward pressure-increasing voltage value VFapply and a feed-forward pressure-reducing voltage value VFrelease, on the basis of the desired fluid pressure Pref. The feedback control portion 302 is assigned to calculate a feedback pressure-increasing voltage value VBapply and a feedback pressure-reducing voltage value VBrelease which are used to zero a control error "error" or a difference between the desired fluid pressure Pref and the output fluid pressure Pout1. Thus, the controller 66 is adapted to effect both the feed-forward control and the feedback control of the output fluid pressure Pout1.

Referring to the flow chart of FIG. 7, there will be described the main routine executed by the controller 66 according to the control program stored in the ROM. The main routine is initiated with step S10, which is a sub-routine for calculating the feed-forward pressure-increasing voltage value VFapply and the feed-forward pressure-reducing voltage value VFrelease. This sub-routine in step S10 is executed by the feed-forward control portion 300, as described below in detail by reference to the flow chart of FIG. 8. Step S10 is followed by step S12, which is a sub-routine for calculating the feedback pressure-increasing voltage value VBapply and the feedback pressure-reducing voltage value VBrelease, on the basis of the control error "error" between the desired and output fluid pressures Pref and Pout1 indicated above. This sub-routine is executed by the feedback control portion 302, so as to zero the control error "error" by a generally implemented PID control (combination of proportional, integral and differential controls), or an I control (integral control). Then, the control flow goes to step S14, which is a sub-routine for calculating a pressure-increasing solenoid voltage Vapply to be applied to the solenoid coil 210 of the pressure-increasing linear solenoid valve 150 and a pressure-reducing solenoid voltage Vrelease to be applied to the solenoid coil 210 of the pressure-reducing linear solenoid valve 152. The sub-routine in step S14 is executed as described below in detail by reference to the flow chart of FIG. 18.

In the sub-routine in step S14, the pressure-increasing solenoid voltage value Vapply is either a sum of the feed-forward and feedback pressure-increasing voltage values VFapply and VBapply, or zero. Similarly, the pressure-reducing solenoid voltage value Vrelease is either a sum of the feed-forward and feedback pressure-reducing voltage values VFrelease and VBrelease, or zero. Step S14 is followed by step S17, which is a fluid leakage detecting sub-routine which will be described in detail by reference to the flow chart of FIG. 19. Briefly, the fluid leakage detecting sub-routine is formulated to determine whether the total amount of the fluid discharged from the wheel brake cylinders 24, 26, 50, 52 through the linear solenoid valve device 56 into the pressure-reducing reservoir 154 during each braking operation (which is initiated with depression of the brake pedal 126 and terminated with complete releasing of the brake pedal 126) is larger than the storage capacity of the reservoir 154. If an affirmative decision is obtained in this determination, it means that there exists a fluid leakage between the linear solenoid valve device 56 and the pressure-reducing reservoir 154 (including a fluid leakage from the reservoir 154). The sub-routine is formulated to inhibit the fluid control operation using the linear solenoid valve device 56, if the presence of such a fluid leakage is detected or determined. Step S16 is followed by step S18 in which the pressure-increasing and pressure-reducing solenoid voltages Vapply and Vrelease are applied to the solenoid coils 210 of the respective pressure-increasing and pressure-reducing linear solenoid valves 150, 152. Then, the control flow goes back to step S10, for repeating steps S10 through S18.

The sub-routine in step S10 for calculating the feed-forward pressure-increasing and pressure-reducing voltage values VFapply and VFrelease will be described referring to the flow chart of FIG. 8. The sub-routine of FIG. 8 is initiated with step S20 to determine whether an amount of change dPref of a desired fluid pressure Pref (calculated as described below) during a predetermined time duration (6 ms in this embodiment, as described below by reference to an interruption routine of FIG. 11) is a positive value, that is, determine whether the desired fluid pressure is increasing. If an affirmative decision (YES) is obtained in step S20, the control flow goes to step S22 to determine whether a flag startFlag is set at "0". If an affirmative decision (YES) is obtained in step S22, the control flow goes to step S24 in which the desired fluid pressure Pref is set as an initial pressure-increasing variable Pinita, and the flag startFlag is set to "1". Step S24 is followed by step S40. If a negative decision (NO) is obtained in step S22, the control flow goes to step S24 while skipping step S24. The main routine of FIG. 7 includes an initialization step (not shown) in which the flag startFlag is initially reset to "0". If a negative decision (NO) is obtained in step S20, the control flow goes to step S26 to determine whether the amount of change dPref of the desired fluid pressure Pref is a negative value, that is, determine whether the desired fluid pressure Pref is being reduced. If an affirmative decision (YES) is obtained in step S26, the control flow goes to step S28 to determine whether the flag startFlag is set at "1". If an affirmative decision (YES) is obtained in step S28, the control flow goes to step S30 in which the desired fluid pressure Pref is set as an initial pressure-reducing variable Pinir, and the flag startFlag is set to "1". Step S30 is followed by step S40. If a negative decision (NO) is obtained in step S26 or S28, the control flow goes to step S40, the control flow goes to step S40, while skipping step S30.

Step S40 is provided to to determine whether the pressure-reducing solenoid voltage Vrelease is a positive value, that is, determine whether the linear solenoid valve device 56 is placed in a pressure-reducing state(pressure-reducing operation). If an affirmative decision (YES) is obtained in step S40, the control flow goes to step S42 in which a feed-forward pressure-increasing voltage increment VFca is calculated according to the following equation (3):

$$\text{VFca} \leftarrow \text{MAPa}(\text{Pin}-\text{Pout1}) \qquad (3)$$

Figure 9:
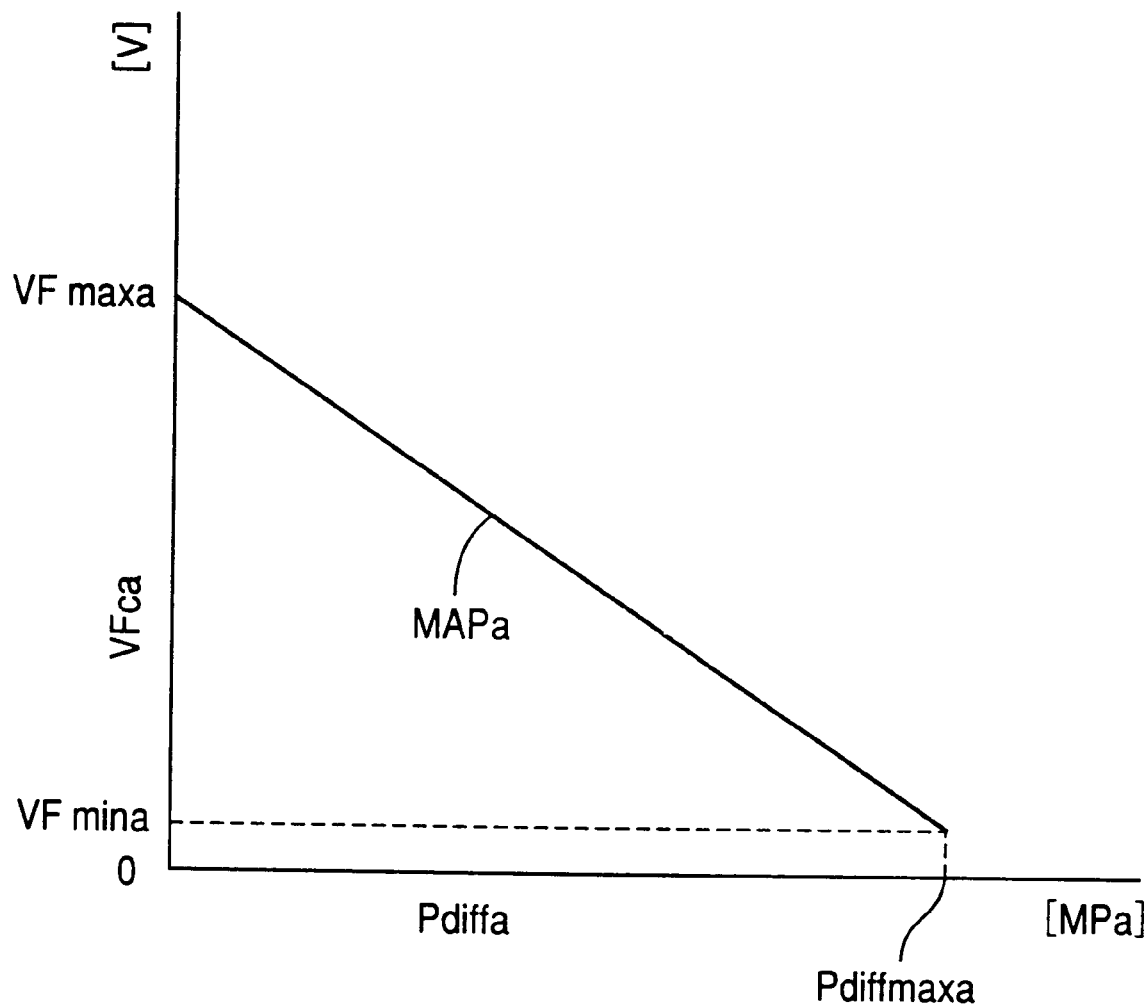
FIG. 9 is a graph indicating a function MAPa used in step S42 of the sub-routine of FIG. 8.

In the above equation, MAPa is a function for obtaining the feed-forward pressure-increasing increment VFca based on a factor (Pin−Pout1). This factor (Pin−Pout1) is referred to as a pressure-increasing fluid pressure difference Pdiffa. An example of the function MAPa is indicated in the graph of FIG. 9. In this example, the function MAPa is determined so that the feed-forward pressure-increasing voltage increment VFca linearly decreases with an increase in the pressure-increasing fluid pressure difference Pdiffa. The function MAPa is further determined so that the feed-forward pressure-increasing voltage increment VFca is equal to a maximum feed-forward pressure-increasing voltage value VFmaxa when the pressure-increasing fluid pressure difference Pdiffa is zero, while the increment VFca is equal to a minimum feed-forward pressure-increasing voltage value VFmina when the difference Pdiffa is equal to a maximum difference value Pdiffmaxa. This maximum difference value Pdiffmaxa is equal to the opening pressure difference (=3 MPa) of the pressure-increasing linear solenoid valve 150. The maximum feed-forward pressure-increasing voltage value VFmaxa is determined such that the biasing force acting on the biased member 204 based on the magnetic field produced by the solenoid coil 210 of the linear solenoid valve 150 upon energization of the solenoid coil 210 by the maximum voltage value VFmaxa is equal to the biasing force of the spring 206 acting on the biased member 204 when the valve member 200 is seated on the valve seat 202. Thus, the feed-forward pressure-increasing voltage increment VFca is calculated in step S42 in the process of a pressure reducing operation of the linear solenoid valve 56 (while the affirmative decision is obtained in step S40), so that the voltage increment VFca is used for the next pressure increasing operation of the valve 56.

If a negative decision (NO) is obtained in step S40, the control flow goes to step S44 to determine whether the pressure-increasing solenoid voltage Vapply is a positive value, that is, determine whether the linear solenoid valve device 56 is placed in a pressure-increasing state (pressure-increasing operation). If an affirmative decision (YES) is obtained in step S44, the control flow goes to step S46 in which a feed-forward pressure-reducing voltage increment VFcr is calculated according to the following equation (4):

$$\text{VFcr} \leftarrow \text{MAPr(Pout1-Pres)} \tag{4}$$

Figure 10:
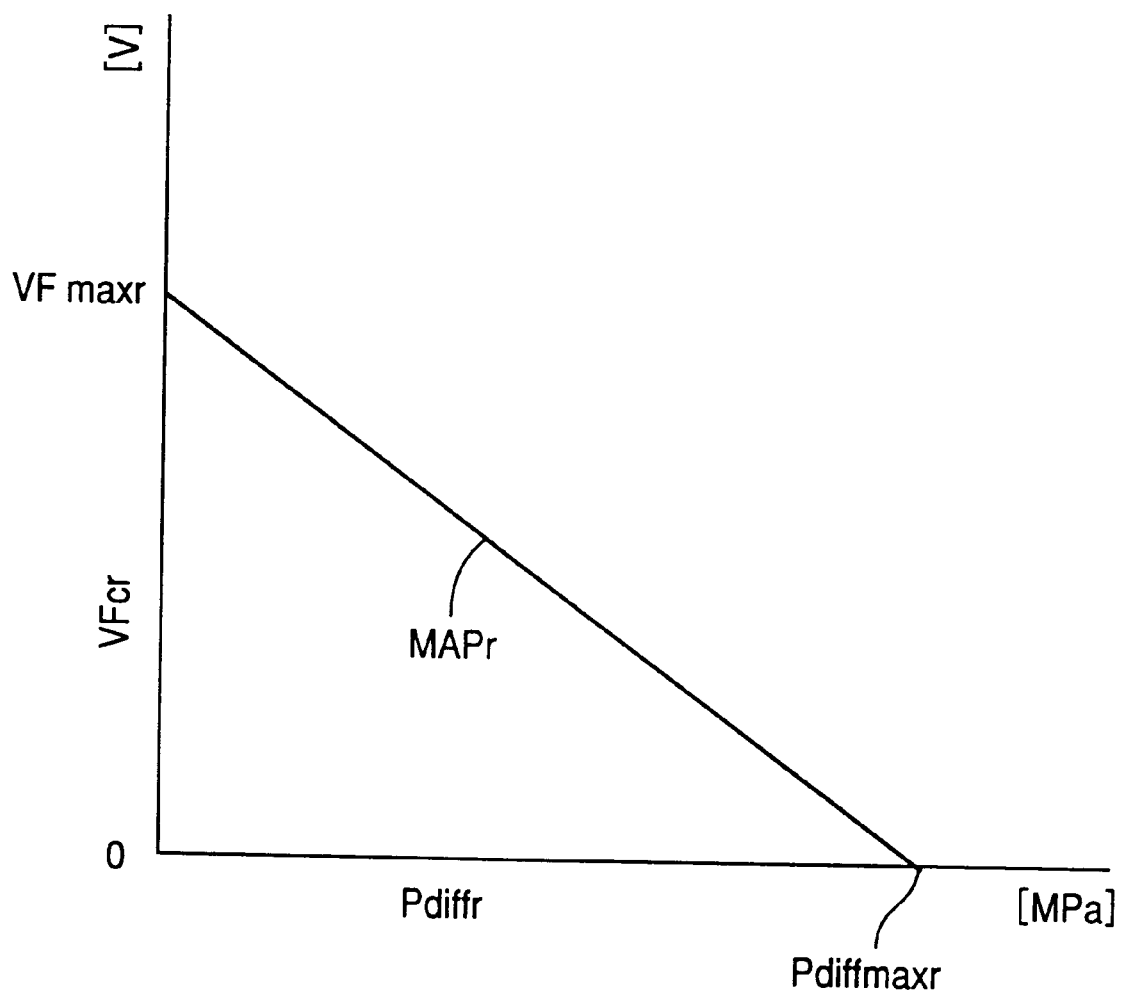
FIG. 10 is a graph indicating a function MAPr used in step S46 of the sub-routine of FIG. 8.

In the above equation, MAPr is a function for obtaining the feed-forward pressure-reducing increment VFcr based on a factor (Pout1−Pres). This factor (Pout1−Pres) is referred to as a pressure-reducing fluid pressure difference Pdiffr. "Pres" represents the fluid pressure in the pressure-reducing reservoir 154, which is equal to the atmospheric pressure. An example of the function MAPr is indicated in the graph of FIG. 10. In this example, the function MAPr is determined so that the feed-forward pressure-reducing voltage increment VFcr linearly decreases with an increase in the pressure-reducing fluid pressure difference Pdiffr. The function MAPr is further determined so that the feed-forward pressure-reducing voltage increment VFcr is equal to a maximum feed-forward pressure-reducing voltage value VFmaxr when the pressure-reducing fluid pressure difference Pdiffr is zero, while the increment VFcr is equal to zero when the difference Pdiffr is equal to a maximum difference value Pdiffmaxr. This maximum difference value Pdiffmaxr is equal to the opening pressure difference (larger than 18 MPa) of the pressure-reducing linear solenoid valve 152. The maximum feed-forward pressure-reducing voltage value VFmaxr is determined such that the biasing force acting on the biased member 204 based on the magnetic field produced by the solenoid coil 210 of the linear solenoid valve 152 upon energization of the solenoid coil 210 by the maximum voltage value VFmaxr is equal to the biasing force of the spring 220 acting on the biased member 204 when the valve member 200 is seated on the valve seat 202. Thus, the feed-forward pressure-reducing voltage increment VFcr is calculated in step S46 in the process of a pressure-increasing operation of the linear solenoid valve 56 (while the affirmative decision is obtained in step S44), so that the voltage increment VFcr is used for the next pressure reducing operation of the valve 56.

Steps S42 and S46 are followed by step S47. If a negative decision (NO) is obtained in step S44, the control flow goes to step S47 while skipping step S46. Step S47 is implemented to determine whether the desired fluid pressure change amount dPref is a positive value while the desired fluid pressure Pref is equal to or lower than a predetermined threshold Pth. If an affirmative decision (YES) is obtained in step S47, the control flow goes to step S48 in which an initial fluid flow increasing voltage VFcainc is set as the feed-forward pressure-increasing voltage increment VFca. A significance of this initial fluid flow increasing voltage VFcainc will be described later by reference to FIG. 16. Step S48 is followed by step S50. If a negative decision (NO) is obtained in step S47, the control flow goes to step S50 while skipping step S48. In step S48, the feed-forward pressure-increasing voltage value VFapply or feed-forward pressure-reducing voltage value VFrelease is calculated according to the following equation (5) or (6):

$$\text{VFapply} \leftarrow \text{GAINa} \cdot (\text{Pref}-\text{Pinita}) + \text{VFca} \tag{5}$$

$$\text{VFrelease} \leftarrow \text{GAINr} \cdot (\text{Pinitr}-\text{Pref}) + \text{VFcr} \tag{6}$$

In the above equations (5) and (6), "GAINa" and "GAINr" are coefficients, which are predetermined positive constants.

Referring next to the flow chart, there will be described the interruption routine to calculate the above-indicated desired fluid pressure Pref and desired fluid pressure change amount dPref. The routine is initiated with step S80 in which the desired fluid pressure Pref is calculated by subtracting the fluid pressure corresponding to the present regenerative braking force, from the master cylinder pressure Pmc obtained from the output signal of the pressure sensor 34. Then, the control flow goes to step S82 to calculate the amount of change dPref of the desired fluid pressure Pref according to the following equation (7):

$$\text{dPref} \leftarrow \text{Pref}-\text{prevPref} \tag{7}$$

Figure 11:
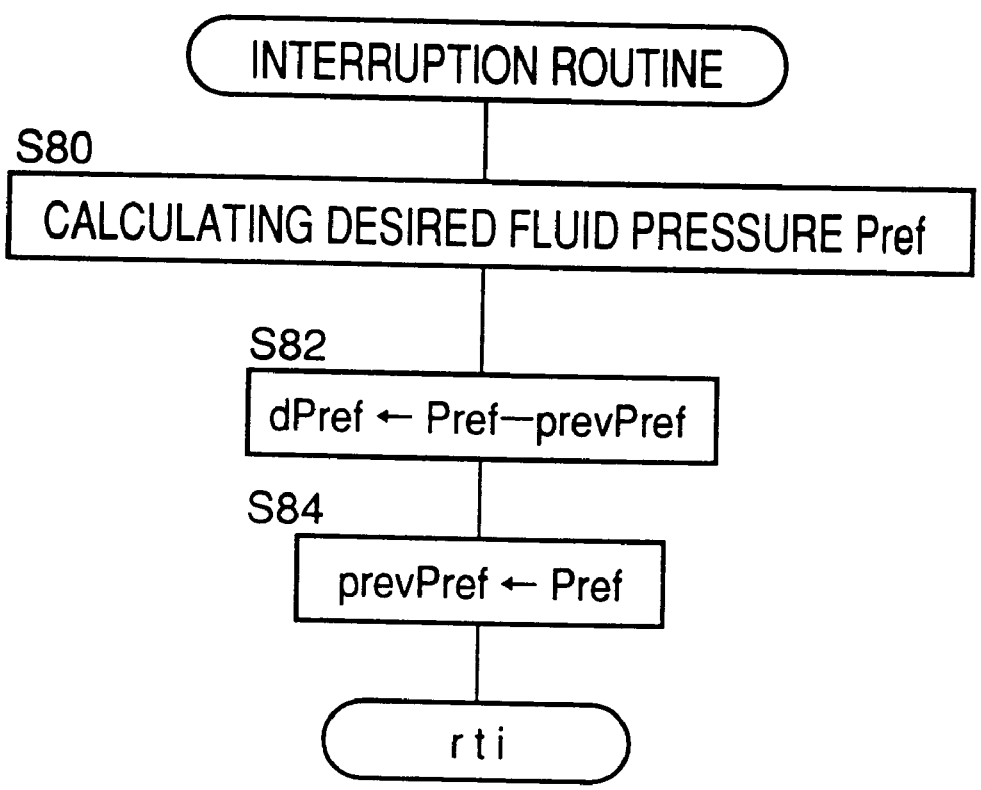
FIG. 11 is a flow chart illustrating an interruption routine executed to calculate desired fluid pressure value Pref and desired fluid pressure change amount dPref.

In the above equation (7), "prevPref" represents a previous value of the desired fluid pressure Pref, which was calculated in step S80 in the last cycle of execution of the interruption routine of FIG. 11. Step S82 is followed by step S84 in which the desired fluid pressure calculated in step S80 in the present cycle of execution of the interruption routine is set as the previous value prevPref of the desired fluid pressure Pref. The interruption routine of FIG. 11 is repeatedly executed with a cycle time of 6 ms during brake application to the vehicle with the brake pedal 126 being depressed. Thus, the desired fluid pressure Pref and the desired fluid pressure change amount dPref are calculated at the time interval of 6 ms during the brake application, and therefore the change amount dPref means a rate of change of the desired fluid pressure Pref.

The feed-forward pressure-reducing voltage value VFrelease is applied to the solenoid coil 210 of the pressure-reducing linear solenoid valve 152 so as to hold the linear solenoid valve 152 in the open state, namely, in the pressure reducing state, even after the pressure-reducing fluid pressure difference Pdiffr has been considerably reduced. Described more specifically, the force acting on the pressure-reducing linear solenoid valve 152 based on the fluid pressures so as to move the valve member 200 away from the valve seat 202 decreases with a decrease in the pressure-reducing fluid pressure difference Pdiffr. When the fluid pressure difference Pdiffr is comparatively large, the feed-forward pressure-reducing voltage value VFrelease that should be applied to the solenoid coil 210 of the valve 152 to hold the valve 152 in the open or pressure-reducing state is comparatively small. When the fluid pressure difference Pdiffr is comparatively small, the voltage value VFrelease that should be applied to the solenoid coil 210 to hold the valve 152 in the open state is comparatively large.

Figure 12:
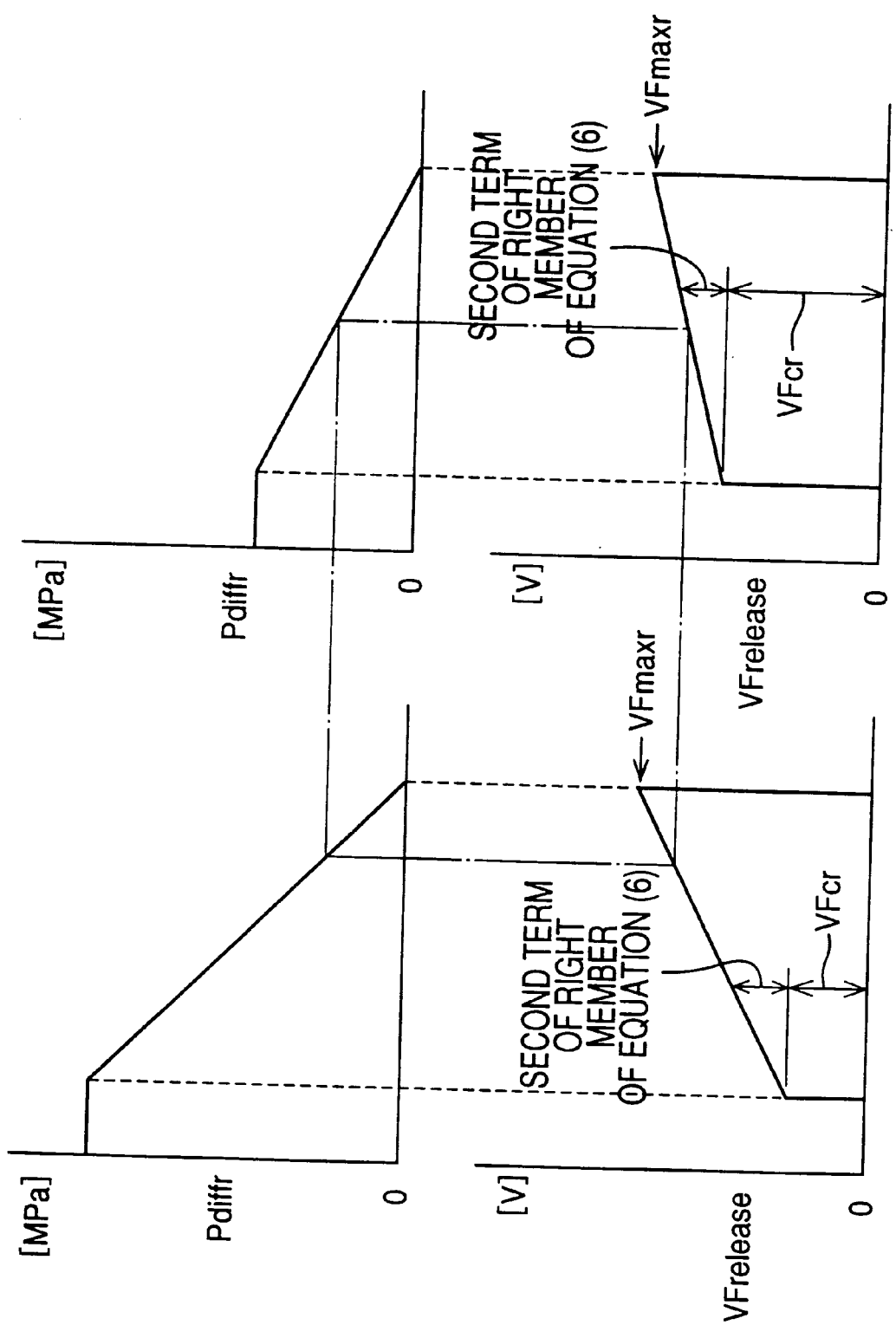
FIGS. 12(a) and 12(b) are graphs indicating two examples of fluid pressure reduction according to the voltage values VFapply and VFrelease calculated in the sub-routine of FIG. 8 (step S12 of the main routine of FIG. 7)

Graphs (a) and (b) in FIG. 12 show two examples of pressure reducing operation in which the initial values of the pressure-reducing fluid pressure difference Pdiffr are different. In these examples, the output fluid pressure Pout1 of the linear solenoid valve device 56 is reduced at respective rates, eventually to the atmospheric level. As indicated by one-dot chain lines in the graphs, the feed-forward pressure-reducing voltage value VFrelease is the same in the two examples when the pressure-reducing fluid pressure difference values Pdiffr in the two examples are equal to each other. When the pressure reducing operations are terminated, the fluid pressure difference values Pdiffr are zeroed, and the feed-forward pressure-reducing voltage values VFrelease are equal to the maximum value VFmaxr.

The feed-forward pressure-increasing voltage value VFapply has substantially the same significance as the feed-forward pressure-reducing voltage value VFrelease described above. However, it is noted that the fluid pressures Pin and Pout1 at the respective first and second ports 162, 166 of the pressure-increasing linear solenoid valve 150 vary during the brake application, while the fluid pressure at the second port 176 of the pressure-reducing linear solenoid valve 152 is held constant (equal to the reservoir pressure Pres).

In the graphs of FIGS. 9 and 10, the functions MAPa and MAPr are determined such that the feed-forward pressure-increasing and pressure-reducing voltage increments VFca and VFcr decrease linearly with the pressure-increasing and pressure-reducing fluid pressure difference values Pdiffa, Pdiffr. That is, the functions MAPa and MAPr are represented by respective straight lines. The functions MAPa and MAPr are made linear since the pressure-increasing and pressure-reducing linear solenoid valves 150, 152 are operated within a predetermined voltage range in which the magnetic force acting on the biased member 204 is substantially proportional with the voltage applied to the solenoid coil 210. Generally, however, the magnetic force produced by a solenoid coil is proportional to a square of the voltage applied to the solenoid coil. If the magnetic force acting on the biased member 204 cannot be considered to be substantially proportional with the voltage applied to the solenoid coil 210, steps S40 through S46 in the sub-routine of FIG. 8 are eliminated, and step S50 is modified such that the feed-forward pressure-increasing voltage values VFapply and VFrelease are calculated according to the following equations (8) and (9), respectively, rather than the above-indicated equations (5) and (6):

$$\text{VFapply} \leftarrow \text{GAINa}' \cdot \sqrt{(\text{Pdiffmaxa} - \text{Pdiffa})} + \text{VFmaxa} \quad (8)$$

$$\text{VFrelease} \leftarrow \text{GAINr}' \cdot \sqrt{(\text{Pdiffmaxr} - \text{Pdiffr})} \quad (9)$$

Where the feed-forward pressure-increasing voltage value VFapply is calculated according to the equation (5), the feed-forward pressure-increasing voltage increment VFca may change during brake application, as indicated in FIG. 9. Actually, however, the pressure-increasing fluid pressure difference Pdiffa is usually comparatively small. Therefore, the accuracy of control of the fluid pressure by the linear solenoid valve 150 will not be significantly deteriorated even where the feed-forward pressure-increasing voltage increment VFca is fixed at a suitable value, for example, at the maximum feed-forward pressure-increasing voltage value VFmaxa.

Figure 13:
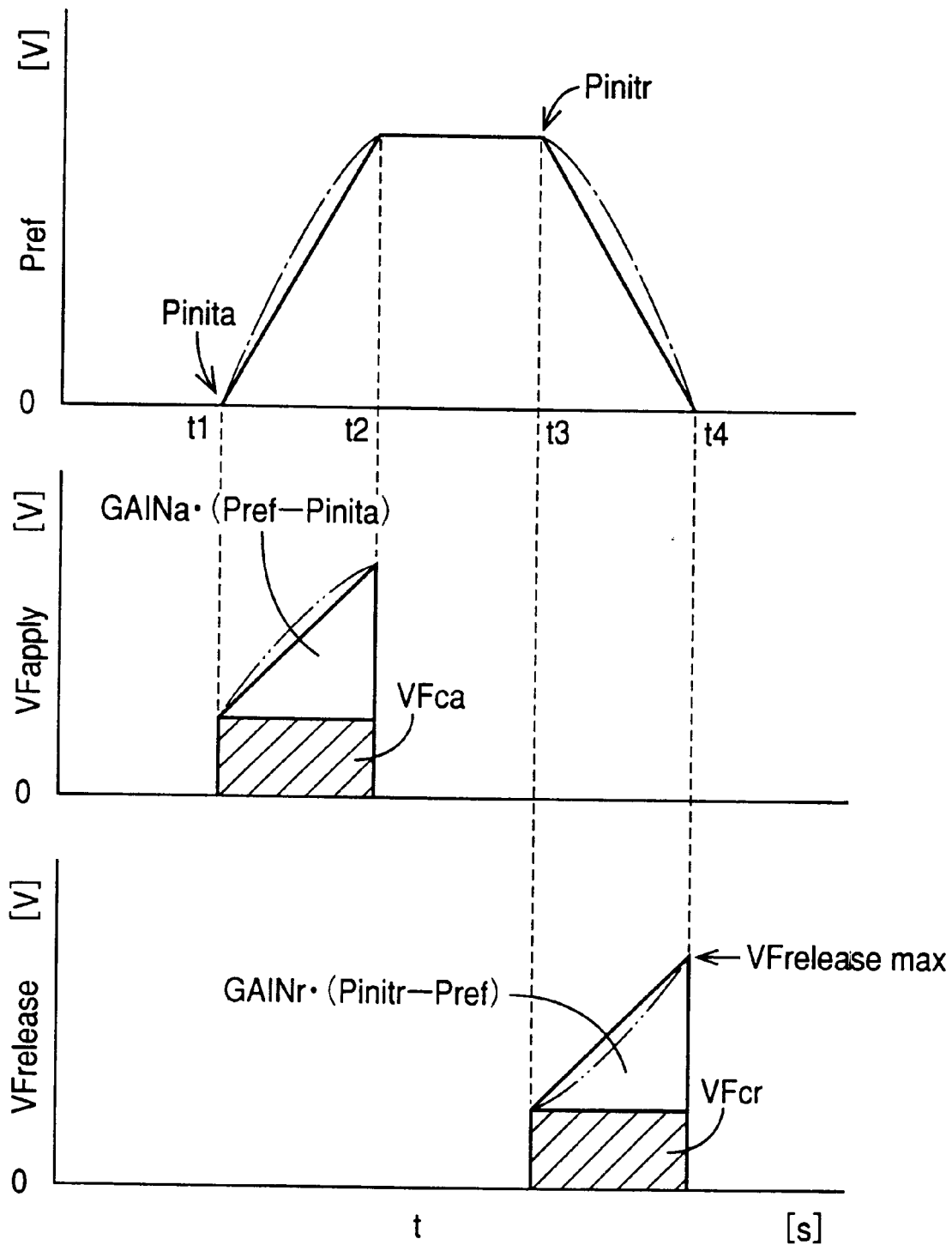
FIG. 13 is a graph indicating an example of a change in the desired fluid pressure Pref, and examples of changes in the feed-forward voltage values VFapply and VFrelease which are calculated in the sub-routine of FIG. 8, based on the change of the desired fluid pressure Pref.

Referring to the graphs of FIG. 13, there are qualitatively indicated an example of a change of the desired fluid pressure Pref, and examples of changes of the feed-forward pressure-increasing and pressure-reducing voltage values VFapply, VFrelease which are calculated on the basis of a change of the desired fluid pressure Pref, as described above by reference to the flow charts of FIGS. 7, 8 and 11. An increase in the desired fluid pressure Pref from zero is started at point of time t1. The desired fluid pressure Pref continues to increase during a period between the point of time t1 and a point of time t2, and is held constant during a period between the point of time t2 and a point of time t3. The desired fluid pressure Pref continues to decrease during a period between the point of time t3 and a point of time t4 at which the pressure Pref is zero. The feed-forward pressure-increasing voltage value VFapply increases from zero during the period t1–t2, and is held zero during the period t2–t4. On the other hand, the feed-forward pressure-reducing voltage value VFrelease increases from zero during the period t3–t4, and is held zero during the period t1–t3. Actually, these voltage values VFapply, VFrelease may be other than zero during the period t2–t3. Usually, the voltage values VFapply, VFrelease are zero while the desired fluid pressure Pref is held constant. The voltage values VFapply, VFrelease are not actually used during the time period t2–t3 even when those values are not zero. For this reason, the voltage values VFapply and VFrelease are indicated to be zero during the time period t2–t3, in the graphs of FIG. 13.

Where the desired fluid pressure Pref changes as indicated in FIG. 13, the value Pref at the point of time t1 is set as the initial pressure-increasing variable Pinita, since step S24 is implemented at the point of time t1, with the affirmative decision (YES) being obtained in both steps S20 and S22 in the sub-routine of FIG. 8. Further, the desired fluid pressure Pref at the point of time t3 is set as the initial pressure-reducing variable Pinitr, since step S30 is implemented at the point of time t3, with the negative and affirmative decisions being obtained in steps S20 and S26, respectively. In the graph of the feed-forward pressure-increasing voltage value VFapply in FIG. 13, the value of the second term (i.e., feed-forward pressure-increasing voltage increment VFca) of the above equation (5) is indicated by a hatched rectangular area, while the value of the first term (i.e., GAINa·(Pref–Pinita) of the equation (5) is indicated by a non-hatched triangular area. In the graph of the feed-forward pressure-reducing voltage value VFrelease, the value of the second term (i.e., feed-forward pressure-reducing voltage increment VFcr) of the above equation (6) is indicated by a hatched rectangular area, while the value of the first term (i.e., GAINr·(Pinitr–Pref) of the equation (6) is indicated by a non-hatched triangular area. If the desired fluid pressure Pref changes as indicated by one-dot chain lines in FIG. 13, the voltage values VFapply and VFrelease change as indicated by two-dot chain lines, since the values of the first terms of the equations (5) and (6) change as indicated by the two-dot chain lines, with the change of the desired fluid pressure Pref.

Although the feedback control and the feed-forward control of the fluid pressure by the solenoid-operated linear solenoid valve device 56 permit satisfactory degrees of control stability and response, there is still a possibility that the linear solenoid valve device 56 suffers from frequent pressure-increasing and pressure-reducing operations, which result in a relatively large amount of electric energy consumption by the solenoid coils 310 of the pressure-increasing and pressure-reducing linear solenoid valves 150, 152, leading to a reduced amount of electric energy stored in the battery which is used for controlling the valve device 56 and for operating the electric motor. The reduction of the electric energy stored in the battery leads to a reduced distance of running of the hybrid vehicle by the electric motor. To prevent this undesirable possibility or drawback due to the frequent pressure-increasing and pressure-reducing operations, the linear solenoid valve device 56 is further adapted so as to be kept in the pressure-holding state as long as the output fluid pressure Pout1 of the valve device 56 is held within a predetermined uncontrolled band or zone defined by upper and lower limits which are relatively close to the desired fluid pressure Pref. That is, the number of alternate pressure-increasing and pressure-reducing operations of the valve device 56 can be reduced by holding the output fluid pressure Pout1 constant while the output fluid pressure Pout1 is relatively close to the desired value Pref. In this arrangement, however, an increase in the feedback control gain for improving the control response may cause a control delay, which may cause the valve device 56 to suffer from an undesired hunting with the output fluid pressure Pout1 oscillating by an amount larger than the width of the uncontrolled band, as indicated in FIG. 14. On the other hand, an increase in the width of the uncontrolled band or a decrease in the feedback control gain for preventing the hunting indicated above may result in lowering the accuracy of control of the fluid pressure (i.e., output fluid pressure Pout1). That is, the mere provision of the uncontrolled band for the output fluid pressure Pout1 does not permit sufficient reduction of the number of the alternate pressure-increasing and pressure-reducing operations of the linear solenoid valve device 56 while assuring a satisfactory degree of control accuracy of the fluid pressure by the valve device 56.

Figure 7:
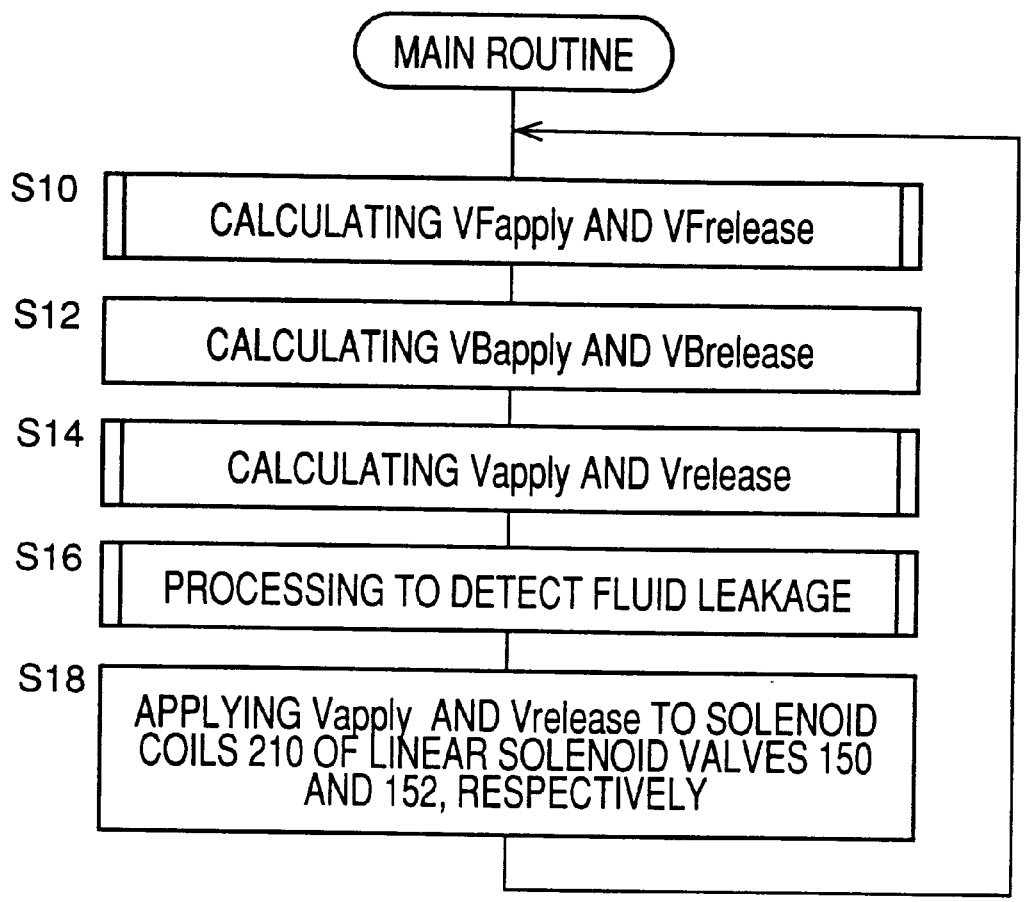
FIG. 7 is a flow chart illustrating an example of a main routine executed by the controller.
Figure 8:
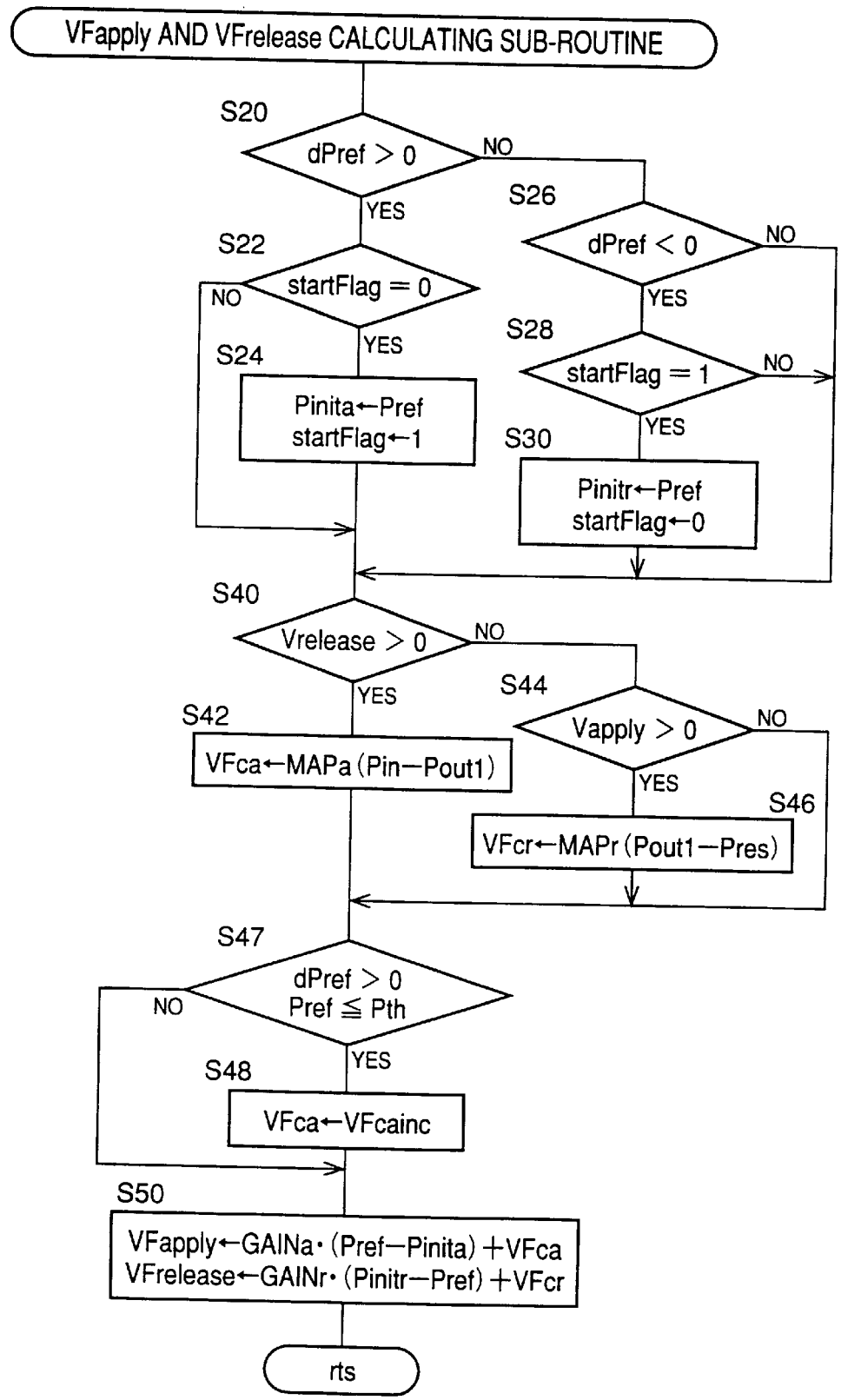
FIG. 8 is a flow chart illustrating a sub-routine to calculate feed-forward voltage values VFapply and VFrelease in step S10 of the main routine of FIG. 7.
Figure 15:
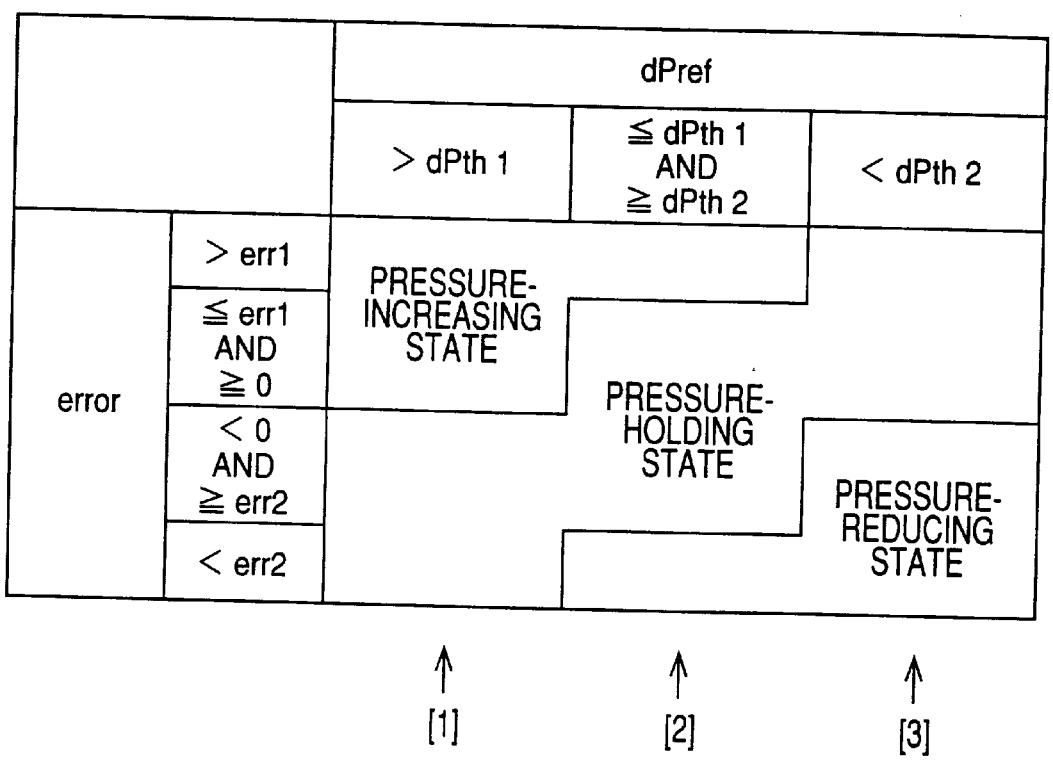
FIG. 15 is a view for explaining a concept of calculating solenoid voltage values Vapply and Vrelease in step S14 of the main routine of FIG. 7.

The controller 66 constructed according to the principle of the present invention is arranged to implement step S14 of the main routine of FIG. 7, for solving the drawback indicated above, namely, for controlling the solenoid-operated linear solenoid valve device 56 so as to prevent frequent pressure-increasing and pressure-reducing operations while assuring sufficiently high accuracy of control of the fluid pressure. FIG. 15 illustrates a concept of the processing operations in step S14 for calculating the pressure-increasing and pressure-reducing solenoid voltages Vapply and Vrelease to be applied to the solenoid coils 210 of the linear solenoid valve device 56. As indicated in FIG. 15, the operating state of the linear solenoid valve device 56 is determined on the basis of the control error "error" and the amount of change (rate of change) dPref of the desired fluid pressure Pref. Described more particularly, where the desired fluid pressure change amount dPref is a positive value larger than a first predetermined threshold dPth1 (positive value), as indicated at [1] in FIG. 15, the valve device 56 is placed in the pressure-increasing or pressure-holding state, depending upon whether the control error "error" is positive or negative, as indicated in FIG. 15. Where the desired fluid pressure change amount dPref is between the threshold dPth1 and a second predetermined threshold dPth2 (negative value), as indicated at [2] in FIG. 15, the valve device 56 is placed in the pressure-increasing state when the control error "error" is larger than a predetermined upper limit err1, placed in the pressure-reducing state when the control error "error" is smaller than a predetermined lower limit err2, and placed in the pressure-holding state when the control error "error" is between the upper and lower limits err1 and err2. Where the desired fluid pressure change amount or rate dPref is smaller than the second threshold dPth2, as indicated at [3] in FIG. 15, the valve device 56 is placed in the pressure-holding state or pressure-reducing state, depending upon whether the control error "error" is positive or negative, as indicated in FIG. 15.

In the braking condition indicated at [1] in FIG. 15, the desired fluid pressure Pref has a generally increasing tendency. In this braking condition [1], the valve device 56 is placed in one of the pressure-increasing and pressure-holding states, so that the output fluid pressure Pout1 of the valve device 1 coincides with the desired fluid pressure Pref. In the braking condition indicated at [3] in FIG. 15, the desired fluid pressure Pref has a generally reducing tendency. In this braking condition [3], the valve device 56 is placed in one of the pressure-reducing and pressure-holding states. In the braking condition [1] wherein the desired fluid pressure change amount dPref is larger than zero, the output fluid pressure Pout1 which may rise above the desired fluid pressure Pref will eventually coincide with the desired fluid pressure Pref since the desired fluid pressure Pref rises above the output fluid pressure Pout1 while the valve device 56 is held in the pressure-holding state to hold the output fluid pressure Pout1 constant. Thus, the valve device 56 is not required to be placed in the pressure-reducing state in the braking condition [1]. In the braking condition [3] wherein the desired fluid pressure change amount dPref is smaller than zero, the valve device 56 is not required to be placed in the pressure-increasing state, for a reason similar to that explained above with respect to the braking condition [1]. In the braking conditions [1] and [3], therefore, the numbers of the pressure-increasing and pressure-reducing operations of the valve device 56 according to the concept illustrated in FIG. 15 are considerably reduced as compared with the number of pressure-increasing and pressure-reducing operations in the conventional braking system. Accordingly, the electric energy required to be supplied to the solenoid coils 210 of the valve device 56 is reduced.

The upper and lower limits err1 and err2 are permissible maximum and minimum amounts of the control error "error" when the valve device 56 is placed in the pressure-holding state. The control error "error" may be reduced by reducing the absolute values of these upper and lower limits err1 and err2. However, this causes an increase in the frequency of operations of the pressure-increasing and pressure-reducing linear solenoid valves 150, 152. On the other hand, decreasing the absolute values of the limits err1, err2 reduces the frequency of operations of the valves 150, 152, but causes an increase in the control error "error". Therefore, the upper and lower limits err1 and err2 must be determined by taking account of both of the operation frequency and control error "error" of the valves 150, 152.

While the controller 66 arranged to control the linear solenoid valve device 56 as shown in FIG. 15 permits reduction in the required electric power for controlling the valve device 56, the controller 66 is further arranged as described below, so as to minimize a delay to provide a braking effect and "brake dragging".

Figure 16:
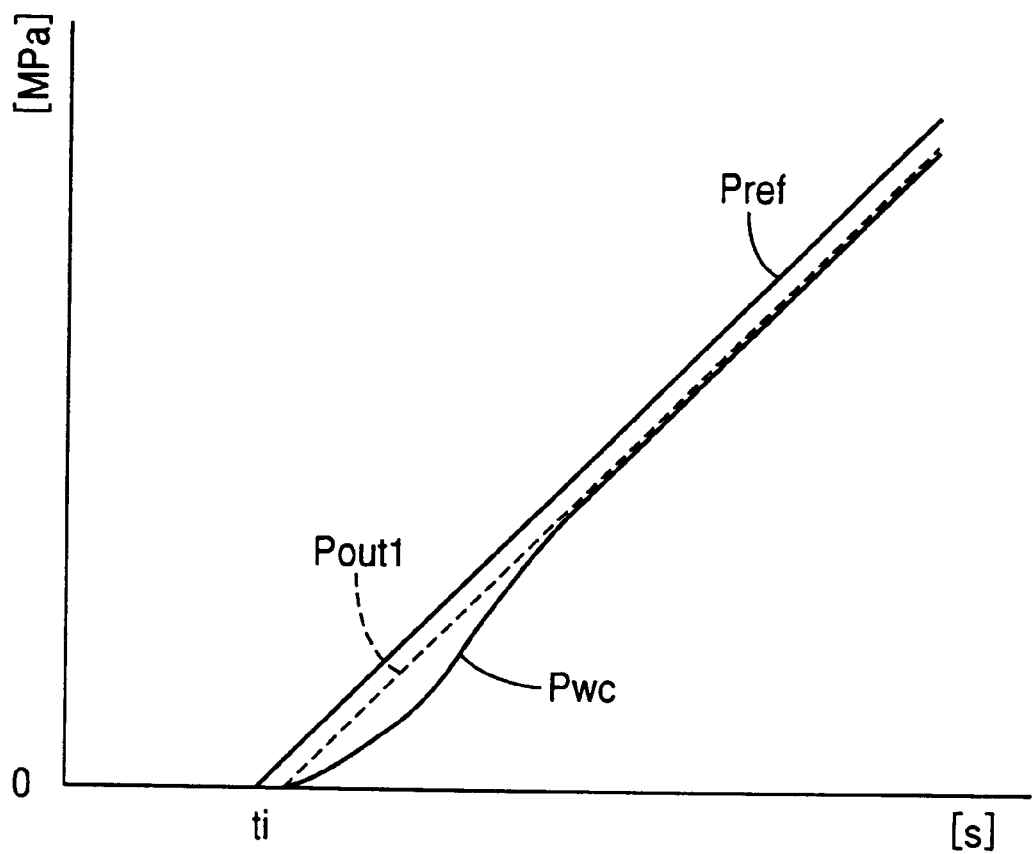
FIG. 16 is a graph for explaining a need of an initial increase of a rate of flow of the fluid into wheel brake cylinder.

The arrangement to minimize the delayed braking effect will be first explained. The graph of FIG. 16 shows a linear increase of the desired fluid pressure Pref from zero, as a result of depression of the brake pedal 126 initiated at a point of time ti (at which the desired fluid pressure Pref is zero). The graph also shows changes of the output fluid pressure Pout1 of the valve device 56 and a fluid pressure Pwc in the wheel cylinder 24, 36, 50, 52 (wheel brake cylinder pressure Pwc), as the desired fluid pressure Pref is increased. It will be understood from the graph that the wheel brake cylinder pressure Pwc tends to considerably deviate from the desired fluid pressure Pref immediately after the initiation of the depression of the brake pedal 126, even when the output fluid pressure Pout1 detected by the pressure sensor 64 changes accurately following the desired fluid pressure Pref. This tendency arises from a larger amount of the fluid required to be fed into the wheel brake cylinder per unit amount of increase of the wheel brake cylinder pressure in an initial period of the brake application, than in the other or subsequent period. In other words, the required rate of flow of the fluid through the conduit between the linear solenoid valve device 56 and the wheel brake cylinder 24, 26, 50, 52 in the initial period of the brake application is higher than in the subsequent period, so that there arises a large amount of deviation or difference of the wheel brake cylinder pressure Pwc from the output fluid pressure Pout1 of the valve device 56, in the initial period of the brake application. The wheel brake cylinder pressure Pwc may be controlled to more accurately follow a change in the desired fluid pressure Pref (output fluid pressure Pout1), by replacing the control error "error" as the input to the feedback control portion 302 of FIG. 5 by an input value Pref−Pwc. However, this modification requires four pressure sensors for directly detecting the fluid pressures Pwc in the respective four wheel brake cylinders 24, 26, 50, 52, resulting in an increase in the cost of manufacture of the braking system 10 and increased complexity of control of the braking system 10. Further, the output fluid pressure Pout1 may not be accurately controlled following the desired fluid pressure Pref, if the pressure-increasing linear solenoid valve 150 is arranged such that the rate of flow of the fluid through the valve 150 in the subsequent period of the brake application is the same as that in the initial period.

In the view of the above analysis, the controller 66 is adapted such that the rate of flow of the fluid into the wheel brake cylinder is increased in an initial period of brake application. This increase is achieved by using the above-indicated initial fluid flow increasing voltage VFcainc as the the feed-forward pressure-increasing voltage increment VFca when the desired fluid pressure change amount dPref is a positive value and when the desired fluid pressure Pref is equal to or lower than the predetermined threshold Pth, as described before with respect to step S47 in the sub-routine of FIG. 8. The initial fluid flow increasing voltage VFcainc is a predetermined constant, which is larger than the voltage increment VFca as calculated according to the function MAPa of FIG. 9. When the initial fluid flow increasing voltage VFcainc is used, that is, where the affirmative decision (YES) is obtained in step S47, the pressure-increasing fluid pressure difference Pdiffa (Pin−Pout1) is relatively small, and the feed-forward pressure-increasing voltage increment VFca determined by the function MAPa is accordingly large. In view of this fact, the initial fluid flow increasing voltage VFcainc is determined to be larger than the maximum value VFmaxa of the feed-forward pressure-increasing voltage value VFmax. See FIG. 9. When the desired fluid pressure change amount dPref has become smaller than zero, or when the desired fluid pressure has become higher than the predetermined threshold Pth, that is, when the negative decision (NO) is obtained in step S47, the feed-forward pressure-increasing voltage increment VFca calculated according to the function MAPa is used in place of the initial fluid flow increasing voltage VFcainc. However, it is desirable to gradually change the increment VFca from the value VFcainc to the value as calculated according to the function MAPa, particularly when there exists a relatively large difference between the value VFcainc and the value VFca as calculated according to the function MAPa at the time the negative decision is obtained in step S47. In this respect, it is noted that a sudden change in the feed-forward pressure-increasing voltage increment VFca will cause a sudden change in the braking force produced by the wheel brake cylinder.

Then, the arrangement to minimize the "brake dragging" will be described. The normal control of the valve device 56 does not assure complete zeroing of the output fluid pressure Pout1 upon termination of operation of the brake pedal 126. The output fluid pressure Pout1 which has not been zeroed will be referred to as "residual fluid pressure". The residual fluid pressure causes the wheel brake cylinder to provide a small residual braking effect even after complete releasing of the brake pedal 126. This phenomenon is generally called "brake dragging", which may be undesirably felt by the vehicle operator and cause an unnecessary wear of the brake pads and energy consumption. Therefore, it is desirable to prevent the brake dragging by eliminating the residual fluid pressure. The residual fluid pressure can be eliminated by bringing a portion of the fluid passage between the valve device 56 and the RL and RR wheel brake cylinders 50, 52, into communication with a fluid passage leading to the master cylinder 12, when the brake pedal 126 has been returned to the non-operated position, or a position close to the non-operated position. To this end, the controller 66 is adapted to apply the maximum voltage Vmax to the solenoid coil 210 of the pressure-increasing linear solenoid valve 152 for a predetermined time duration $\Delta t$ to eliminate the residual fluid pressure, when the desired fluid pressure Pref has been lowered below a predetermined threshold $\delta$ while the valve device 56 remains in the pressure reducing or holding state. The threshold $\delta$ is a relatively small value.

Figure 17:
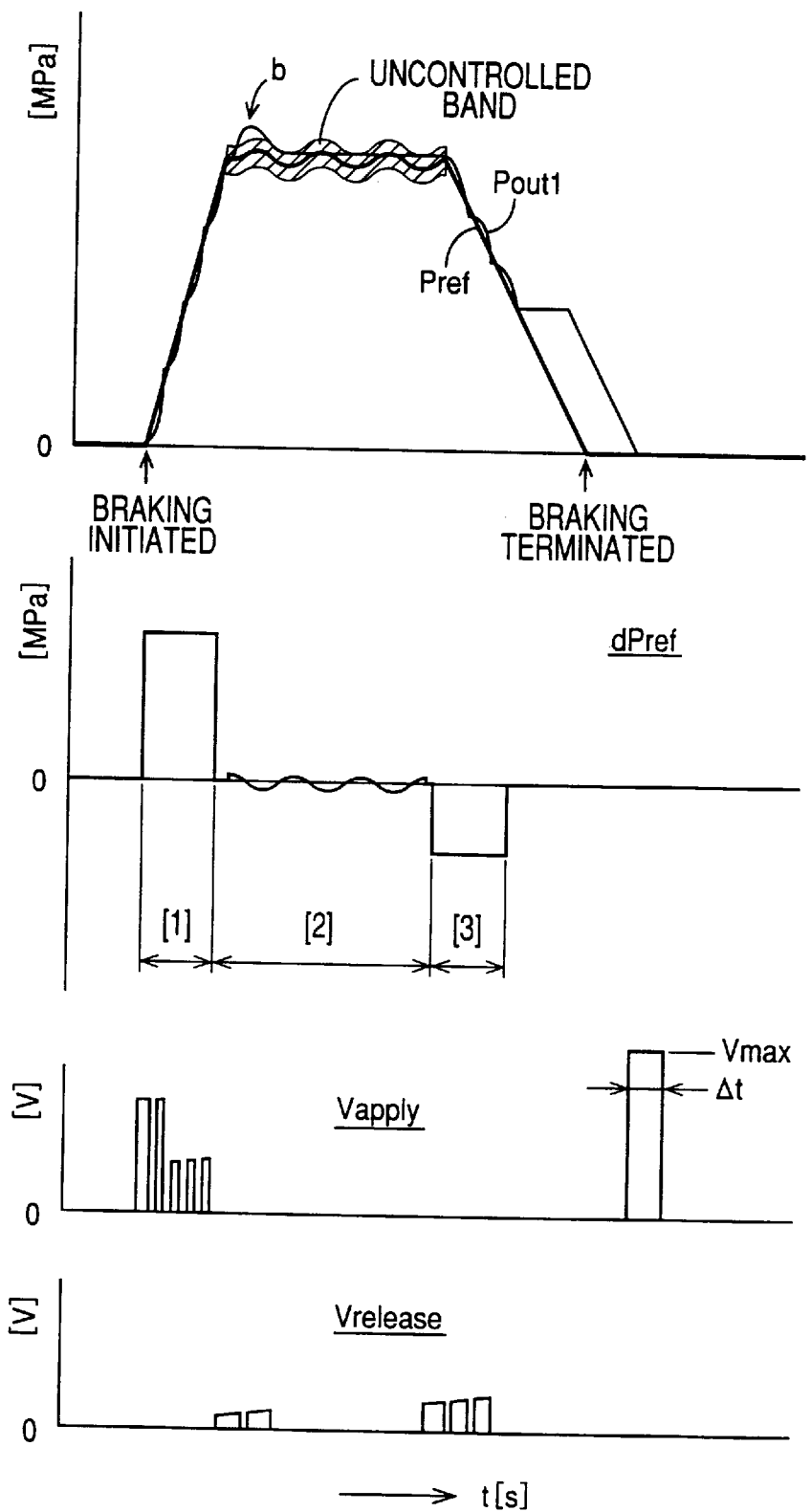
FIG. 17 is a graph schematically illustrating an example of a change in the desired fluid pressure Pref when the controller controls the linear solenoid valve device according to the concept of FIG. 15 and so as to to effect an initial increase of the fluid flow rate and removal of residual fluid pressure from the wheel brake cylinder, and examples of consequent changes in the output fluid pressure Pout1, desired fluid pressure change amount dPref and solenoid voltage values Vapply and Vrelease.

The graph of FIG. 17 schematically shows changes of the desired fluid pressure Pref, output fluid pressure Pout1, desired fluid pressure change amount dPref, pressure-increasing solenoid voltage Vapply and pressure-reducing solenoid voltage Vrelease, when the linear solenoid valve device 56 is controlled according to the concept of FIG. 15 and so as to effect the initial increase of the flow rate of the fluid into the wheel brake cylinder in question and eliminate the residual fluid pressure or brake dragging. In the braking condition [1] indicated in FIG. 17, the valve device 56 is placed in the pressure-increasing state. In an initial portion of the brake application, that is, while the desired fluid pressure Pref is equal to or lower than the threshold Pth, the pressure-increasing solenoid voltage Vapply is made higher than in the subsequent portion of the brake application (in which the desired fluid pressure Pref is higher than the threshold Pth), as a result of the use of the initial fluid flow increasing voltage VFcainc, so as to minimize the deviation of the output fluid pressure Pout1 (the wheel brake cylinder pressure Pwc) from the desired fluid pressure Pref due to insufficient rate of flow of the fluid into the wheel brake cylinder immediately after the initiation of the brake application. In the braking condition [2] indicated in FIG. 17, the valve device 56 is held in the pressure-holding state as long as the output fluid pressure Pout1 remains within an uncontrolled band indicated by hatching in FIG. 17. However, at a point of time indicated by "b", the output fluid pressure Pout1 rises above the upper limit of the uncontrolled band due to an overshoot of the pressure increasing operation, resulting in an increase in the absolute value of the control error "error" so that the valve device 56 is placed in the pressure-reducing state. In the braking condition [3] also indicated in FIG. 17, the desired fluid pressure Pref decreases, and the output fluid pressure Pout1 is lowered with the valve device 56 placed alternately in the pressure-reducing and pressure-holding states. The pressure-reducing reservoir 154 is eventually filled with the fluid discharged from the wheel brake cylinder, so that the output fluid pressure Pout1 can no longer be reduced even with the pressure-reducing linear solenoid valve 154 being placed in the pressure-reducing state.

If the fluid continues to be discharged from the wheel brake cylinder, it means that there exists a leakage of the working fluid. This fluid leakage is detected by a fluid leakage detecting sub-routine of FIG. 19 (which will be described), and the regenerative braking force produced by the regenerative braking system is reduced as the desired braking force (as represented by the depression force acting on the brake pedal 126) is reduced. When the regenerative braking force has been zeroed, the fluid pressure (input fluid pressure Pin) in the portion of the fluid passage 48 between the valve device 56 and the master cylinder 12 is made equal to the fluid pressure (output fluid pressure Pout1) in the portion of the fluid passage 48 between the valve device 56 and the wheel brake cylinders. The output fluid pressure Pout1 is subsequently reduced as the input fluid pressure Pin is reduced. In this respect, the check valve 156 shown in FIG. 3 permits the fluid flow from the wheel brake cylinders toward the master cylinder 12. The step S18 of the main routine of FIG. 7 may be formulated such that the pressure-reducing solenoid voltage Vrelease remains applied to the solenoid coil 210 of the pressure-reducing linear solenoid valve 152 even after the sub-routine of FIG. 19 has detected that the output fluid pressure Pout1 cannot be reduced even with the pressure-reducing valve 152 being open. In the present embodiment, however, the application of the pressure-reducing solenoid voltage Vrelease to the solenoid coil 210 of the valve 152 in the above condition is inhibited from the standpoint of avoiding unnecessary consumption of the electric energy by the valve device 56.

When the desired fluid pressure Pref has been lowered to the threshold value δ or lower immediately before the termination of the brake application (complete releasing of the brake pedal 126), the pressure-increasing solenoid voltage Vapply is raised to the maximum value Vmax, to eliminate the residual fluid pressure (to zero the wheel brake cylinder pressure Pwc). Where the desired fluid pressure Pref is held constant at a relatively high level with the change amount dPref being kept zero, there remains some control error "error" between the desired fluid pressure Pref and the output fluid pressure Pout1. Upon termination of the brake application with the desired fluid pressure Pref being zeroed, however, the output fluid pressure Pout1 is zeroed as a result of the elimination of the residual fluid pressure, so that the control error "error" is not left.

Figure 18:
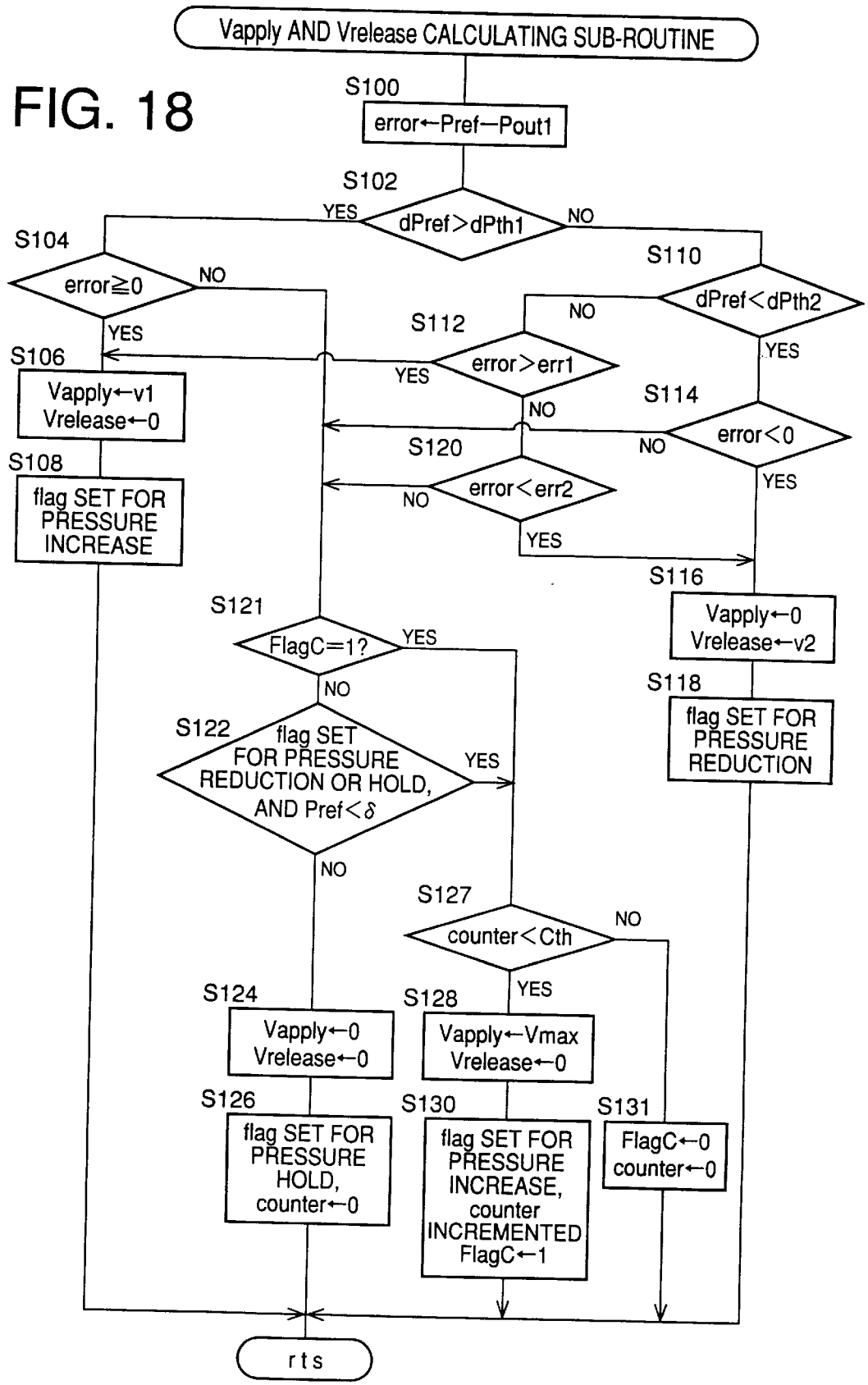
FIG. 18 is a flow chart illustrating a sub-routine executed in step S14 of the main routine of FIG. 7, to calculate the solenoid voltage values Vapply and Vrelease.

Referring to the flow chart of FIG. 18, thee will be described the sub-routine executed in step S14 of the main routine, to calculate the pressure-increasing and pressure-reducing solenoid voltages Vapply and Vrelease. The sub-routine of FIG. 18 is formulated according to the concept illustrated in FIG. 15, and so as to effect the initial increase of the fluid flow rate and the elimination of the residual fluid pressure, which have been described above. The sub-routine of FIG. 18 is initiated with step S100 in which the control error "error" is calculated as Pref−Pout1. Step S100 is followed by step S102 to determine whether the change amount dPref of the desired fluid pressure Pref is larger than the first predetermined threshold dPth1. If an affirmative decision (YES) is obtained in step S102, the control flow goes to step S104 to determine whether the control error "error" is zero or a positive value. If an affirmative decision (YES) is obtained in step S104, the control flow goes to step S106 in which a voltage v1 is set as the pressure-increasing solenoid voltage Vapply, while the pressure-reducing solenoid voltage Vrelease is zeroed. The voltage v1 is a sum of the feed-forward pressure-increasing voltage value VFapply calculated in step S50 of the sub-routine of FIG. 8 and the feedback pressure-increasing voltage value VBapply calculated in step S14 of the main routine of FIG. 7. Step S106 is followed by step S108 in which a pressure control variable "flag" is set to a value indicative of the pressure-increasing state of the valve device 56. Thus, one cycle of execution of the sub-routine of FIG. 18 is terminated. Steps S106 and S108 for placing the valve device 56 in the pressure-increasing state where the change amount dPref is larger than the first threshold dPth1 while the control error "error" is equal to or larger than zero correspond to the pressure increasing operation in the braking condition [1] indicated in FIG. 15. The pressure increasing operation is also effected where a negative decision (NO) is obtained in steps S102 and S110 and an affirmative decision (YES) is obtained in step S112. Step S110 is provided to determine whether the desired fluid pressure change amount dPref is smaller than the second predetermined threshold dPth2. Step S112 is provided to determine whether the control error "error" is larger than the predetermined upper limit err1. Steps S106 and S108 for placing the valve device 56 in the pressure-increasing state where the change amount dPref is smaller than the second threshold dPth2 corresponds to the pressure increasing operation in the braking condition [2] indicated in FIG. 15.

If an affirmative decision (YES) is obtained in step S110 and also in the following step S114, the control flow goes to step S116 in which the pressure-increasing solenoid voltage Vapply is zeroed while a voltage v2 is set as the pressure-reducing solenoid voltage Vrelease. The voltage v2 is a sum of the feed-forward pressure-reducing voltage value VFrelease calculated in step S50 of the sub-routine of FIG. 8 and the feedback pressure-reducing voltage value VBrelease calculated in step S12 of the main routine of FIG. 7. Then, the control flow goes to step S118 in which the pressure control variable "flag" is set to a value indicative of the pressure-reducing state of the valve device 56. Thus, one cycle of execution of the sub-routine of FIG. 18 is terminated. Steps S116 and S118 for placing the valve device 56 in the pressure-reducing state where the change amount dPref is smaller than the second threshold dPth2 while the control error "error" is smaller than zero correspond to the pressure reducing operation in the braking condition [3] indicated in FIG. 15. The pressure reducing operation is also effected when a negative decision (NO) is obtained in step S112 while an affirmative decision (YES) is obtained in the following step S120, which is provided to determine whether the control error "error" is smaller than the lower limit err2. Steps S116 and s118 for placing the valve device 56 in the pressure-reducing state where the change amount dPref is not smaller than the second threshold dPth2 while the control error "error" is smaller than the lower limit err2 correspond to the pressure reducing operation in the braking condition [2] indicated in FIG. 15.

If a negative decision (NO) is obtained in step S104, S114 or S120, the control flow goes to step S121 to determine whether a variable FlagC is set at "1". Immediately after the initiation of the brake application, a negative decision (NO) is obtained in step S121, and the control flow goes to step S122 to determine whether the pressure control variable "flag" is set at the value indicative of the pressure-reducing or pressure-holding state of the valve device 56 while the desired fluid pressure Pref is lower than the threshold 6. If a negative decision (NO) is obtained in step S122, the control flow goes to step S124 in which the pressure-increasing solenoid voltage Vapply and the pressure-reducing solenoid voltage Vrelease are both zeroed. Step S124 is followed by step s126 in which the pressure control variable "flag" is set to a value indicative of the pressure-holding state of the valve device 56 while a variable "counter" is zeroed. Thus, one cycle of execution of the sub-routine of FIG. 18 is terminated. If an affirmative decision (YES) is obtained in step S122, the control flow goes to step S127 to determine whether the variable "counter" is smaller than a predetermined threshold Cth, which determines the predetermined time duration Δt during which the pressure-increasing solenoid voltage Vapply is held at its maximum value Vmax to eliminate the residual fluid pressure (brake dragging). When step S127 is implemented for the first time, an affirmative decision (YES) is obtained in step S127, and the control flow goes to step S128 in which the pressure-increasing solenoid voltage Vapply is raised to the maximum value Vmax while the pressure-reducing solenoid voltage Vrelease is zeroed. Step S128 is followed by step S130 in which the variable "flag" is set to the value indicative of the pressure-increasing state of the valve device 56, and the variable "counter" is incremented. Further, the variable FlagC is set to "1" in step S130, to indicate that the elimination of the residual fluid pressure has been initiated. Thus, one cycle of execution of the sub-routine of FIG. 18 is terminated. Steps S127, S128 and S130 are repeatedly implemented since an affirmative decision (YES) is obtained in step S121. When the predetermined time duration Δt has passed after the variable FlagC has been set to "1", a negative decision (NO) is obtained in step S127, and the control flow goes to step S131 in which the variable FlagC and the variable "counter" are both reset to "0". Thus, one cycle of execution of the sub-routine of FIG. 18 is terminated.

Figure 19:
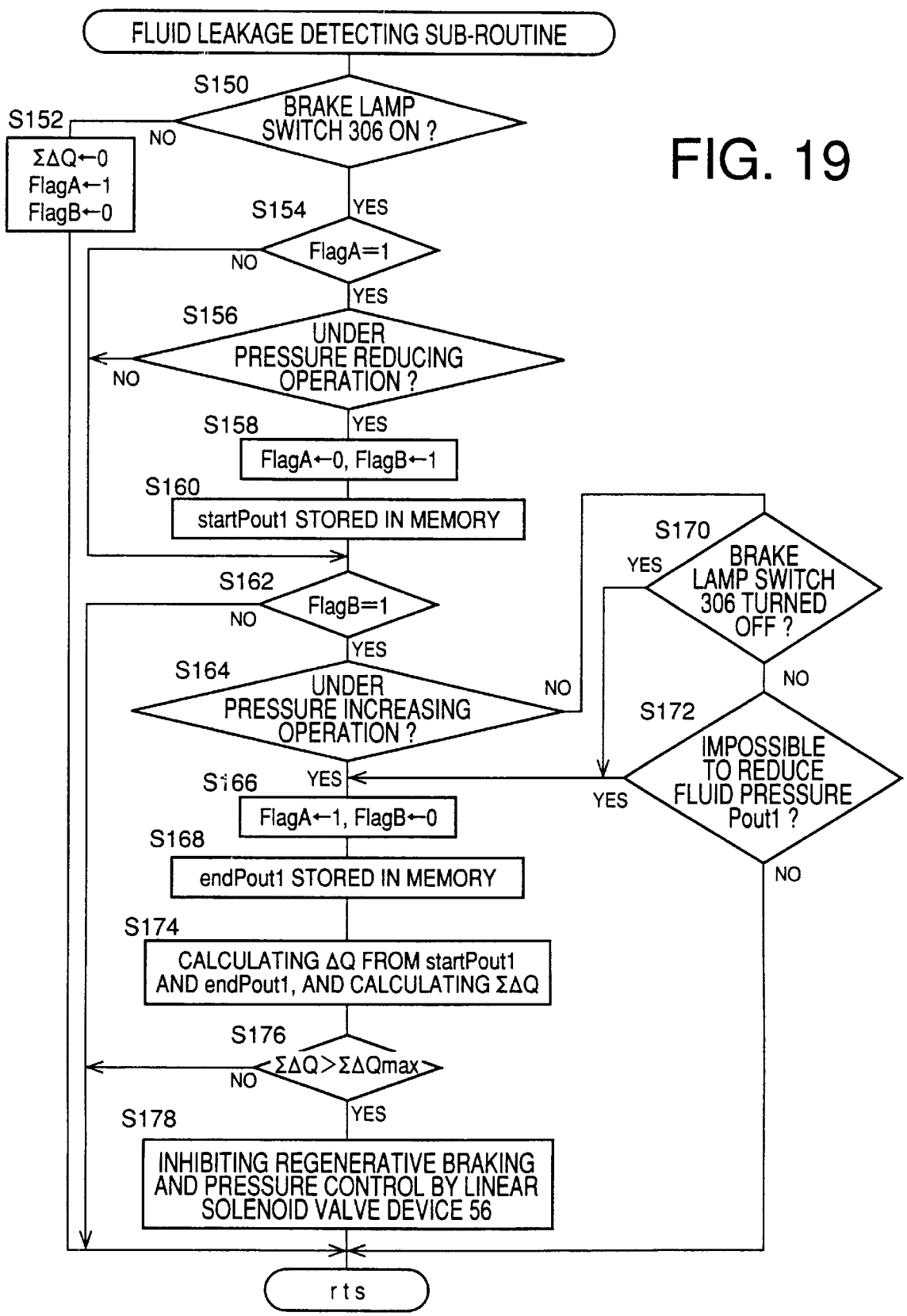
FIG. 19 is a flow chart illustrating a sub-routine executed in step S16 of the main routine of FIG. 7, to perform an operation to detect leakage of the fluid.

The fluid leakage detecting sub-routine executed in step S16 of the main routine of FIG. 7 will be described referring to the flow chart of FIG. 19. This sub-routine is initiated with step S150 to determine whether the brake pedal 126 is being depressed by the vehicle operator (whether the vehicle is braked by the hydraulic braking system 10). This determination is effected based on an output signal of a BRAKE LAMP switch 306 (FIG. 1), that is, depending upon whether the switch 306 is on or off. If a negative decision (NO) is obtained in step S150, the control flow goes to step S152 to reset a variable ΣΔQ to "0", set a variable FlagA to "1" and reset a variable FlagB to "0". The variable ΣΔQ represents a total amount of the fluid which has been accommodated in the pressure-reducing reservoir 154. Thus, one cycle of execution of the sub-routine of FIG. 19 is terminated. If an affirmative decision (YES) is obtained in step S150, the control flow goes to step S154 to determine whether the variable FlagA is set at "1". If an affirmative decision (YES) in step S156, the control flow goes to step S156 to determine whether the output fluid pressure Pout1 is being reduced by placing the valve device 56 alternately in the pressure-holding and pressure-reducing states. If an affirmative decision (YES) is obtained in step S156, the control flow goes to step S158 in which the variables FlagA and FlagB are reset to "0" and set to "1", respectively. Step S158 is followed by step S160 in which a value startPout1 is stored in the RAM of the controller 66. The value startPout1 is a value of the output fluid pressure Pout1 when the pressure reduction of the output fluid pressure Pout1 has been initiated. The determination in step S156 is effected based on a change of the variable "flag" which is set in the sub-routine of FIG. 18.

Step S160 is followed by steps S162 and S164 to determine whether the pressure reduction has been terminated and the pressure increase has been initiated. Since the variable FlagB is reset to "0" in step S152 and set to "1" in step S158, an affirmative decision (NO) is obtained in step S162 immediately after the initiation of the brake application, that is, when step S172 is implemented for the first time. In this case, which the control flow returns to step S150, while skipping step S164. Step S164 is implemented only after the affirmative decision is obtained in step S156 and the variable FlagB is set to "1" in step S158. Therefore, an affirmative decision (YES) obtained in step S164 means that the pressure increasing operation has been initiated after the pressure reducing operation. In this case, the control flow goes to step S166 in which the variables FlagA and FlagB are set to "1" and reset to "0", respectively, for preparation for the next determination as to whether the pressure reduction has been initiated. Step S166 is followed by step S168 in which a value endPout1 is stored in the RAM of the controller 66. The value endPout1 is a value of the output fluid pressure Pout1 when the pressure reduction of the output fluid pressure Pout1 has been terminated.

If a negative decision (NO) is obtained in step S164, the control flow goes to step S170 to determine whether the BRAKE LAMP switch 306 has been turned off (whether the brake pedal 126 has been returned to the non-operated position), and step S172 to determine whether it is impossible to reduce the output fluid pressure Pout1. The determination in step S172 is effected by determining whether the pressure-reducing reservoir 154 has been filled with the fluid and can no longer accommodate the fluid, making it impossible to reduce the output fluid pressure Pout1 even with the pressure-reducing linear solenoid valve 152 being open. This determination may be effected in various manners. In the present embodiment, the controller 66 is adapted to determine that the reduction of the output fluid pressure Pout1 is impossible, if the output fluid pressure Pout1 is not reduced a predetermined time after the variable "flag" is set to the value indicative of the pressure-reducing state of the valve device 56, and while the change amount dPref of the the desired fluid pressure Pref is smaller than a predetermined threshold which is a negative value. If an affirmative decision (YES) is obtained in either one of the steps S170, S172, the control flow goes to steps S166 and S168. Thus, the value endPout1 indicating the output fluid pressure Pout1 at the end of the pressure reducing operation is stored not only upon initiation of a pressure increasing operation, but also upon termination of the brake application and upon determination that the output fluid pressure Pout1 cannot be reduced.

Figure 20:
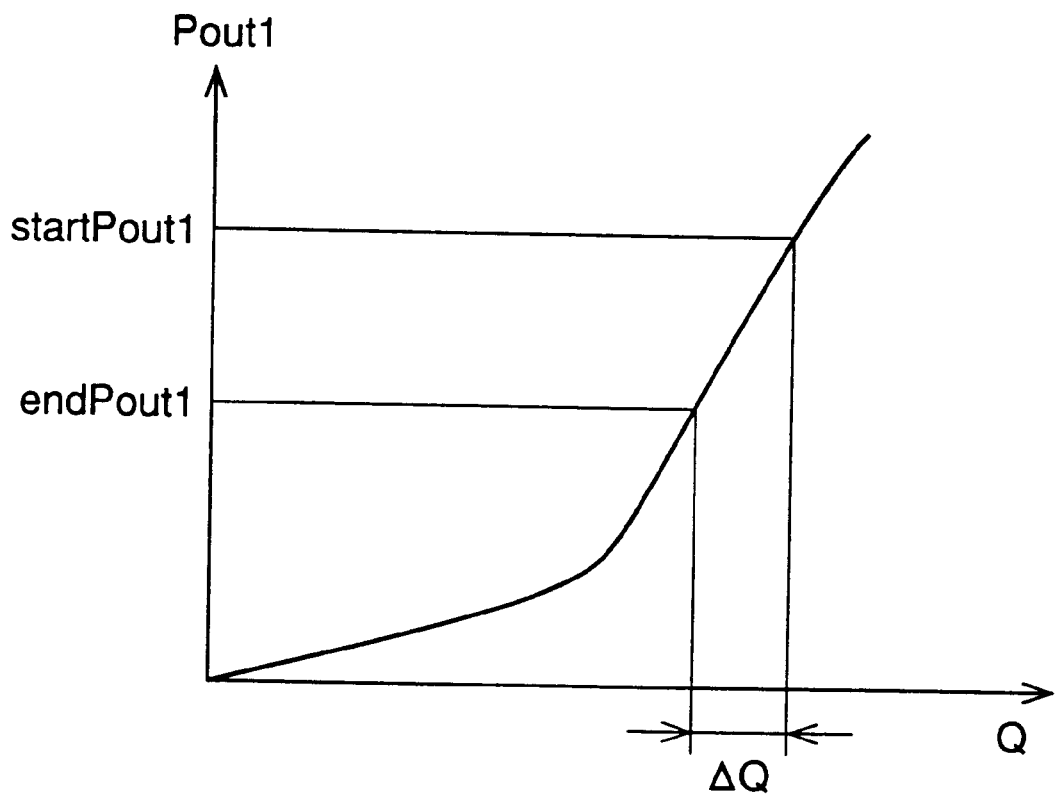
FIG. 20 is a graph indicating a relationship used in step S174 of the sub-routine of FIG. 19, between fluid pressure in the wheel brake cylinder and amount of the fluid in the wheel brake cylinder.

Step S168 is followed by step S174 in which an amount WQ of the fluid which has been fed into the pressure-reducing reservoir 154 during the pressure reducing operation is calculated based on the values startPout1 and endPout1, and the calculated amount ΔQ is added to the total amount ΣΔQ of the fluid which has been accommodated in the reservoir 154. While the fluid amount ΔQ can be calculated from the values startPout1 and endPout2 in an appropriate manner, the controller 66 in the present embodiment is adapted to calculate the fluid amount ΔQ according to a stored data map as represented by a curve indicated in the graph of FIG. 20, for example. The output fluid pressure Pout1 can be considered to be substantially equal to the wheel brake cylinder pressure Pwc, and the fluid amount Q in the wheel brake cylinder 24, 26, 50, 52 has a given relationship with the wheel brake cylinder pressure Pwc, as represented by a curve of FIG. 20 which in turn is represented by the stored data map. Therefore, the fluid amount ΔQ which has been discharged from the wheel brake cylinder 24, 26, 50, 52 and fed into the reservoir 154 while the output fluid pressure Pout1 is lowered from the value startPout1 down to the value endPout1 can be calculated according to the relationship curve of FIG. 20.

Step S174 is followed by step S176 to determine whether the total fluid amount ΣΔQ calculated in step S174 is larger than an upper limit ΣΔQmax, which is the storage capacity of the reservoir 154. If an affirmative decision (YES) is obtained in step S176, it means that a leakage of the fluid has taken place between the pressure-reducing linear solenoid valve 152 and the pressure-reducing reservoir 154. In this case, the control flow goes to step S178 to an inhibition flag to "1" to inhibit the regenerative braking operation of the regenerative braking system and the braking pressure control by the linear solenoid valve device 56. As a result, the solenoid coils of the shut-off valves 30, 32, 80 are de-energized, and the voltage application to the linear solenoid valve device 56 is inhibited, so that the present hydraulic braking system 10 is operated in the same manner as an ordinary hydraulic braking system not including the linear solenoid valve device 56. The content of the inhibition flag indicated above is also used by the regenerative braking system, to inhibit the regenerative braking operation.

As a result of the inhibition of the voltage application to the linear solenoid valve device 56 in response to the detection of the fluid leakage, the pressure-increasing linear solenoid valve 150 functions as a pressure-reducing valve having an opening pressure difference of about 3 MPa, and the fluid pressure in the RL and RR wheel brake cylinders 50, 52 are unnecessarily reduced. To minimize this inconvenience, the solenoid coil 210 of the pressure-increasing linear solenoid valve 150 may be energized with an appropriate voltage at least during the brake application. This voltage must be selected so as not to cause a problem of overheating of the valve 150 even if the voltage is applied continuously.

However, the control by the controller 66 may be modified so as to permit the regenerative braking operation and the operation of the pressure-increasing linear solenoid valve 150, but to inhibit the operation of the pressure-reducing linear solenoid valve 152. In this case, the main routine of FIG. 7 is substantially the same as described above, but the sub-routine of FIG. 18 is modified so as to inhibit the application of the pressure-reducing solenoid voltage Vrelease to the solenoid coil 210 of the valve 152. In this modified arrangement, it is desirable that the sum of the regenerative braking force produced by the regenerative braking system and the braking force produced by the hydraulic braking system 10 be equal to the desired braking force as represented by the operating state of the brake pedal 126.

The sub-routine of FIG. 19 executed in step S16 of the main routine may be eliminated.

In the present hydraulically operated braking system 10, the pressure-reducing linear solenoid valve 152 is held in the open state in the event of a failure or malfunction of the controller 66 or the valve 152 per se. In this event, however, the wheel brake cylinders 24, 26, 50, 52 are operated to provide a braking force for braking the wheels to some extent, since the storage capacity of the pressure-reducing reservoir 154 is smaller than the sum of the maximum fluid volumes that can be accommodated in the wheel brake cylinders, so that the fluid is not entirely discharged from each wheel brake cylinder through the valve 152 placed in the open state. While the pressure-increasing linear solenoid valve 150 is normally controlled by the controller 66, the wheel brake cylinders are supplied with the pressurized fluid delivered from the master cylinder 12 through the valve 150, so that the fluid pressures in the wheel brake cylinders are increased to the levels corresponding to the desired fluid pressure Pref as represented by the operating state of the brake pedal 126. Where the control of the valve 150 by the controller 66 is not normal, the valve 150 simply functions as a pressure-reducing valve having an opening pressure difference of about 3 MPa, and the pressurized fluid can be supplied to the wheel brake cylinders through the pressure-reducing valve 150. Accordingly, the wheel brake cylinder pressure can be raised to a sufficiently high level when the depression force acting on the brake pedal 126 depressed by the vehicle operator is increased. Further, since the pressurized fluid of the constant pressure source 20 is supplied through the rear pressure portion R of the master cylinder 12, the operating amount of the brake pedal 126 is not increased in the abnormal condition indicated above.

It will be understood from the foregoing explanation of the present embodiment that the solenoid-operated biasing devices 194 and the biased members 204 of the pressure-increasing and pressure-reducing linear solenoid valves 150, 152 constitute a valve driving device which is operated with an electric current applied thereto, to generate a drive force acting on the valve member 200 of the seating valve 190 so as to move the valve member 200 to be seated on the valve seat 202. It will also be understood that the controller 66 functions as a control device adapted to control the electric current to be applied to the valve driving device 194, 204. It will also be understood that a portion of the controller 66 assigned to implement step S10 of the main routine of FIG. 7 (sub-routine of FIG. 18) constitutes a stepping control device adapted to increment the amount of the electric current to be applied to the valve driving device 194, 204 when the seating valve 190 is operated from the closed state into the open state. This stepping control device determines an increment VFca, VFcr of the amount of the electric current such that the increment decreases with an increase in the pressure difference Pdiffa, Pdiffr.

It will be further understood that the master cylinder 12, master reservoir 18 and the constant pressure source 20 cooperate to constitute a hydraulic pressure source adapted to pressurize a working fluid according to an operation of a brake operating member in the form of the brake pedal 126 so that the pressurized fluid is supplied to each wheel brake cylinder, and that the master reservoir 18 and the pressure-reducing reservoir 154 function as a primary reservoir and an auxiliary reservoir, respectively. It will also be understood that the pressure-increasing and pressure-reducing linear solenoid valves 150, 152 cooperate to constitute a first pressure control valve device, while the solenoid-operated shut-off valves 42, 44, 58, 72, 84, 86 cooperate to constitute a major portion of a solenoid-operated second pressure control valve device.

It will also be understood that a portion of the controller 66 assigned to implement steps S10, S12, S14 and S18 of the main routine provides a cooperative control device adapted to control the pressure control valve device such that the pressure of the pressurized fluid to be supplied to the wheel brake cylinder is lower than the master cylinder pressure by an amount corresponding to a regenerative braking force generated by the regenerative braking system. It will also be understood that a portion of the controller 66 assigned to implement step S18 of the main routine provides a fluid leakage detecting device adapted to detect a leakage of the working fluid from the hydraulic braking system.

In the embodiment of FIG. 18, the pressure-increasing and pressure-reducing solenoid voltage values Vapply and Vrelease are calculated according to a comparatively complicated rule or concept illustrated in the table of FIG. 15. However, the rule used for calculating the solenoid voltages Vapply and Vrelease may be simplified as described below.

FIG. 21 illustrates an example of a simplified rule for calculating the solenoid voltages Vapply and Vrelease. The operating state of the linear solenoid valve device 56 is determined on the basis of the signs of the control error "error" and the change amount dPref of the desired fluid pressure Pref (depending upon whether the control amount "error" and the change amount dPref are positive (or zero) or negative. Described more particularly, where the desired fluid pressure change amount dPref is a zero or positive value, as indicated at [1] in FIG. 21, the valve device 56 is placed in the pressure-increasing or pressure-holding state, depending upon whether the control error "error" is a positive (or zero) value or a negative value. In this braking condition [1], the valve device 56 is inhibited from being placed in the pressure-reducing state. Where the desired fluid pressure change amount dPref is a negative value, as indicated at [2] in FIG. 21, the valve device 56 is placed in the pressure-holding or pressure-reducing state, depending upon whether the control error "error" is a positive (or zero) value or a negative value. In this braking condition [2], the valve device 56 is inhibited from being placed in the pressure-increasing state.

Figure 22:
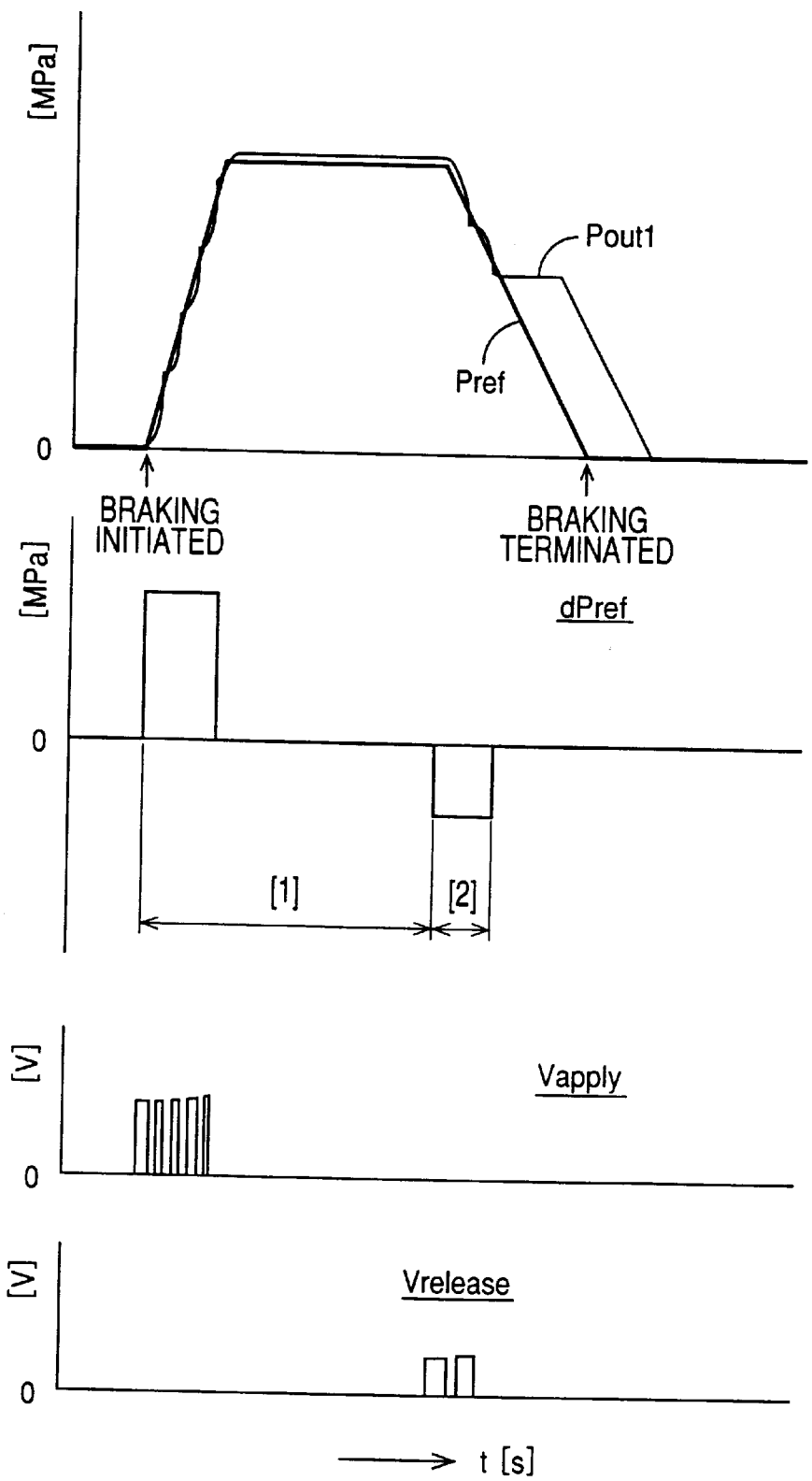
FIG. 22 is a graph schematically illustrating an example of a change in the desired fluid pressure Pref when the controller controls the linear solenoid valve device according to the concept of FIG. 21, and examples of consequent changes in the output fluid pressure Pout1, desired fluid pressure change amount dPref and solenoid voltage values Vapply and Vrelease.

The graph of FIG. 22 schematically shows changes of the desired fluid pressure Pref, output fluid pressure Pout1, desired fluid pressure change amount dPref, pressure-increasing solenoid voltage Vapply and pressure-reducing solenoid voltage Vrelease, when the linear solenoid valve device 56 is controlled according to the rule or concept of FIG. 21. In this embodiment, too, the sub-routine to calculate the solenoid voltages Vapply and Vrelease may be adapted to effect the initial increase of the flow rate of the fluid into the wheel brake cylinder and the elimination of the residual fluid pressure or brake dragging, as described above with respect to the first embodiment. No redundant description in this respect will be provided. As shown in the graph of FIG. 22, the valve device 56 is placed in the pressure-increasing and pressure-holding states, in the braking condition [1], and in the pressure-reducing and pressure-holding states in the braking condition [2].

FIG. 23 illustrates another example of a simplified rule for calculating Vapply and Vrelease, which rule is basically similar to that of FIG. 21. According to this rule, the valve device 56 is placed in the pressure-holding state and inhibited from being placed in the pressure-increasing or pressure-reducing state, where the desired fluid pressure change amount dPref is within a predetermined range between dPth1 and dPth2, irrespective of the sign of the control error "error". Described more particularly, where the desired fluid pressure change amount dPref is larger than a threshold dPth1, as indicated at [1] in FIG. 23, the valve device 56 is placed in the pressure-increasing or pressure-holding state, depending upon the sign of the control error "error", as in the embodiment of FIG. 21. Where the desired fluid pressure change amount dPref is within the range between the threshold dPth1 (upper limit) and a threshold dPth2 (lower limit), as indicated at [2] in FIG. 23, the valve device 56 is placed in the pressure-holding state, irrespective of the sign of the control error "error". It is noted that the threshold dPth2 is smaller than the threshold dPth1. Where the desired fluid pressure change amount dPref is smaller than the threshold dPth2, as indicated at [3] in FIG. 23, the valve device 56 is placed in the pressure-holding or pressure-reducing state, depending upon the sign of the control error "error", as in the embodiment of FIG. 21.

Figure 24:
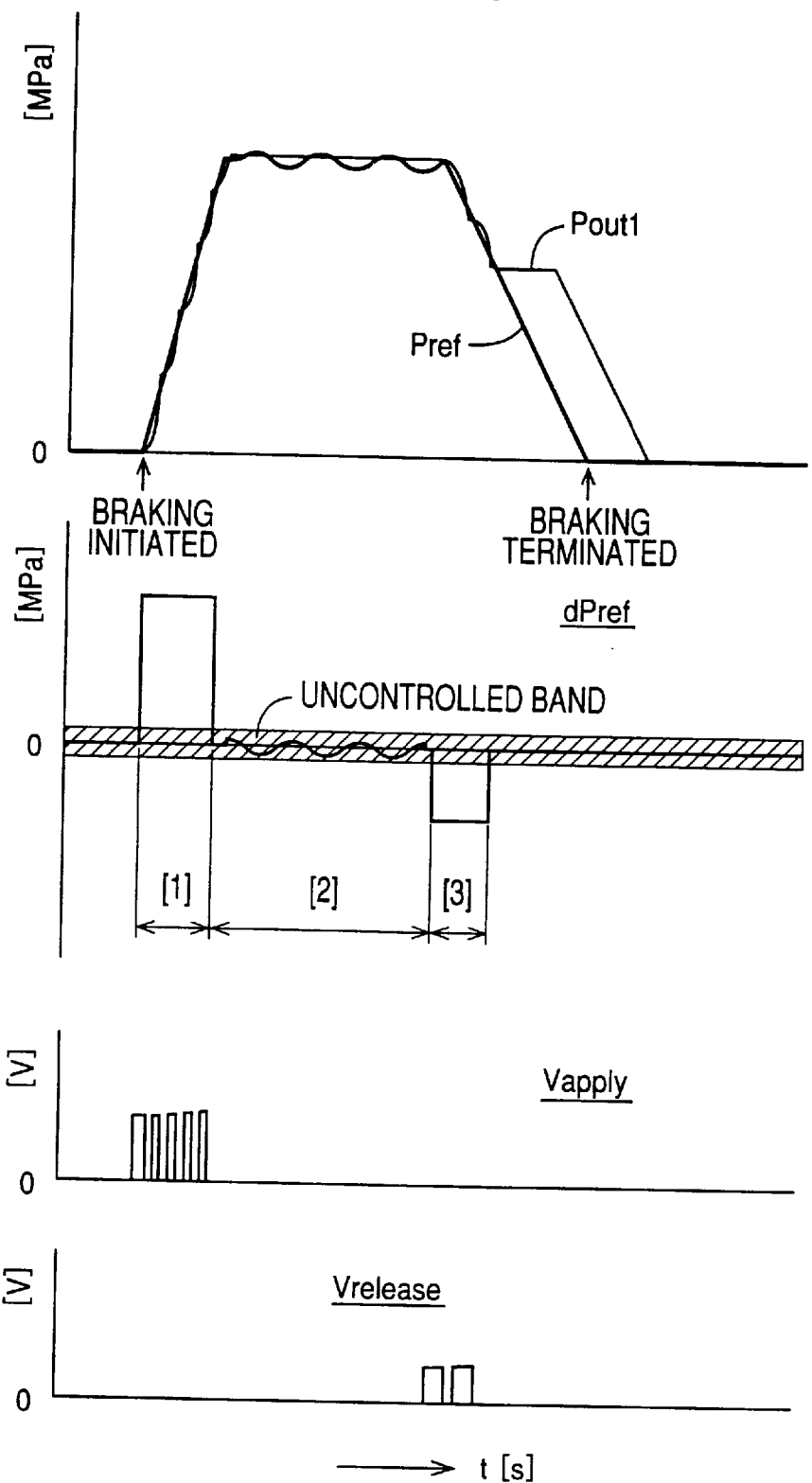
FIG. 24 is a graph schematically illustrating an example of a change in the desired fluid pressure Pref when the controller controls the linear solenoid valve device according to the concept of FIG. 23, and examples of consequent changes in the output fluid pressure Pout1, desired fluid pressure change amount dPref and solenoid voltage values Vapply and Vrelease.

The graph of FIG. 24 schematically shows changes of the desired fluid pressure Pref, output fluid pressure Pout1, desired fluid pressure change amount dPref, pressure-increasing solenoid voltage Vapply and pressure-reducing solenoid voltage Vrelease, when the linear solenoid valve device 56 is controlled according to the rule or concept of FIG. 23. According to the rule of FIG. 23, there is provided an uncontrolled band indicated by a hatched area in FIG. 24, which corresponds to the braking condition [2] in which the desired fluid pressure change amount dPref is close to zero. In this uncontrolled band, the valve device 56 is placed in the pressure-holding state. In the braking condition [1], the valve device 56 is placed in the pressure-increasing or pressure-holding state. In the braking condition [3], the valve device 56 is placed in the pressure-reducing or pressure-holding state. The rule of FIG. 23 is effective to prevent frequent alternate pressure-increasing and pressure-reducing operations of the valve device 56 even while the absolute value of the desired fluid pressure change amount dPref is relatively small, that is, even while the desired fluid pressure Pref alternately increases and decreases by a relatively small amount.

Figure 26:
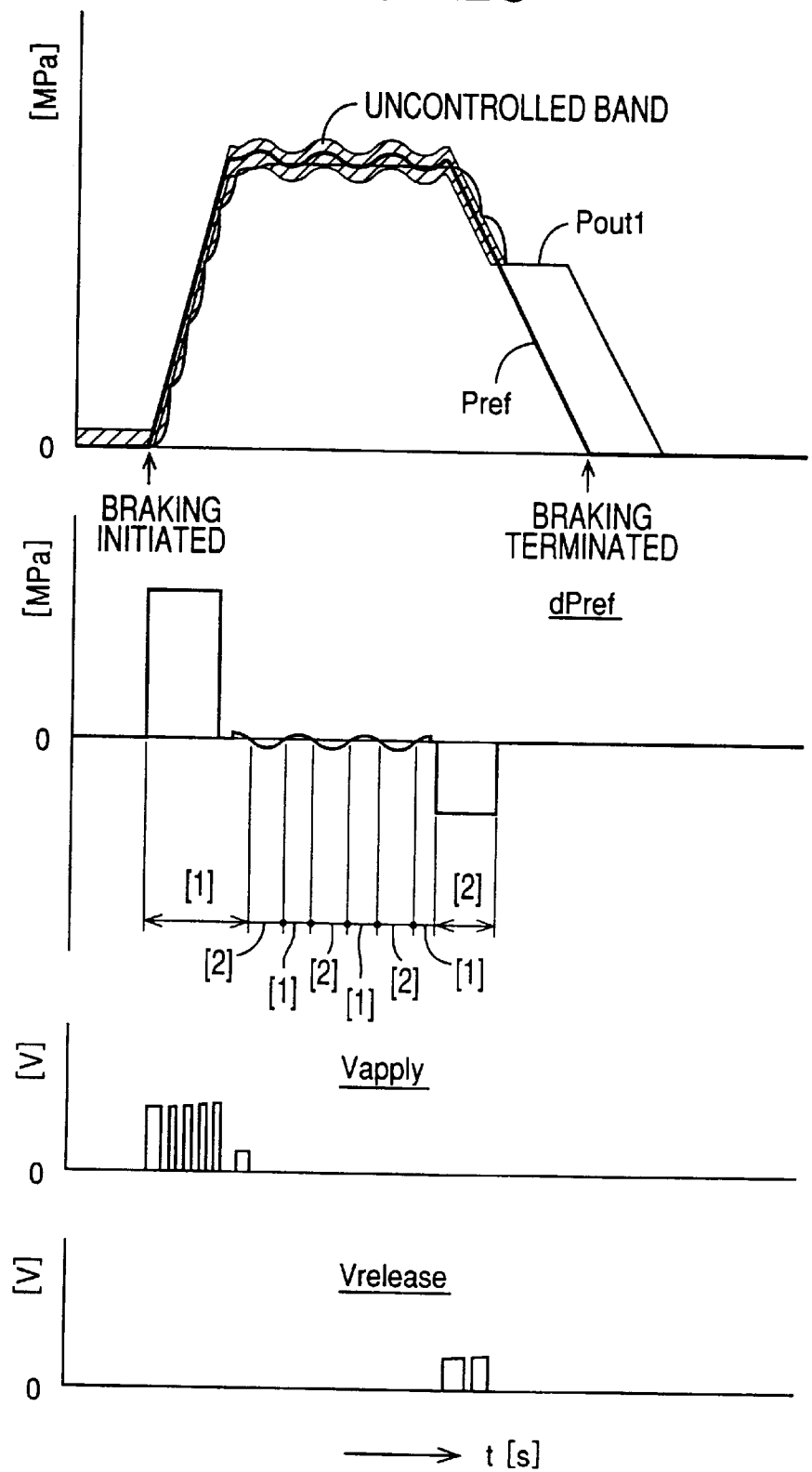
FIG. 26 is a graph schematically illustrating an example of a change in the desired fluid pressure Pref when the controller controls the linear solenoid valve device according to the concept of FIG. 25, and examples of consequent changes in the output fluid pressure Pout1, desired fluid pressure change amount dPref and solenoid voltage values Vapply and Vrelease.

A rule indicated in the table of FIG. 25 may be used in place of the rules of FIGS. 21 and 23. Like the rule of FIG. 23, this rule of FIG. 25 is formulated to prevent frequent alternate pressure-increasing and pressure-reducing operations of the valve device 56 while the absolute value of the desired fluid pressure change amount dPref is relatively small. According to the rule of FIG. 25, which is a modification of the rule of FIG. 21, the valve device 56 is placed in the pressure-holding state when the absolute value of the control error "error" is relatively small. In a braking condition indicated at [1] in FIG. 25, the valve device 56 is placed in the pressure-increasing state where the control error "error" is larger than a predetermined threshold err1 (positive value), and is placed in the pressure-holding state where the control error "error" is not larger than the threshold err1. In a braking condition [2], the valve device 56 is placed in the pressure-holding state where the control error "error" is smaller than a predetermined threshold err2 (negative value), and is placed in the pressure-reducing state where the control error "error" is not smaller than the threshold err2. While the uncontrolled band is provided with respect to the desired fluid pressure change amount dPref according to the rule of FIG. 23, an uncontrolled band is provided with respect to the control error "error" according to the rule of FIG. 25. The graph of FIG. 26 schematically shows changes of the desired fluid pressure Pref, output fluid pressure Pout1, desired fluid pressure change amount dPref, pressure-increasing solenoid voltage Vapply and pressure-reducing solenoid voltage Vrelease, when the linear solenoid valve device 56 is controlled according to the rule or concept of FIG. 25. Since the uncontrolled band is provided for the desired fluid pressure Pref, the control response is sufficiently high, and the frequent pressure-increasing and pressure-reducing operations are prevented while the control error "error" is smaller than the width of the uncontrolled band.

As described above, the provision of the uncontrolled band with respect to the control error "error" has a result similar to that of the provision of the uncontrolled band with respect to the desired fluid pressure change amount dPref. As is apparent from the tables of FIGS. 23 and 25, direct transition between the pressure-increasing operation and the pressure-reducing operation can be prevented by the provision of the uncontrolled band with respect to at least one of the desired fluid pressure change amount dPref and the control error "error", since the valve device 56 is held in the pressure-holding state as long as the desired fluid pressure change amount dPref and/or the control error "error" is/are held in the uncontrolled band.

However, the valve device 56 may be frequently switched between the pressure-increasing and pressure-reducing states, even in the presence of the uncontrolled band, where the desired fluid pressure change amount dPref increases and decreases near the threshold dPth1. In this case, there arise problems of increased operating noise and deteriorated durability of the valve device 56. These problems can be solved by providing a hysteresis in the transition of the valve device 56 between the pressure-holding and pressure-increasing states, more precisely, by determining the thresholds used for changing the operating state of the valve device 56 between the pressure-holding and pressure-increasing states, such that the threshold used for switching the valve device 56 from the pressure-holding state to the pressure-increasing state is larger than the threshold used for switching the valve device 56 from the pressure-increasing state to the pressure-holding state. Similar hysteresis may be provided in the transition between the pressure-holding and pressure-reducing states of the valve device 56.

Figure 27:
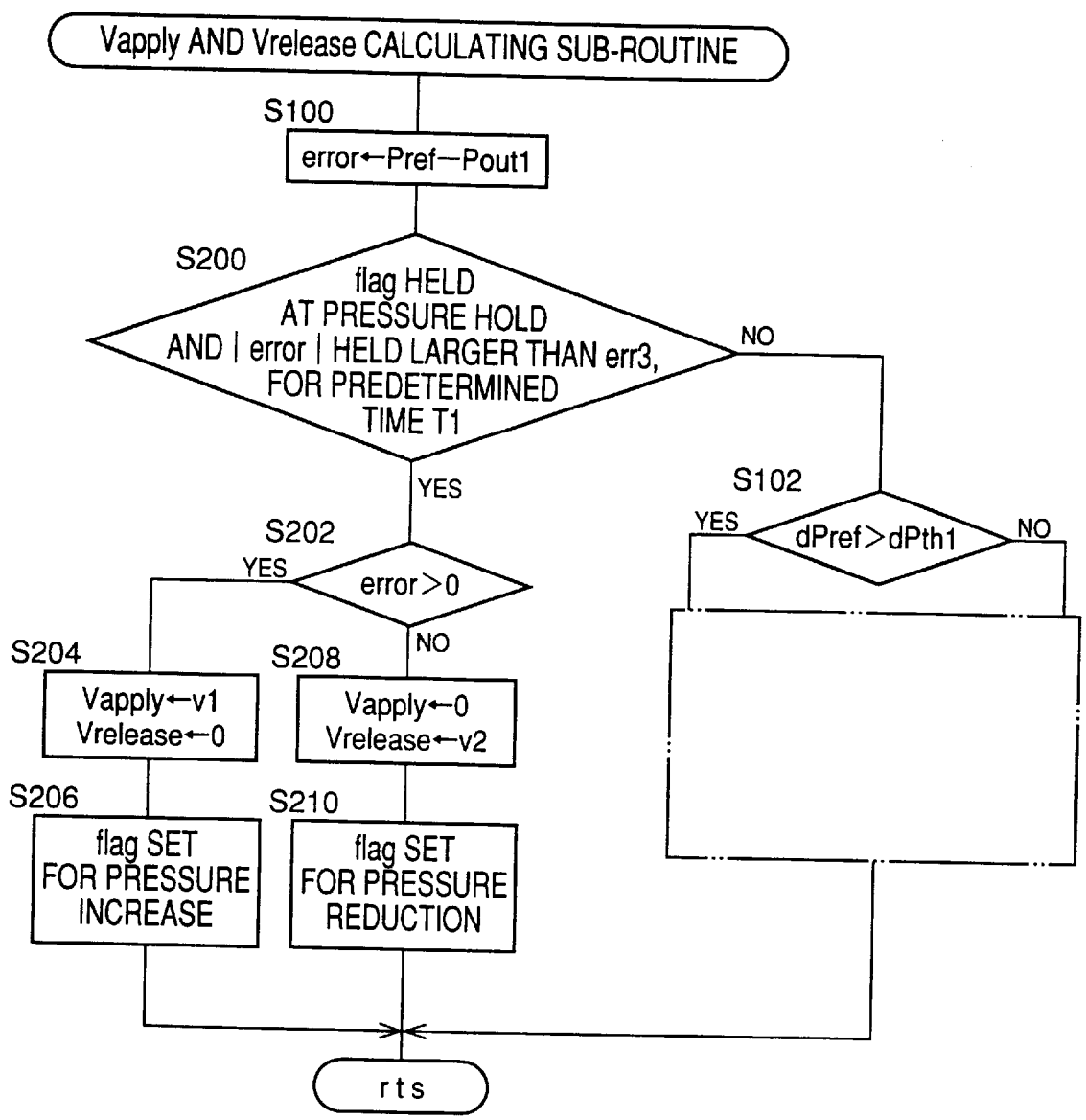
FIG. 27 is a flow chart illustrating a sub-routine executed in place of the sub-routine of FIG. 18, to calculate the solenoid voltage values Vapply and Vrelease, in a yet further embodiment of this invention.

The sub-routine of FIG. 18 for calculating the pressure-increasing and pressure-reducing solenoid voltages Vapply and Vrelease in the embodiment of FIGS. 1–20 may be modified as illustrated in the flow chart of FIG. 27. The sub-routine of FIG. 27 is initiated with step S100 to calculate the control error "error". Step S100 is followed by step S200 to determine whether the absolute value of the control error "error" is held larger than a predetermined threshold err3, for more than a predetermined time T1, while the pressure control variable "flag" is held at the value indicative of the pressure-holding state. This determination is preferably effected based on the content of a counter which counts the number of affirmative decisions in sub-steps for determining whether the pressure control variable "flag" is set for the pressure-holding state and whether the absolute value of the control error "error" is larger than the threshold err3. If a negative decision (NO) is obtained in step S200, the control flow goes to step S102 and the subsequent steps of the sub-routine of FIG. 18. If an affirmative decision (YES) is obtained in step S200, the control flow goes to S202 to determine whether the control error "error" is a positive value. If an affirmative decision (YES) is obtained in step S202, the control flow goes to step S204 in which the voltage v1 is set as the pressure-increasing solenoid voltage Vapply, while the pressure-reducing solenoid voltage Vrelease is zeroed. Step S204 is followed by step S206 in which the pressure control variable "flag" is set at the value indicative of the pressure-increasing state. Thus, one cycle of execution of the sub-routine of FIG. 27 is terminated. If the control error "error" is a negative value, a negative decision (NO) is obtained in step S202, and the control flow goes to step S208 in which the voltage v2 is set as the pressure-reducing solenoid voltage Vrelease, while the pressure-increasing solenoid voltage Vapply is zeroed. Step S208 is followed by step S210 in which the pressure control variable "flag" is set at the value indicative of the pressure-reducing state. Thus, one cycle of execution of the sub-routine of FIG. 27 is terminated.

It will be understood that a portion of the controller 66 assigned to implement steps S200–S210 constitutes control error reducing control means for controlling the linear solenoid valve device 56 so as to reduce the control error "error", such that the valve device 56 is placed in the pressure-increasing or pressure-reducing state where the control error "error" is held larger than the threshold err3 for more than the predetermined time T1 while the valve device 56 is held in the pressure-holding state. It is desirable that the fluid pressure control gain be smaller while the control error reducing control means is in operation, than while this control means is not in operation. For instance, it is desirable that the voltage v1 or v2 set in step S204 or S208 be smaller than the voltage v1 or v2 set in step S106 or S116.

Figure 28:
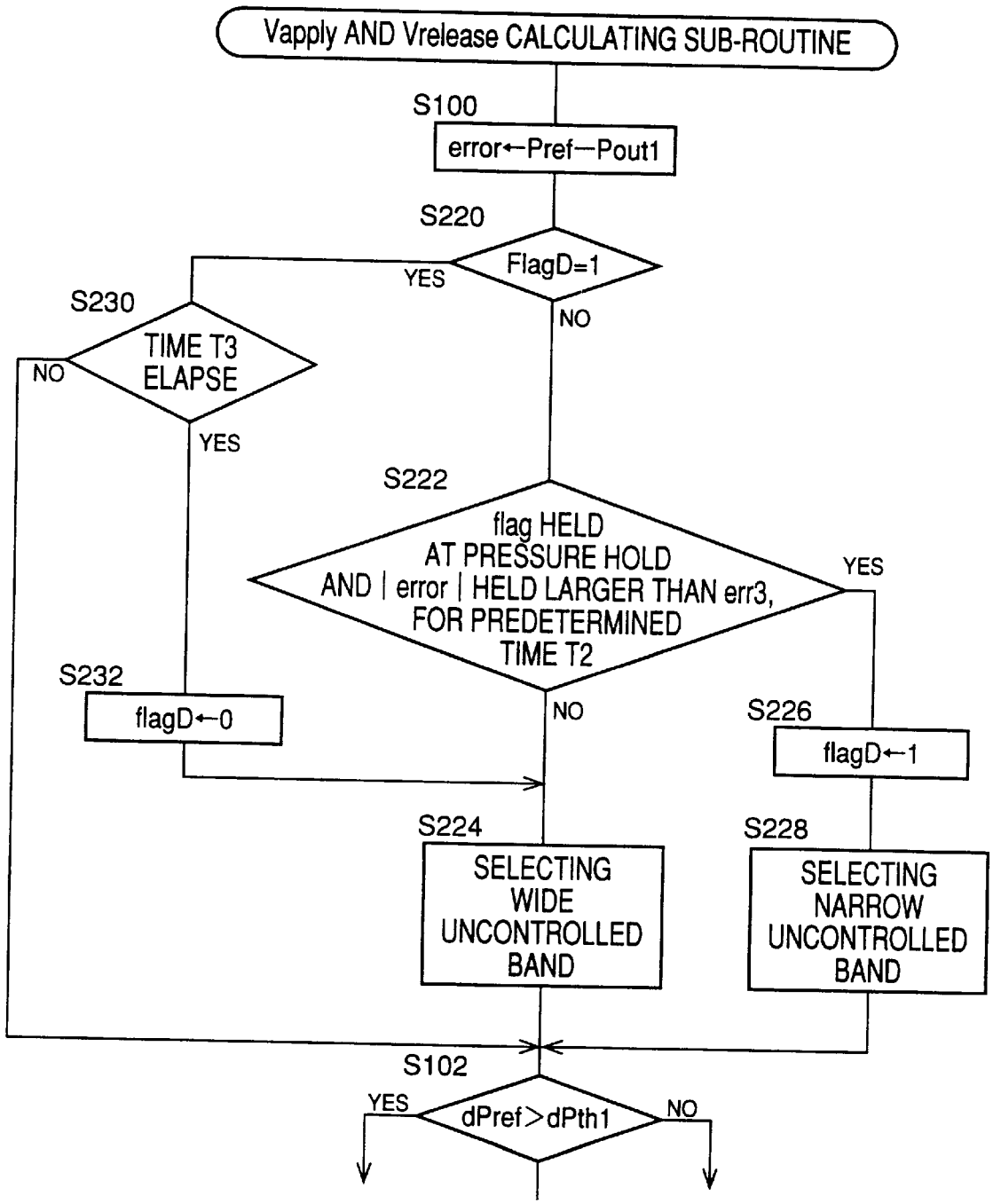
FIG. 28 is a flow chart illustrating a sub-routine to calculate the solenoid voltage values Vapply and Vrelease, in still another embodiment of this invention.

The sub-routine of FIG. 18 for calculating the pressure-increasing and pressure-reducing solenoid voltages Vapply and Vrelease in the embodiment of FIGS. 1–20 may be modified as illustrated in the flow chart of FIG. 28. The sub-routine of FIG. 28 is also initiated with step S100 to calculate the control error "error". Step S100 is followed by step S220 to determine whether a variable "FlagD" is set at "1". Initially, a negative decision (NO) is obtained in step S220, and the control flow goes to step s222 to determine whether the absolute value of the control error "error" is held larger than a predetermined threshold err3, for more than a predetermined time T2, while the pressure control variable "flag" is held at the value indicative of the pressure-holding state. Initially, a negative decision (NO) is also obtained in this step S222, and the control flow goes to step S224 to select a relatively wide uncontrolled band. Step S224 is followed by step S102 and the subsequent steps of FIG. 18. If an affirmative decision (YES) is obtained in step S222, the control flow goes to step S226 in which the variable "flagD" is set to "1", and then to step S228 to select a relatively narrow uncontrolled band. The relatively wide uncontrolled band is defined by the threshold values err1 and err2 which are the same as in the first embodiment of FIG. 15. On the other hand, the relatively narrow uncontrolled band is defined by the threshold values err1 and err2 whose absolute values are smaller than in the first embodiment, that is, than those of the relatively wide uncontrolled band. The relatively narrow uncontrolled band may be defined by the thresholds values err1 and err2 which are both zero. This is considered to be a special case of the relatively narrow controlled band. In this special case, the valve device 56 is placed in the pressure-increasing or pressure-reducing state and is not placed in the pressure-holding state, where the desired fluid pressure change amount dPref of FIG. 15 is within the range defined by the upper threshold dPth1 and the lower threshold dPth2. After the variable "flagD" is once set to "1" in step S226, an affirmative decision (YES) is obtained in step S220, and the control flow goes to step S230 to determine whether a predetermined time T3 has elapsed after the affirmative decision (YES) is obtained in step S220, that is, after the relatively narrow uncontrolled band is selected and established in step S228. If an affirmative decision (YES) is obtained in step S230, the control flow goes to step S232 to reset the variable "flagD" to "0", and to step S224 in which the relatively narrow uncontrolled band is changed to the relatively wide uncontrolled band.

According to the sub-routine of FIG. 28, the width of the uncontrolled band is reduced so as to reduce the control error "error", where the absolute value of the control error "error" is held larger than the threshold err3 for more than the predetermined time T2 while the valve device 56 is held in the pressure-holding state. While the relatively narrow uncontrolled band is established, the linear solenoid valve device 56 is relatively frequently switched between the pressure-increasing and pressure-reducing states. If the relatively narrow uncontrolled band is kept established for more than the predetermined time T3, the width of the uncontrolled band is increased, that is, the relatively wide uncontrolled band is selected, so that the valve device 56 is made less likely to be placed in the pressure-increasing or pressure-reducing state. It will be understood that a portion of the controller 66 assigned to implement steps S220, S222, S226, S228 and S230 constitutes means for reducing the width of the uncontrolled band in which the valve device 56 is held in the pressure-holding state.

Figure 29:
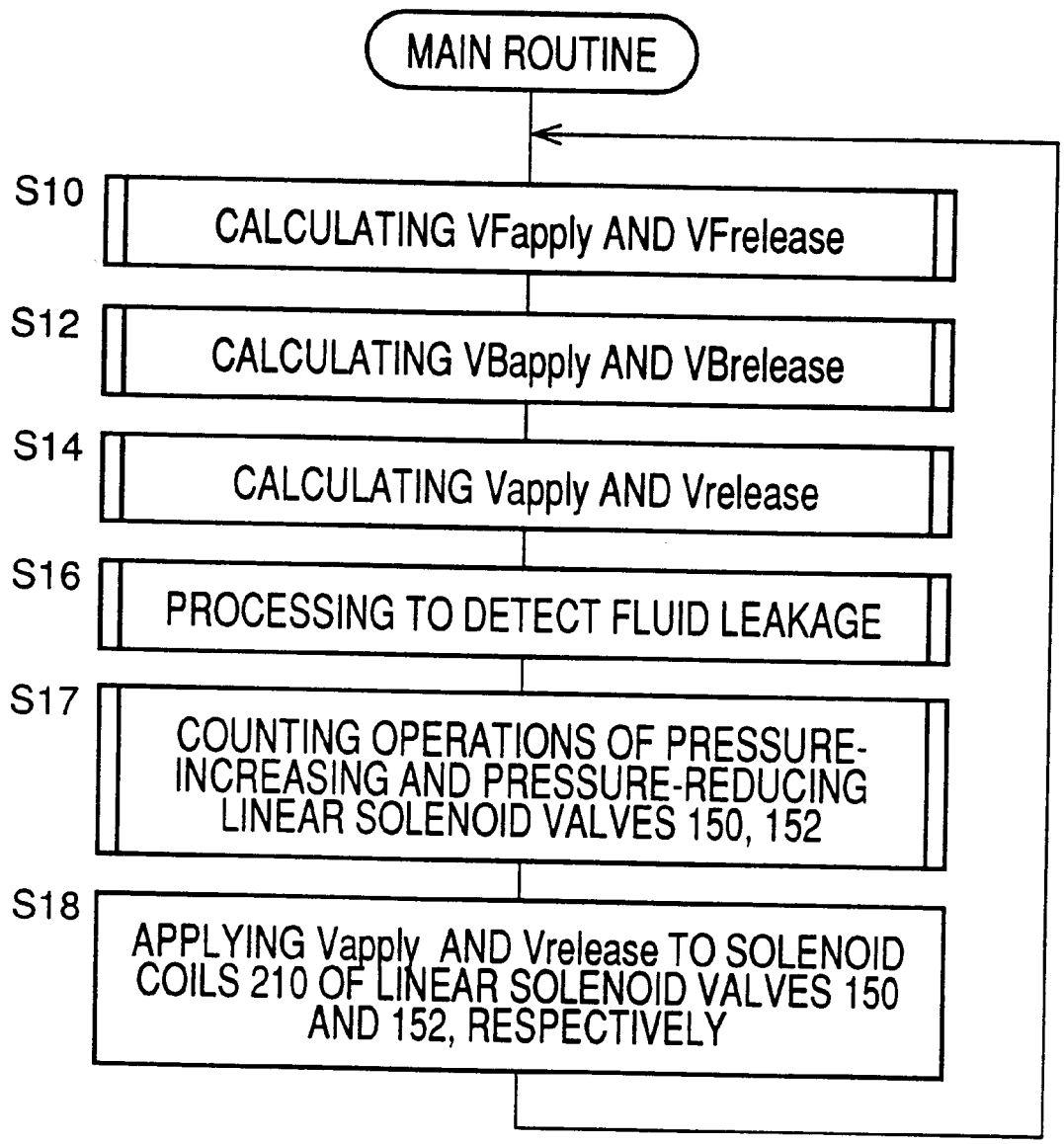
FIG. 29 is a flow chart illustrating a main routine executed by the controller in a further embodiment of this invention.

The main routine illustrated in the flow chart of FIG. 7 may be modified as illustrated in the flow chart of FIG. 29.

The main routine of FIG. 29 includes step S17 which is a sub-routine for counting the number of operations of the pressure-increasing and pressure-reducing linear solenoid valves 150 and 152.

Figure 30:
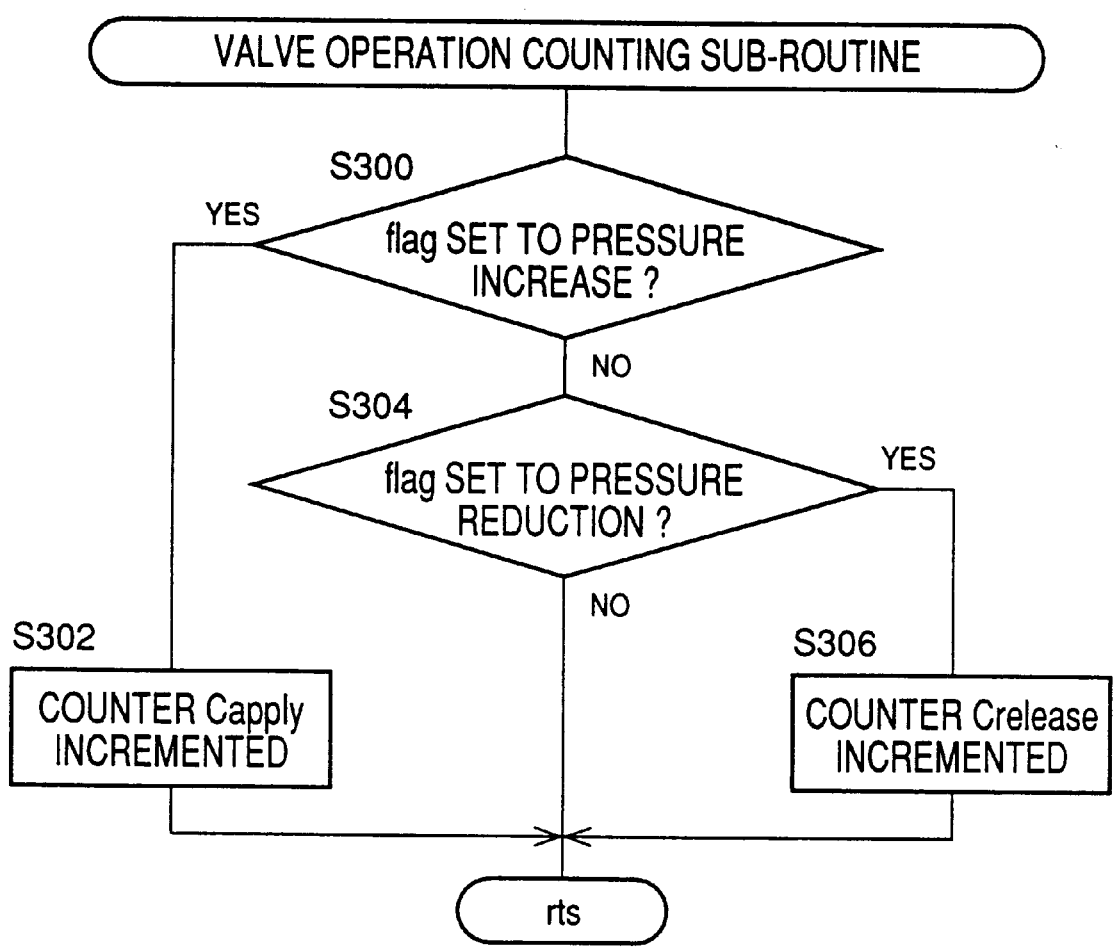
FIG. 30 is a flow chart illustrating a sub-routine executed in step S17 of the main routine of FIG. 29, to count the number of operations of the pressure-increasing and pressure-reducing linear solenoid valves.

The sub-routine in step S17, which is illustrated in the flow chart of FIG. 30, is initiated with step S300 to determine whether the pressure control variable "flag" has been changed in the sub-routine of FIG. 18, from the value indicative of the pressure-holding state or pressure-reducing state of the valve device 56 to the value indicative of the pressure-increasing state of the valve device 56. To this end, the RAM of the controller 66 includes a memory area for storing the value of the variable "flag". If an affirmative decision (YES) is obtained in step S300, the control flow goes to step S302 in which a counter Capply for counting the number of pressure-increasing operations of the pressure-increasing linear solenoid valve 150 is incremented. If a negative decision (NO) is obtained in step S300, the control flow goes to step S304 to determine whether the variable "flag" has been changed in the sub-routine of FIG. 18, from the value indicative of the pressure-holding or pressure-increasing state of the valve device 56 to the value indicative of the pressure-reducing state. If an affirmative decision (YES) is obtained in step S304, the control flow goes to step S306 in which a counter Crelease for counting the number of pressure-reducing operations of the pressure-reducing linear solenoid valve 152 is incremented. Thus, the counters Capply and Crelease are incremented each time the pressure-increasing and pressure-reducing operations of the linear solenoid valves 150, 152 are initiated, respectively. Contents Ccapply and Ccrelease of the counters Capply and Crelease represent the cumulative numbers of pressure-increasing and pressure-reducing operations of the valves 150, 152, respectively, after the first use of the linear solenoid valve 56.

In the main routine of FIG. 7 of the first embodiment of FIGS. 1–20, steps S42 and S46 are adapted to calculate the feed-forward pressure-increasing and pressure-reducing voltage increments VFca, VFcr of the linear solenoid valves 150, 152 according to the equations (3) and (4), respectively. In the present embodiment of FIGS. 29 and 30, the voltage increments VFca and VFcr are calculated according to the following equations (11) and (12), respectively:

$$\text{VFca} \leftarrow \text{MAPa}(\text{Pin}-\text{Pout1})-K(\text{Ccapply}) \quad (11)$$

$$\text{VFca} \leftarrow \text{MAPr}(\text{Pout1}-\text{Pres})-K(\text{Ccrelease}) \quad (12)$$

Figure 31:
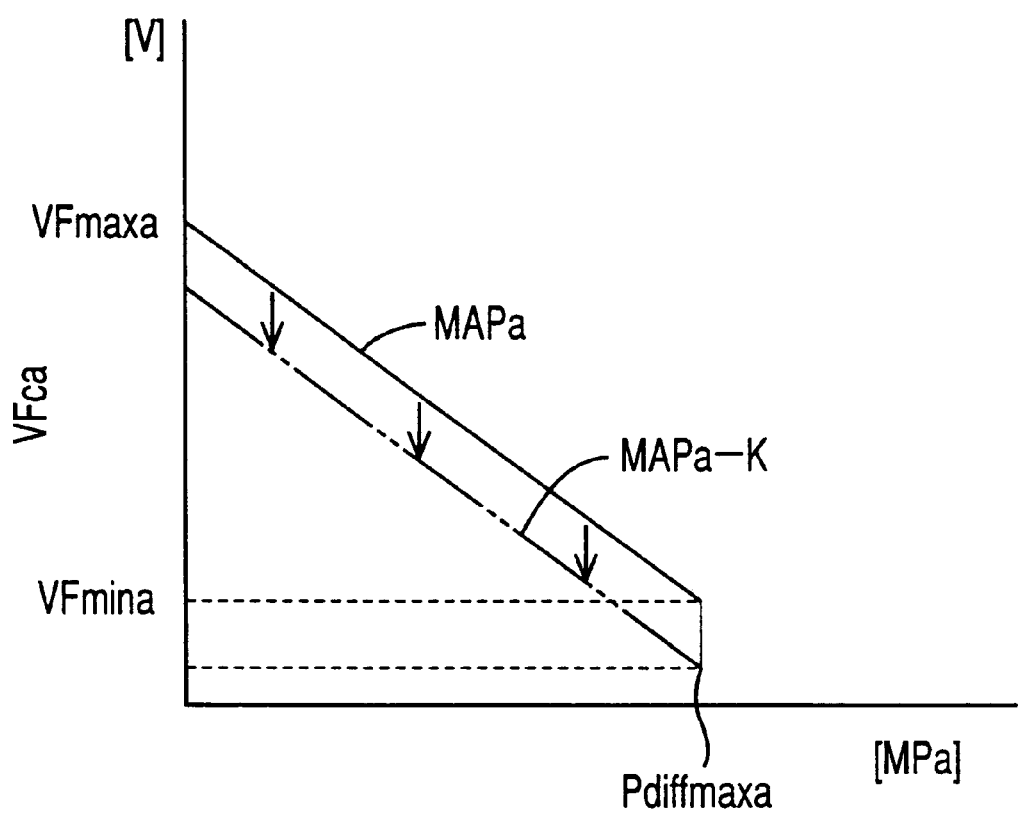
FIG. 31 is a graph corresponding to that of FIG. 9, for explaining a sub-routine for calculating the feed-forward pressure-increasing and pressure-reducing voltage values VFapply and VFrelease in the embodiment of FIG. 29.

In the above equations, K is a function for obtaining the feed-forward pressure-increasing or pressure-reducing increment VFca, VFcr based on the content Ccapply of the counter Capply or the content Ccrelease of the counter Crelease. The function K is determined such that the value K(Ccapply) or K(Ccrelease) increases with an increase in the content Ccapply or Ccrelease. According to the above equation (11), for example, the feed-forward pressure-increasing voltage increment VFca decreases with an increase in the number of pressure-increasing operations of the pressure-increasing linear solenoid valve 150, as indicated in the graph of FIG. 31. Accordingly, the increment of the electric current to be applied to the coil 210 of the linear solenoid valve 150 to move the valve member 200 away from the valve seat 202 against the biasing force of the spring 206 is reduced as the number of the pressure-increasing operations of the linear solenoid valve 150 increases. This arrangement is effective to prevent or minimize a variation in the pressure difference across the linear solenoid valve 150, which takes place due to reduction of the biasing force of the spring 206 with a decrease in its spring constant as the number of operations of the linear solenoid valve 150 increases.

Although the present embodiment of FIGS. 29 and 30 uses the numbers of operations of the linear solenoid valves 150, 152 as a parameter indicative of the amount of use of these valves 150, 152, the numbers of operations of the valves 150, 152 may be replaced by other parameters such as the cumulative time of application of the electric current to the coils 210, and the time lapse after the time of completion of the manufacture of the vehicle in which the valve device 56 is incorporated. Further, the function K may be determined such that the values K(Ccapply) and K(Ccrelease) increase in steps, rather than continuously, with an increase in the numbers of operations of the valves 150, 152, so that the increment of the electric current to be applied to the coils 310 decreases in steps as the numbers of operations of the valves 150, 152 increase. The functions K(Ccapply) and K(Ccrelease) may be replaced by data maps stored in the controller 66.

While a PID control generally implemented for feedback control is employed in the sub-routine in step S12 of the main routine of FIG. 7 to calculate the feedback pressure-increasing and pressure-reducing voltage values VBapply and VBrelease, a special PID control may be employed to calculate the voltage values VBapply and VBrelease.

Generally, the feedback pressure-increasing and pressure-reducing voltage values VBapply and VBrelease are calculated on the basis of the control error "error" between the output fluid pressure Pout1 and the desired fluid pressure Pref, according to the following equations:

$$\text{VBapply}=k_p \cdot e + k_i \cdot \int edt + k_d \cdot de/dt$$

$$\text{VBrelease}=-(k_p \cdot e + k_i \cdot \int edt + k_d \cdot de/dt)$$

Figure 32A:
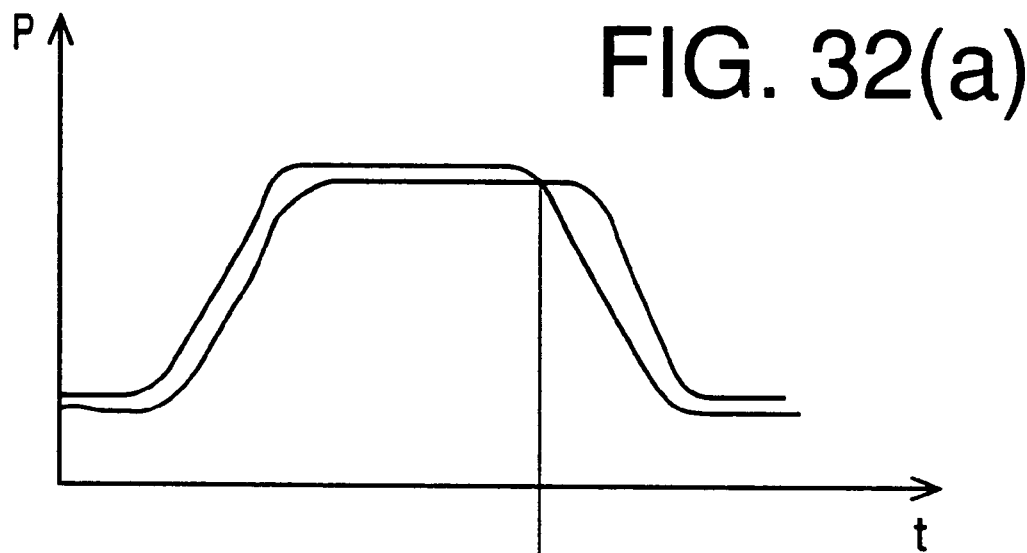
FIGS. 32(a), 32(b) and 32(c) are graphs for explaining a sub-routine for calculating the feedback pressure-increasing and pressure-reducing voltage values VBapply and VBrelease, in another embodiment of the present invention.
Figure 32B:
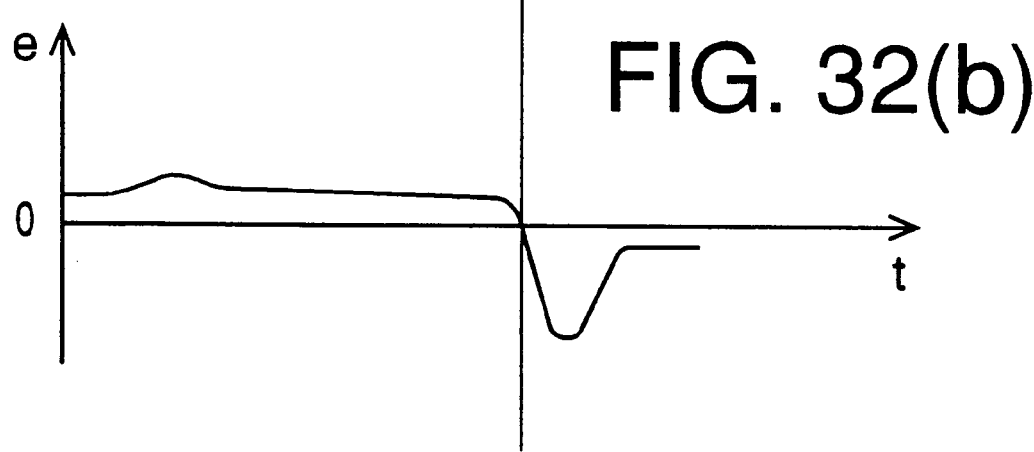
Figure 32C:
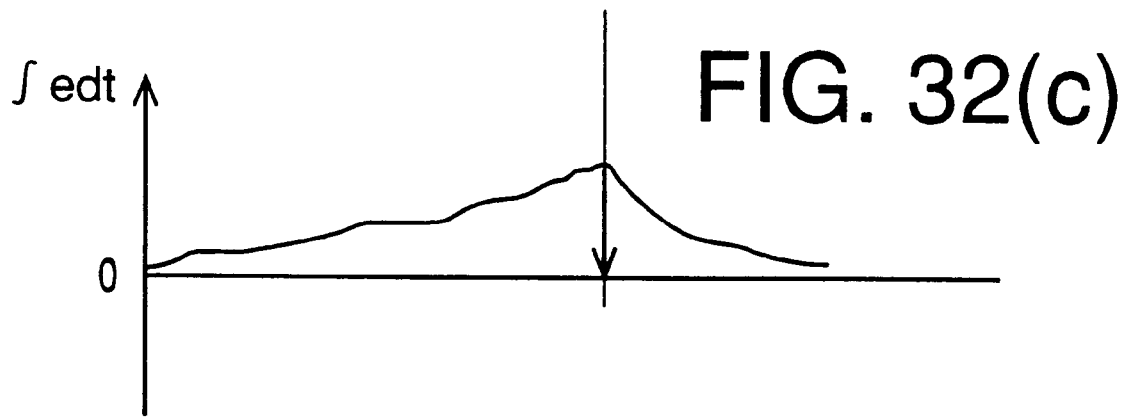

In the above equations, "e" represents the control error "error", while "$k_p$", "$k_i$" and "$k_d$" represent control gains. The generally implemented PID control according to the above equations may cause a delayed response of the voltage values VBapply, VBrelease upon transition of the linear solenoid valve device 56 from the pressure-increasing state to the pressure-reducing state or vice versa. In the case where the desired fluid pressure Pref and the output fluid pressure Pout1 change as indicated in FIG. 32(a), the control error "e" and an integral value ∫edt of the control error "e" change as indicated in FIGS. 32(b) and 32(c), respectively, and the integral value ∫edt may be considerably large when the control error "e" changes from a positive value to a negative value. In this case, the negative value $k_p \cdot e$ is offset by the positive value $k_i \cdot \int edt$, so that the absolute value of the voltage value VBrelease decreases, leading to a possibility of deterioration of the response of the feedback pressure-reducing voltage value VBrelease. To avoid this potential drawback, the PID control may be modified so as to reset the integral value ∫edt to zero, as indicated by arrow in FIG. 32(c), when the sign of the control error "e" changes. This modified PID control prevents the negative value $k_p \cdot e$ from being offset by the positive value $k_i \cdot \int edt$, and thus improves the response of the linear solenoid valve device 56 upon transition from the pressure-increasing state to the pressure-reducing state. The integral value ∫edt of the control error "e" is also reset to zero upon changing of the control error "e" from a negative value to a positive value, so that the response of the valve device 56 upon transition from the pressure-reducing state to the pressure-increasing state is also improved.

While the above embodiment is adapted to reset the integral value ∫edt upon changing of the sign of the control error "e", it is possible to reset the integral value ∫edt when a command for placing the valve device 56 in the pressure-increasing state is changed to a command for placing the valve device 56 in the pressure-reducing state, or vice versa. This modification provides substantially the same effect as the above embodiment.

While the hydraulic braking system 10 of the illustrated embodiment is adapted to be used for a motor vehicle equipped with a regenerative braking system, the principle of the present invention is equally applicable to a motor vehicle without a regenerative braking system. In this case, the controller is not required to determine the hydraulic braking force generated by the hydraulic braking system such that the hydraulic braking force is equal to a difference between the desired braking force and the regenerative braking force. The linear solenoid valve device 56 may be replaced by a pressure control valve device including solenoid-operated directional control valves or shut-off valves. The elimination of the residual fluid pressure may be effected when the movement of a brake operating member such as the brake pedal 126 to the non-operated position is detected by suitable detector such as a detector switch.

While the storage capacity of the pressure-reducing reservoir 154 is determined to be smaller than the maximum total amount of the fluid that can be accommodated in all of the four wheel brake cylinders 24, 26, 50, 52, an optimum ratio of the storage capacity to the above-indicated maximum total amount depends upon or changes with various conditions, such as the type of the brake including each wheel brake cylinder, and the rigidity of the brake. For example, the storage capacity of the reservoir 154 may be determined to be smaller than ½, ⅘, 3/7, ⅖ or ⅓ of the maximum total amount of the fluid that can be accommodated in the four wheel brake cylinders 24, 26, 50, 52.

It is to be understood that the present invention may be embodied with various other changes, modifications and improvements, which may occur to those skilled in the art, without departing from the spirit and scope of the invention defined in the following claims:

What is claimed is:

1. A hydraulic pressure control apparatus comprising:
    a seating valve including a valve member and a valve seat and disposed in a fluid passage such that the fluid passage is separated by said seating valve into a high-pressure portion and a low-pressure portion when the seating valve is placed in a closed state thereof with said valve member being seated on said valve seat, and such that a pressure difference between pressures of a working fluid in said high-pressure and low-pressure portions of the fluid passage acts on said valve member in a first direction for moving the valve member away from said valve seat so as to place said seating valve in an open state thereof;
    an elastic member which biases said valve member in a second direction for moving said valve member to be seated on said valve seat;
    a valve driving device operated with an electric current applied thereto, to generate a drive force acting on said valve member in said first direction; and
    a control device which controls an amount of said electric current to be applied to said valve driving device, to thereby control said valve driving device,
    and wherein said control device comprises a stepping control device which increments the amount of said electric current when said seating valve is operated from said closed state into said open state, said stepping control device determining an increment of the amount of said electric current such that said increment decreases with an increase in said pressure difference.

2. A hydraulic pressure control apparatus according to claim 1, further comprising a pressure difference detecting device for detecting said pressure difference across said seating valve, and wherein said stepping control device comprises an increment determining device which determines said increment on the basis of said pressure difference detected by said pressure difference detecting device.

3. A hydraulic pressure control apparatus according to claim 2, wherein said control device further comprises an updating device which activates at least one of said pressure detecting device and said increment determining means to repeatedly implementing at least one of detection of said pressure difference and determination of said increment at a predetermined time interval, so that said increment is updated at said predetermined time interval.

4. A hydraulic pressure control apparatus according to claim 1, wherein said control device further comprises a current control device which applies the electric current to said valve driving device while said seating valve is placed in said open position, such that the amount of said electric current increases with a decrease in said pressure difference.

5. A hydraulic pressure control apparatus according to claim 1, wherein said stepping control device comprises increment decreasing means for determining said increment of the amount of said electric current such that said increment is smaller when an amount of use of said seating valve is relatively large than when said amount of use is relatively small.

6. A hydraulic pressure control apparatus according to claim 5, wherein said amount of use of said seating valve is a cumulative amount of operation of said seating valve after initiation of use of said seating valve.

7. A hydraulic pressure control apparatus according to claim 6, wherein said cumulative amount of operation of said seating valve is a cumulative number of operations of said seating valve.

8. A hydraulic pressure control apparatus according to claim 6, wherein said cumulative amount of operation of said seating valve is a cumulative time of application of said electric current to said valve driving device.

9. A hydraulic pressure control apparatus according to claim 5, wherein said increment decreasing means comprises means for decreasing said increment of the amount of said electric current with an increase in said amount of use of said seating valve.

10. A hydraulic pressure control apparatus according to claim 5, wherein said increment decreasing means comprises means for storing data indicative of said amount of use of said seating valve.

11. A hydraulically operated braking system for a motor vehicle, comprising:
    a hydraulic pressure source;
    at least one wheel brake cylinder each for braking a corresponding one of at least one wheel of the motor vehicle;
    a seating valve including a valve member and a valve seat and disposed in a fluid passage which is provided for connecting said hydraulic pressure source and said at least one wheel brake cylinder, said seating valve being placed in a closed state thereof with said valve member being seated on said valve seat so as to disconnect said fluid passage, said valve member receiving a pressure difference of a working fluid across said seating valve such that said pressure difference acts on said valve member in a first direction for moving the valve member away from said valve seat so as to place said seating valve in an open state thereof;

an elastic member which biases said valve member in a second direction for moving said valve member to be seated on said valve seat;

a valve driving device operated with an electric current applied thereto, to generate a drive force acting on said valve member in said first direction; and a control device which controls an amount of said electric current to be applied to said valve driving device, to thereby control said valve driving device, and wherein said control device comprises a stepping control device which increments the amount of said electric current when said seating valve is operated from said closed state into said open state, said stepping control device determining an increment of the amount of said electric current such that said increment decreases with an increase in said pressure difference, said control device further comprising a replacing device which is operable when the pressure in said at least one wheel brake cylinder is increased from an atmospheric pressure, said replacing device replacing said increment with a value larger than said increment as determined by said stepping control device.

12. A hydraulically operated braking system according to claim 11, wherein said seating valve, said elastic member, said valve driving device and said control device cooperate to function as a pressure-increasing pressure control device, said braking system further comprising:

a reservoir for storing the working fluid; and a pressure-reducing pressure control device identical in construction with said pressure-increasing pressure control device, said seating valve of said pressure-reducing pressure control device being disposed in a fluid passage provided for connecting said reservoir and said at least one wheel brake cylinder, said valve member of said seating valve of said pressure-reducing pressure control device receiving a pressure difference of the working fluid across said seating valve of said pressure-reducing pressure control device such that said pressure difference acts on said valve member in said first direction for moving the valve member away from said valve seat.

13. A hydraulically operated braking system according to claim 12, wherein said reservoir receives the fluid which has been discharged from said at least one wheel brake cylinder through said seating valve of said pressure-reducing pressure control device during a braking operation of said braking system, said fluid being returned from said reservoir to said hydraulic pressure source after said braking operation, said reservoir having a storage capacity which is a maximum amount of the fluid that can be stored therein during said braking operation and which is smaller than a maximum total amount of the fluid that can be accommodated in all of said at least one wheel brake cylinder when said at least one wheel brake cylinder is operated from a non-braking state thereof to a braking state.

14. A hydraulically operated braking system according to claim 12, wherein said reservoir receives the fluid which has been discharged from said at least one wheel brake cylinder through said seating valve of said pressure-reducing pressure control device during a braking operation of said braking system, said fluid being returned from said reservoir to said hydraulic pressure source after said braking operation, said braking system further comprising:

a fluid leakage detecting device which detects a leakage of the fluid from the braking system, said fluid leakage detecting device determining that said leakage has taken place, if a total amount of the fluid which has been discharged from said at least one wheel brake cylinder toward said reservoir through said pressure-reducing pressure control device during said braking operation has exceeded a storage capacity of said reservoir, which storage capacity is a maximum amount of the fluid that can be stored therein during said braking operation.

15. A hydraulically operated braking system according to claim 11, wherein said hydraulic pressure source includes a master cylinder which pressurizes the working fluid according to an operation of a brake operating member, and said elastic member has an elastic force which is determined such that an opening pressure difference of said seating valve which is said pressure difference above which said seating valve is placed in said open state when said electric current is not applied to said valve driving device is smaller than a maximum pressure of the fluid pressurized by said master cylinder.

16. A hydraulically operated braking system according to claim 12, wherein said reservoir includes a displaceable member partially defining a fluid chamber for storing the fluid, and a biasing device which biases said displaceable member in a direction for reducing a volume of said fluid chamber, the fluid being discharged from said fluid chamber based on a biasing force of said biasing device acting on said displaceable member, after termination of said operation of said brake operating member.

17. A hydraulically operated braking system according to claim 12, wherein said reservoir functions as an auxiliary reservoir, and said hydraulic pressure source comprises a primary reservoir for storing the working fluid at an atmospheric pressure, said hydraulically operated braking system further comprising:

a by-pass passage which by-passes said pressure control valve device and connects said at least one wheel brake cylinder and said primary reservoir through a fluid passage between said hydraulic pressure source and said pressure control valve device; and a check valve disposed in said by-pass passage, said check valve permitting a flow of the fluid in a direction from said at least one wheel brake cylinder toward said primary reservoir and inhibiting a flow of the fluid in a direction from said primary reservoir toward said at least one wheel brake cylinder.

18. A hydraulically operated braking system according to claim 12, further comprising:

a first check valve disposed in parallel connection with said seating valve of said pressure-increasing pressure control device, said first check valve permitting a flow of the fluid in a direction from said at least one wheel brake cylinder toward said hydraulic pressure source, and inhibiting a flow of the fluid in a direction from said hydraulic pressure source toward said at least one wheel brake cylinder; and a second check valve disposed in parallel connection with said seating valve of said pressure-reducing pressure control device, said second check valve permitting a flow of the fluid in a direction from said reservoir toward said at least one wheel brake cylinder, and inhibiting a flow of the fluid in a direction from said at least one wheel brake cylinder toward said reservoir.

19. A hydraulically operated braking system according to claim 11, wherein said valve driving device a comprises a biased member movable with said valve member, and a solenoid coil which generates an electromagnetic biasing force which acts on said biased member in said first direction opposite to said second direction.

20. A hydraulically operated braking system according to claim 11, which is provided for a motor vehicle equipped with an electric motor which functions as a drive power source for driving the motor vehicle and an electric generator which constitutes a part of a regenerative braking system wherein said electric generator generates a regenerative braking force, said hydraulic power source including a master cylinder which pressurizes the working fluid such that a pressure of the pressurized fluid corresponds to an operating state of a brake operating member, said hydraulically operated braking system comprising a cooperative control device which controls said valve driving device such that the pressure of the pressurized fluid to be supplied to said at least one wheel brake cylinder is lower than the pressure of the fluid in said master cylinder, by an amount corresponding to said regenerative braking force generated by the regenerative braking system.

21. A hydraulically operated braking system according to claim 12, wherein said seating valves, said elastic members and said valve driving devices of said pressure-increasing and pressure-reducing pressure control devices cooperate to function as a first pressure control valve device, said hydraulically operated braking system further comprising:

a second pressure control valve device disposed between said at least one wheel brake cylinder and said first pressure control valve device; and a controller which controls said second pressure control valve device, in at least one of a plurality of control modes consisting of: an anti-lock control mode for preventing an excessive amount of slip of said at least one wheel during said operation of said brake operating member; a traction control mode for preventing an excessive amount of slip of at least one drive wheel of said at least one wheel during acceleration of said motor vehicle; a vehicle stability control mode for improving a running stability of the motor vehicle; and a braking-effect control mode for providing an operator's desired braking effect which accurately corresponds to an operating state of said brake operating member.

22. A hydraulically operated braking system according to claim 12, wherein said reservoir receives the fluid which has been discharged from said at least one wheel brake cylinder through said seating valve of said pressure-reducing pressure control device during a braking operation of said braking system, said fluid being returned from said reservoir to said hydraulic pressure source after said braking operation, said reservoir having a storage capacity which is determined such that each of said at least one wheel brake cylinder is still capable of braking the corresponding wheel of the motor vehicle even after said reservoir has been filled with the working fluid which is discharged from said at least one wheel brake cylinder as a result of opening of said pressure-reducing pressure control device when the amount of the working fluid in said reservoir is minimum and when said each wheel brake cylinder is braking said corresponding wheel.

23. A hydraulically operated braking system according to claim 12, wherein said reservoir receives the fluid which has been discharged from said at least one wheel brake cylinder through said seating valve of said pressure-reducing pressure control device during a braking operation of said braking system, said fluid being returned from said reservoir to said hydraulic pressure source after said braking operation, said reservoir having a storage capacity which is smaller than a difference between two different amounts of the working fluid which are accommodated in all of said at least one wheel brake cylinder under respective two different braking conditions in which each of said at least one wheel brake cylinder provides respective two different substantial braking effects, respectively.

* * * * *